Feb. 20, 1962 J. C. EWIN 3,022,382

REMOTE TELEPHONE LINE CONCENTRATOR

Filed Oct. 31, 1960 29 Sheets-Sheet 1

INVENTOR
J. C. EWIN
BY SEHollander
ATTORNEY

Feb. 20, 1962 J. C. EWIN 3,022,382

REMOTE TELEPHONE LINE CONCENTRATOR

Filed Oct. 31, 1960 29 Sheets-Sheet 2

INVENTOR
J. C. EWIN
BY
S E Hollander
ATTORNEY

Feb. 20, 1962 J. C. EWIN 3,022,382

REMOTE TELEPHONE LINE CONCENTRATOR

Filed Oct. 31, 1960 29 Sheets-Sheet 3

INVENTOR
J. C. EWIN
BY
S E Hollander
ATTORNEY

Feb. 20, 1962 J. C. EWIN 3,022,382

REMOTE TELEPHONE LINE CONCENTRATOR

Filed Oct. 31, 1960 29 Sheets-Sheet 4

INVENTOR
J. C. EWIN
BY SF Hollander
ATTORNEY

Feb. 20, 1962 J. C. EWIN 3,022,382

REMOTE TELEPHONE LINE CONCENTRATOR

Filed Oct. 31, 1960 29 Sheets-Sheet 5

INVENTOR
J. C. EWIN

BY S E Hollander

ATTORNEY

Feb. 20, 1962 J. C. EWIN 3,022,382

REMOTE TELEPHONE LINE CONCENTRATOR

Filed Oct. 31, 1960 29 Sheets-Sheet 6

INVENTOR
J. C. EWIN
BY
S E Hollander
ATTORNEY

Feb. 20, 1962 J. C. EWIN 3,022,382

REMOTE TELEPHONE LINE CONCENTRATOR

Filed Oct. 31, 1960 29 Sheets-Sheet 7

INVENTOR
J. C. EWIN
BY
S E Hollander
ATTORNEY

Feb. 20, 1962 J. C. EWIN 3,022,382

REMOTE TELEPHONE LINE CONCENTRATOR

Filed Oct. 31, 1960 29 Sheets-Sheet 8

INVENTOR
J. C. EWIN
BY
S E Hollander
ATTORNEY

REMOTE TELEPHONE LINE CONCENTRATOR

Filed Oct. 31, 1960 29 Sheets-Sheet 9

LINE LOCKOUT

INVENTOR
J. C. EWIN
BY
S E Hollander
ATTORNEY

INVENTOR
J. C. EWIN
BY S F Hollander
ATTORNEY

INVENTOR
J. C. EWIN
BY S E Hollander
ATTORNEY

INVENTOR
J. C. EWIN
BY SE Hollander
ATTORNEY

INVENTOR
J. C. EWIN
BY S E Hollander
ATTORNEY

Feb. 20, 1962 J. C. EWIN 3,022,382

REMOTE TELEPHONE LINE CONCENTRATOR

Filed Oct. 31, 1960 29 Sheets-Sheet 14

INVENTOR
J. C. EWIN
BY
S E Hollander
ATTORNEY

Feb. 20, 1962 J. C. EWIN 3,022,382

REMOTE TELEPHONE LINE CONCENTRATOR

Filed Oct. 31, 1960 29 Sheets-Sheet 15

INVENTOR
J. C. EWIN
BY
S F Hollander
ATTORNEY

Feb. 20, 1962 J. C. EWIN 3,022,382

REMOTE TELEPHONE LINE CONCENTRATOR

Filed Oct. 31, 1960 29 Sheets-Sheet 16

INVENTOR
J. C. EWIN

BY S E Hollander

ATTORNEY

INVENTOR
J. C. EWIN
BY S E Hollander
ATTORNEY

INVENTOR
J. C. EWIN
BY S E Hollander
ATTORNEY

Feb. 20, 1962 J. C. EWIN 3,022,382

REMOTE TELEPHONE LINE CONCENTRATOR

Filed Oct. 31, 1960 29 Sheets-Sheet 19

INVENTOR
J. C. EWIN
BY S E Hollander
ATTORNEY

INVENTOR
J. C. EWIN
BY S E Hollander
ATTORNEY

Feb. 20, 1962 J. C. EWIN 3,022,382

REMOTE TELEPHONE LINE CONCENTRATOR

Filed Oct. 31, 1960 29 Sheets-Sheet 21

INVENTOR
J. C. EWIN
BY S E Hollander
ATTORNEY

Feb. 20, 1962 J. C. EWIN 3,022,382

REMOTE TELEPHONE LINE CONCENTRATOR

Filed Oct. 31, 1960 29 Sheets-Sheet 22

INVENTOR
J. C. EWIN
BY S E Hollander
ATTORNEY

Feb. 20, 1962 J. C. EWIN 3,022,382

REMOTE TELEPHONE LINE CONCENTRATOR

Filed Oct. 31, 1960 29 Sheets-Sheet 23

INVENTOR
J. C. EWIN
BY S E Hollander
ATTORNEY

Feb. 20, 1962 J. C. EWIN 3,022,382

REMOTE TELEPHONE LINE CONCENTRATOR

Filed Oct. 31, 1960 29 Sheets-Sheet 24

INVENTOR
J. C. EWIN
BY
S E Hollander
ATTORNEY

Feb. 20, 1962 J. C. EWIN 3,022,382

REMOTE TELEPHONE LINE CONCENTRATOR

Filed Oct. 31, 1960 29 Sheets-Sheet 25

INVENTOR
J. C. EWIN
BY S F Hollander
ATTORNEY

REMOTE TELEPHONE LINE CONCENTRATOR

Filed Oct. 31, 1960 29 Sheets-Sheet 26

INVENTOR
J. C. EWIN
BY S E Hollander
ATTORNEY

Feb. 20, 1962 J. C. EWIN 3,022,382

REMOTE TELEPHONE LINE CONCENTRATOR

Filed Oct. 31, 1960 29 Sheets-Sheet 27

INVENTOR
J. C. EWIN
BY S E Hollander
ATTORNEY

REMOTE TELEPHONE LINE CONCENTRATOR

Filed Oct. 31, 1960 29 Sheets-Sheet 28

TIMING CIRCUIT

OVERFLOW CALL

CONTROL UNIT

INVENTOR
J. C. EWIN
BY
S E Hollander
ATTORNEY

FIG. 31

TABLE 1

ASSOCIATION OF LINE NO. WITH LA AND LB RELAYS (REMOTE UNIT)

| | G0 3LA00 | G0 01 | G0 02 | G0 03 | G0 04 | G0 05 | G1 06 | G1 07 | G1 08 | G1 09 | G1 10 | G1 3LA11 |
|---|---|---|---|---|---|---|---|---|---|---|---|---|
| 3LB08 | 08 | 17 | 26 | 35 | 44 | | 58 | 67 | 76 | 85 | 94 | |
| 07 | 07 | 16 | 25 | 34 | 43 | | 57 | 66 | 75 | 84 | 93 | |
| 06 | 06 | 15 | 24 | 33 | 42 | | 56 | 65 | 74 | 83 | 92 | |
| 05 | 05 | 14 | 23 | 32 | 41 | | 55 | 64 | 73 | 82 | 91 | |
| 04 | 04 | 13 | 22 | 31 | 40 | 49 | 54 | 63 | 72 | 81 | 90 | 99 |
| 03 | 03 | 12 | 21 | 30 | 39 | 48 | 53 | 62 | 71 | 80 | 89 | 98 |
| 02 | 02 | 11 | 20 | 29 | 38 | 47 | 52 | 61 | 70 | 79 | 88 | 97 |
| 01 | 01 | 10 | 19 | 28 | 37 | 46 | 51 | 60 | 69 | 78 | 87 | 96 |
| 3LB00 | 00 | 09 | 18 | 27 | 36 | 45 | 50 | 59 | 68 | 77 | 86 | 95 |

LINE NUMBER

FIG. 32

TABLE 2

ASSOCIATION OF LINE NO. WITH LA AND LB RELAYS (CONTROL UNIT)

| | G0 9LA00 | G0 01 | G0 02 | G0 03 | G0 04 | G0 05 | G1 06 | G1 07 | G1 08 | G1 09 | G1 10 | G1 9LA11 | |
|---|---|---|---|---|---|---|---|---|---|---|---|---|---|
| 9LB08 | 08 | 17 | 26 | 35 | 44 | | 58 | 67 | 76 | 85 | 94 | | 9LB17 |
| 07 | 07 | 16 | 25 | 34 | 43 | | 57 | 66 | 75 | 84 | 93 | | 16 |
| 06 | 06 | 15 | 24 | 33 | 42 | | 56 | 65 | 74 | 83 | 92 | | 15 |
| 05 | 05 | 14 | 23 | 32 | 41 | | 55 | 64 | 73 | 82 | 91 | | 14 |
| 04 | 04 | 13 | 22 | 31 | 40 | 49 | 54 | 63 | 72 | 81 | 90 | 99 | 13 |
| 03 | 03 | 12 | 21 | 30 | 39 | 48 | 53 | 62 | 71 | 80 | 89 | 98 | 12 |
| 02 | 02 | 11 | 20 | 29 | 38 | 47 | 52 | 61 | 70 | 79 | 88 | 97 | 11 |
| 01 | 01 | 10 | 19 | 28 | 37 | 46 | 51 | 60 | 69 | 78 | 87 | 96 | 10 |
| 9LB00 | 00 | 09 | 18 | 27 | 36 | 45 | 50 | 59 | 68 | 77 | 86 | 95 | 9LB09 |

LINE NUMBER

FIG. 33

TABLE 3

| SIGNAL RELAYS OPERATED | SEQUENCE CONTROL RELAYS OPERATED: CLASS OF CALL AND GROUP REG. | -W1 | -Z1 B INFORMATION REGISTRATION -LB | -W2 -B | -Z2 A INFORMATION REGISTRATION -LA | -W3 -A | -Z3 TRUNK REGISTRATION 16HS | -W4 6TK |
|---|---|---|---|---|---|---|---|---|
| NONE | | | 00,09 | 0 | | | 00,10 | 0 |
| -S4 | 16DIS14 | 6DG1 | 01,10 | 1 | 00,06 | 0 | 01,11 | 1 |
| -S3,S4 | | | 02,11 | 2 | 01,07 | 1 | 02,12 | 2 |
| -S2 | 16DIS04 | 6DG0 | 03,12 | 3 | 02,08 | 2 | 03,13 | 3 |
| -S2,S4 | KEY 10T1 | -T1 | 04,13 | 4 | 03,09 | 3 | 04,14 | 4 |
| -S2,S3,S4 | -LA 06,16 | -CG1 | 05,14 | 5 | 04,10 | 4 | 05,15 | 5 |
| -S1,S2 | | | 06,15 | 6 | 05,11 | 5 | 06,16 | 6 |
| -S1,S2,S4 | -LA 00,05 | -CG0 | 07,16 | 7 | | | 07,17 | 7 |
| -S1,S2,S3,S4 | KEY 10T0 | -T0 | 08,17 | 8 | | | 08,18 | 8 |
| NONE & 7TR | | | | | | | 09,19 | 9 |

INVENTOR
J.C. EWIN
BY
S E Hollander
ATTORNEY

United States Patent Office 3,022,382
Patented Feb. 20, 1962

3,022,382
REMOTE TELEPHONE LINE CONCENTRATOR
James C. Ewin, Colonia, N.J., assignor to Bell Telephone Laboratories, Incorporated, New York, N.Y., a corporation of New York
Filed Oct. 31, 1960, Ser. No. 66,320
23 Claims. (Cl. 179—18)

This invention relates to telephone line concentrators and more particularly to remote line concentrators of the universal type.

The concentration of telephone lines at remote locations is receiving increased consideration from telephone switching technologists. Briefly, remote line concentration is predicated on the ability to literally "concentrate" a relatively larger number of substation lines at a remote location by providing switching facilities (also at a remote location) to connect these lines to a relatively lesser number of "trunks" which couple the remote switching unit or remote "concentrator" to the central office. The advantage which inheres in this type of arrangement is compelling and obvious. In short, the use of line concentration precludes the necessity for extending each line from the subscriber's substation directly to the central office. Heretofore this was the inexorable rule. But in order to place the practice of remote line concentration in the proper historical perspective, it is significant to realize that concentration as such has been practiced in telephone offices since the growth of automatic switching systems and, in fact, even prior thereto.

From the earliest central offices the lines which were connected and terminated at the offices were not provided with fully individual equipment at the central office. Instead, the subscribers shared common intraoffice paths, interoffice paths, and common equipment in the central office. Indeed, concentration, as such, began when it was found impracticable to connect every subscriber to every other subscriber.

Since the development of remote line concentration a number of different types of concentrators have been developed. In the present instance the invention concerned relates to the so-called "universal" type of line concentrator. These concentrators have by nature a degree of universality which permits them to be connected to the more prevalent or conventional type switching systems. In essence, the universal concentrator resembles, on gross examination, two triangular-shaped formations in which lines are connected to the bases and the apices are coupled to each other by concentrator trunks. Each of the triangles includes switching equipment for connecting, in the case of the remotely located triangle, substation lines to the concentrator trunks. The remaining triangular configuration is disposed at the central office and is similarly adapted to connect the incoming concentrator trunks coupled to the apex over switching networks to subscriber line terminations in the central office.

In short, the lines which emanate from the substations are coupled through a convergent network to a smaller number of trunks at the remote concentrator unit and are re-expanded or deconcentrated by providing connections for the concentrator trunks to an equal number of subscriber line terminations at the central office. The latter terminations are each individual to a particular subscriber's line.

One of the significant criteria in determining the usefulness and desirability of a telephone line concentrator is the facility with which it may be coupled to the existing central office equipment. Since the investment in present telephone plant is immense, any substantial modification to existing telephone office equipment, in order to permit connection of line concentrators, would probably be prohibitive. Thus it is essential in providing telephone line concentrators of the universal type to reduce to a minimum any disruption or invasion of existing telephone office equipment.

In fact, the measure of an optimum type of concentrator installation is the extent to which the central office plant to which it is connected remains unaware that the lines with which it is dealing are concentrated lines rather than direct-connected lines.

It will be seen, however, that implementation of universal line concentrators, although highly desirable in view of the advantages enumerated, carries with it a number of significant problems which are rooted in the new technology.

Thus the fact that the central office is "unaware" of the existence of the concentration of the lines terminated thereat and the fact that no substantial modification of the office equipment is made to process the concentrator calls has given rise to the problem that on certain types of concentrator calls the central office equipment lacks the intelligence to perform a number of vital functions. For example, in a universal line concentrator which employs so-called magnetic latching crossbar facilities of the type described in an article entitled "Magnetic Latching Crossbar Switches" in the Bell System Technical Journal, September 1960 at page 1351, a unique and difficult problem is presented.

It may be assumed at the outset that a call has been completed through a concentrator using magnetic latching crossbar switches. Those switches having once operated remain in the operated condition without the necessity of additional power supply. This, of course, is advantageous and the benefits of magnetic latching have even been extended to the line and cut-off relays at the concentrator location. As a result, the latter equipment once operated also remains in that condition without additional power drain.

To comprehend the difficulties involved, it must be recognized that the functional arrangement of switching facilities in the central office and concentrator equipment is somewhat unorthodox in the case of a telephone line concentrator using the so-called "delayed disconnect" feature.

Thus in this type of concentrator when a conversation has been terminated over a path extended through the concentrator which includes illustratively the remote crossbar (concentrating) unit and the local (deconcentrating or control unit) cross-bar network, the line is not automatically and immediately disconnected from the concentrator trunk, but instead will remain connected thereto until the trunk itself is required to be disconnected in order to be available for other calls. Under these conditions, where a concentrated line remains "cut through" and connected to the concentrator trunk, the equipment includes a remote unit line relay or line circuit which remains divorced from the line loop by the contacts of the associated cut-off relay although the switchhook contacts are opened in view of the return of the receiver to its cradle. A path may therefore be traced from the subscriber substation over the loop, through the remote unit crosspoint, over the trunk to the control unit at the central office, and over the control unit crosspoint to the line termination in the control unit unique to the substation line.

Viewed in its proper context, this is equivalent to a direct connection to the line as though the concentrator were not interposed. The path may be further traced from the line termination at the control unit to the line termination in the central office to which the line would have been connected if, indeed, a direct connection were made to the line.

At this line termination, the central office line and cut-off relays will now be observed to reflect a condition opposite to that of the line and cut-off relays in the concentrator unit. Thus the cut-off relay at the conventional line circuit in the central office will have its contacts closed in order to permit the central office line relay to act as a sensor or scanner of the line condition. Since a complete path now extends directly to the subscriber substation the line circuit at the central office is capable of interpreting and reacting to signals on the subscriber's line directly over the concentrator path. This accounts for the fact that the corresponding sensory device (the line relay at the remote unit) is disabled by the cut-off relays.

It is in part for this reason that the identification of a line to be disconnected when magnetically latched cut-off relays are utilized assumes crucial significance.

Since the only means of receiving intelligence from the line which remains connected to the trunk is over the conventional line circuit within the existing telephone office, a mere disconnection of the trunk which couples the substation line to its line circuit in the central office would serve to wholly isolate the line from the office and prevent any intelligence from arriving over the trunk path. Moreover, since, as indicated above, the usual sensory equipment in the line circuit has been indefinitely disabled as a result of the magnetically latched cut-off relays, the subscriber who was previously connected to the trunk would have a completely "dead" line.

It will be seen therefore that when an effort is made after the completion of a call to disconnect the line from the trunk in order to make it available for subsequent users, the problem of identifying the line to be disconnected is presented. This may seem like an anomalous problem since the trunk at the central office is known and presumably the line may be disconnected when the trunk is disconnected. Instead, when the trunk is released, by releasing the appropriate trunk hold magnets at the respective crossbar networks, the line is not returned to service. This is a result of the fact that the cut-off relay for the line remains magnetically latched even when the trunk path is disconnected therefrom by releasing the crosspoints in the respective crossbar networks. It, therefore, remains to identify the specific line to which the trunk was connected in order to take the necessary steps for individually releasing the cut-off relay at the remote unit to restore the line to a service access condition.

This entire problem is also grounded in the desirability of continuing lines which have been connected to trunks in the connected condition even after conversation has been completed, i.e., "delayed disconnect."

Particularly in the case of telephone line concentrators, there is an inherently sound reason for continuing the connection of the line to the trunk after the conversation has been completed and until the trunk is required for service by another line. Thus, if a fixed number of trunks are arranged to remain connected to a corresponding number of lines at all times, then those lines are in effect and in fact directly connected from the substations to the corresponding conventional line terminations at the central office (through the respective remote and control unit crossbar networks).

Therefore, if a complete and total failure of the concentrator equipment should occur those lines which are in the connected condition through the concentrator may remain so and can originate calls through the concentrator and receive terminating calls through the concentrator—although the concentrator is entirely out of service.

Thus the advantages which reside in the delayed disconnect facility and in the benefits which derive from magnetic latching present the problem of deciding which line was connected to the trunk when release is required.

In summary, certain universal line concentrators include at the remote unit a sensory device or line relay to observe the service condition of the line in a manner similar to conventional telephone central office line relays. In addition, the remote unit also includes cut-off relays for isolating the line relays or line circuits from the line during a conversation connection to provide a "clean" tip and ring.

When magnetic latching of the cut-off relays is employed together with delayed disconnect, the problem of restoring the cut-off relay at the remote unit, when the trunk to which the respective line has been connected is released, presents a challenging problem. This follows since as a result of the delayed disconnect feature the cut-off relay at the remote unit remains in a released condition, i.e., it isolates the line circuit or line relay from the subscriber loop. Thus when the trunk is released and the crosspoints in the concentrator network are open the line will remain out of service in view of the magnetically latched character of the cut-off relay. Since the line loop is no longer connected to the office over the trunk which has been released and since the line will be completely isolated in view of the divorcement of the line from the line circuit by the cut-off relay, it is essential to operate the cut-off relay and restore the line circuit to the line.

Moreover, in the case of such a concentrator it now becomes necessary to identify the line to which the trunk which is to be released is connected in order to establish which cut-off relay is to be actuated. This too is a significant technical problem since no record is kept of which specific lines are connected to trunks.

It is, therefore, an object of this invention to provide for identification of lines when it is necessary to disconnect a line from a trunk.

Another object of this invention is to arrange for the disconnection identification only when a predetermined number of lines are already "cut through" the concentrator.

Still another object of this invention is to provide for a disconnect identification arrangement which is simple and inexpensive.

Still another object of this invention is to provide information identifying a line to be disconnected at a remote concentrator unit wherein the line is equipped with a magnetically latching line and cut-off relays.

Still another object of this invention is to provide for the identification of a line requiring disconnection from a trunk through the cooperation of facilities used in identifying a called line of a terminating call.

A further object of this invention is to provide for identifying a call to be disconnected when the necessity arises in a universal telephone line concentrator having crossbar switching networks.

Another object of this invention is to provide for identification of a line requiring disconnection at the control network of a line concentrator and for transmitting information designating the line identification to the remote unit.

These and other objects and features of the invention are achieved in an arrangement which employs a universal line concentrator having a remote unit to which the substation lines are connected and a plurality of concentrator trunks connected to the remote unit for coupling that unit to a corresponding concentrator control unit disposed at the central office.

In essence, the remote unit is a converging facility for connecting a larger number of substation lines to a smaller number of concentrator trunks through a crossbar switching network having magnetic latching hold magnets.

The control unit at the central office is in effect complementary to the remote unit and provides a generally diverging (re-expanding or deconcentrating) facility in which the relatively smaller number of concentrator lines are capable of being switched through a similar crossbar network to a number of line terminations equal in number to the substation lines. These terminations in the control unit are then individually connected to an equal number of terminations in the central office. The latter terminations in the central office are in fact the existing conventional telephone line circuits to which the lines would be connected if actual direct connections where made in lieu of connections through the telephone line concentrator.

The magnetic latching quality is also employed at the remote concentrator unit in the line relays and cut-off relays which are individual to each line and serve in the classical manner.

At the control unit a sleeve relay individual to each line and a cut-off relay which is also magnetically latching likewise function generally in the traditional manner.

Ordinarily the programming of the concentrator unit is arranged in order that a predetermined number of trunks remain in the "cut-through" condition or connected to those lines over which conversation paths had been previously completed. These trunks will remain thus connected until a predetermined number of trunks are established in the "cut-through" condition. Thus, illustratively, when five or more trunks in a particular group are cut through, sufficient trunks will be released as are required to leave four in a group to remain in the cut-through condition. Thus a disconnect "order" or "call" will be initiated when (1) the hold magnet of the trunk selected for release is operated indicating that the trunk is cut through the concentrator, (2) the trunk busy relay is normal indicating that no conversation or call is in progress over the trunk, and (3) the trunk load control relay is operated indicating that more than four trunks are in the cut-through condition.

After selecting a trunk to be disconnected—and the selection is made in order of a predetermined preference—it is necessary as adverted to above to identify the line to which the trunk has been connected in order to release the magnetically latched cut-off relays of the line.

It is apparent under these conditions that merely releasing the hold magnets which cut the trunk through the concentrator crossbar networks is an inadequate disconnection. This follows since the line to which the trunk was connected has its cut-off relay operated and will remain completely locked out of service until the cut-off relay is restored.

It is helpful in this context to appreciate that a line relay in its usual role is bridged across a telephone line loop, when the line is in the idle condition, as, or in the nature of, a "scanning" device. As a result, when the subscriber lifts his receiver and the switchhook contacts are operated, the line relay being in shunt with the line is likewise operated to initiate the functioning of the appropriate common control or other equipment necessary to service the call when the subscriber is originating. It follows, therefore, that this shunt or bridge on the line, due to the line relay, should be removed when the call has been extended to the called party in order to provide the desired "clean" tip and ring.

Thus the function of the "cut-off" relay is to divorce the line circuit for which the line relay serves as a sensor from the substation line when a call is in progress and is cut through the switching equipment. It is obvious, therefore, that the cut-off relay isolates the line from its sensory device and if the cut-off relay divorces the line from the line circuit when the switching equipment is released the line is totally isolated from any communication with the office. Consequently, it is essential to restore the cut-off relay in the present instance in order to permit the line to have access to the line relay which can sense originating calls.

In brief, the identification of the line which was connected to the trunk in order to permit release of the associated magnetically latched cut-off relay is achieved after the trunk which is to be disconnected has been selected. This involves applying a reference or ground potential to the sleeve lead which thereupon is extended through the operated sleeve crosspoints in the crossbar network at the control unit and through the winding of the above-referred-to sleeve relay to operate that relay. Operation of the sleeve relay is then arranged to initiate a sequence of functions which are analogous to those which would have occurred if a legitimate terminating call were in progress.

In a terminating call, operation of the sleeve relay of a line in the control unit can be used to identify the line exclusively since the sleeve relay is individual to the line. Thus when a call has been made through a central office to a called line, ultimately a connection is extended through the conventional central office equipment to the line termnation in the central office, i.e., the terminals at which the substation loop would have been terminated if the line were directly connected to the central office. From these terminals, and in particular from the sleeve terminal, a connection is extended to a sleeve relay in the concentrator control unit. This sleeve relay then uniquely identifies the line and through appropriate cross-connections may be used to operate chains of other relays to provide a suitable coded identification.

When the latter identification relays are operated, signal relays responsve to the said identification are operated to transmit the identification of the line to the remote unit. Signals are then transmitted over the trunk to release the cut-off relay at the remote unit and to release the magnetically latched hold magnets at the remote unit and at the control unit thereby releasing the trunk for future service and restoring and releasing the cut-off relays at the remote unit to permit the subscriber to initiate a new connection through the concentrator if require.

A feature of this invention includes facilities for identifying lines to be disconnected in a universal line concentrator.

Another feature of this invention includes arrangements for identifying lines to be disconnected in a switching system wherein the lines cannot be released merely by releasing the trunks to which the calls are connected.

Still another feature of this invention includes facilities for identifying lines to be disconnected in telephone line concentrators using delayed disconnect.

A further feature of this nvention includes structural elements for identifying lines to be disconnected, which facilities are jointly used at least in part to identify lines on a terminating call.

Still another feature of this invention includes the identification of a call to be disconnected through the operation of a sleeve relay unique to the line.

A further feature of this invention includes elements for identifying a line to be disconnected by the application of a reference potential to the trunk over which the line was previously coupled to the central office.

A still further feature of this invention includes arrangements for releasing a magnetically latched cut-off relay associated with a line to be disconnected.

Still another feature of this invention includes arrangements for operating a pair of identification relays associated with the sleeve relay of a particular line to be disconnected.

Yet another feature of this invention includes facilities for transmitting identification of the line to be disconnected to the remote concentrator unit.

A further feature of this invention includes facilities for identifying the line to be disconnected only when the trunk to which the line is to be disconnected is itself required to be disconnected.

These and other objects and features of the invention may be more readily comprehended from the following detailed description, appended claims and attached drawing in which:

Figure 3:
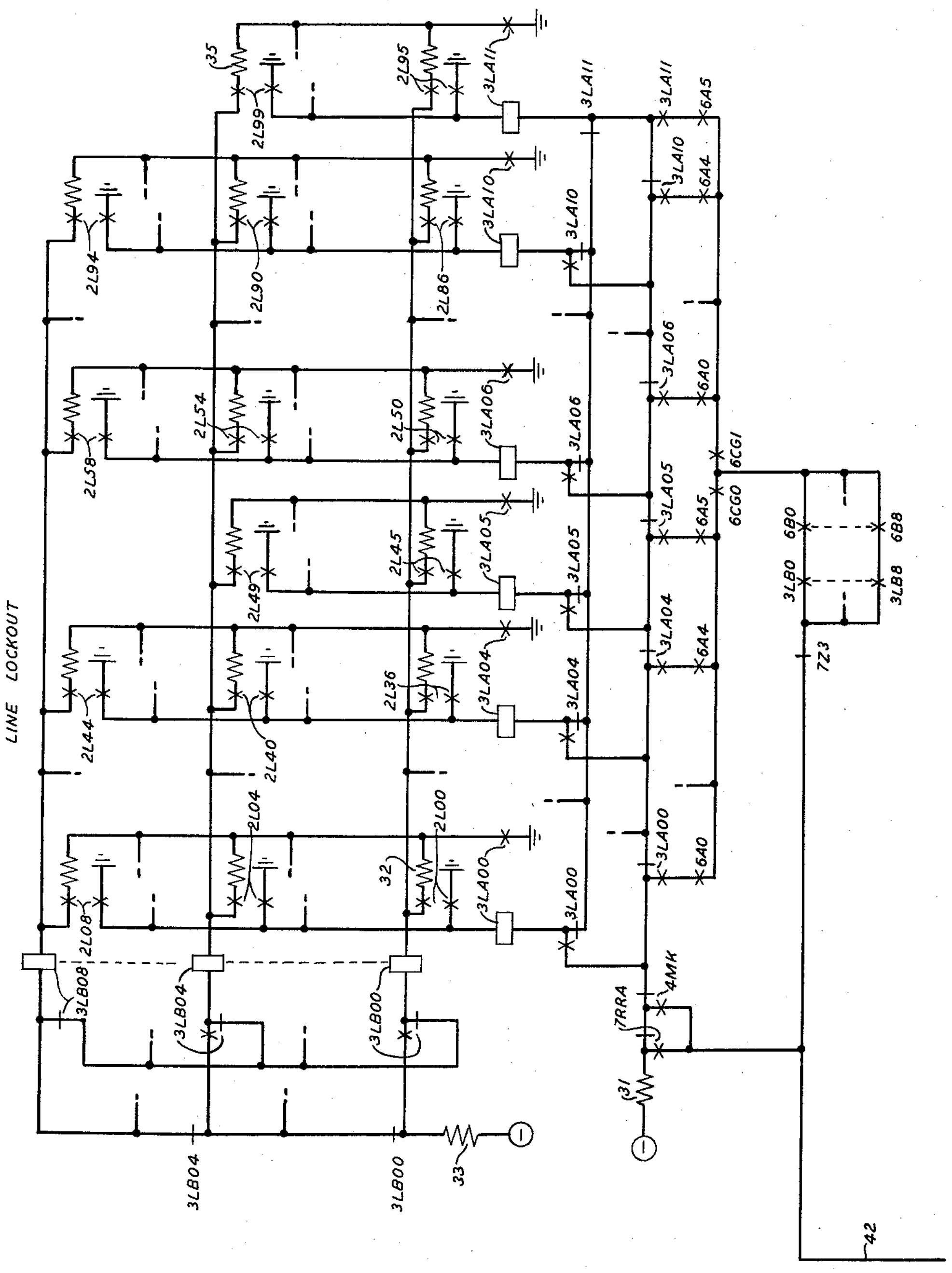
Figure 4:
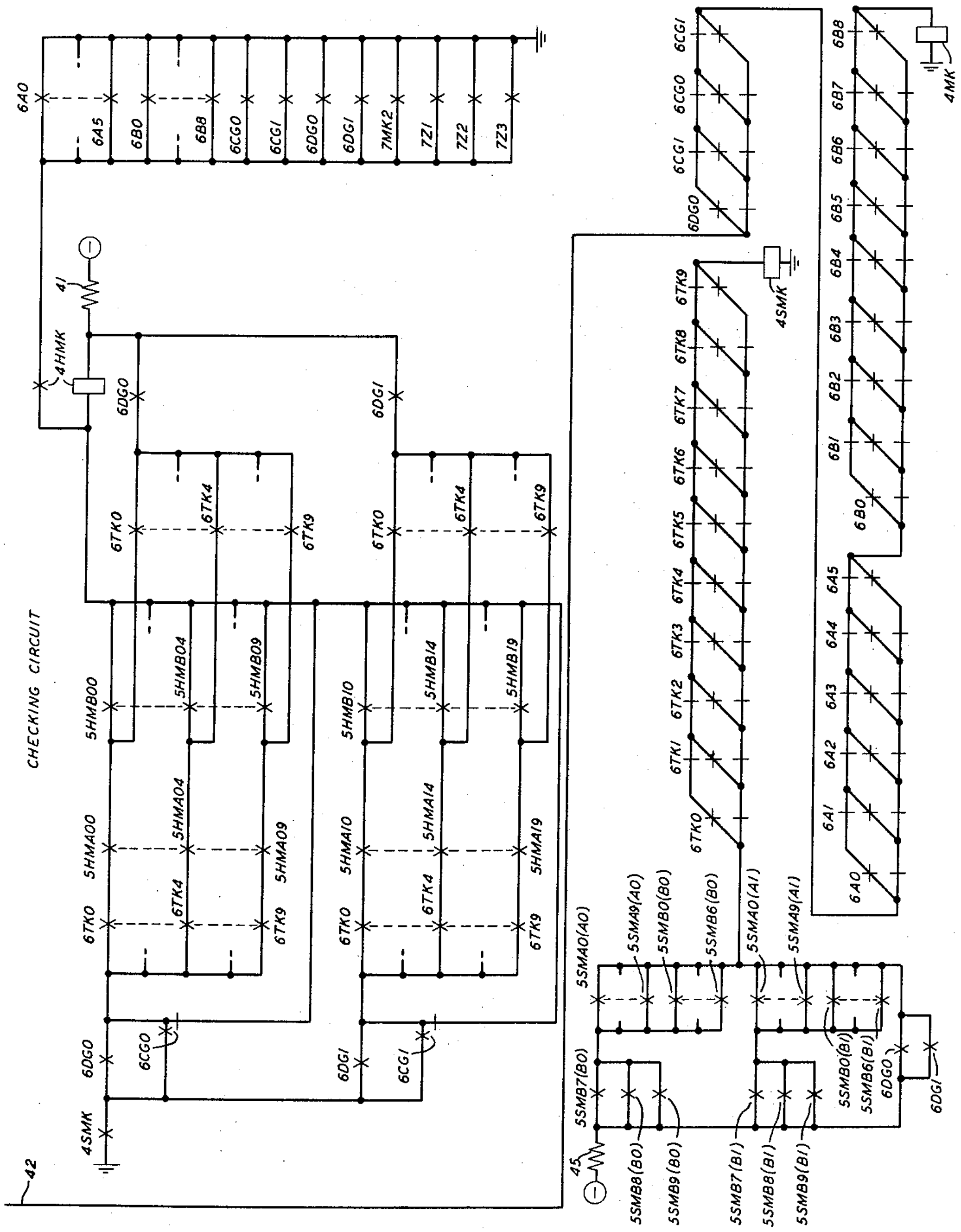
Figure 5:
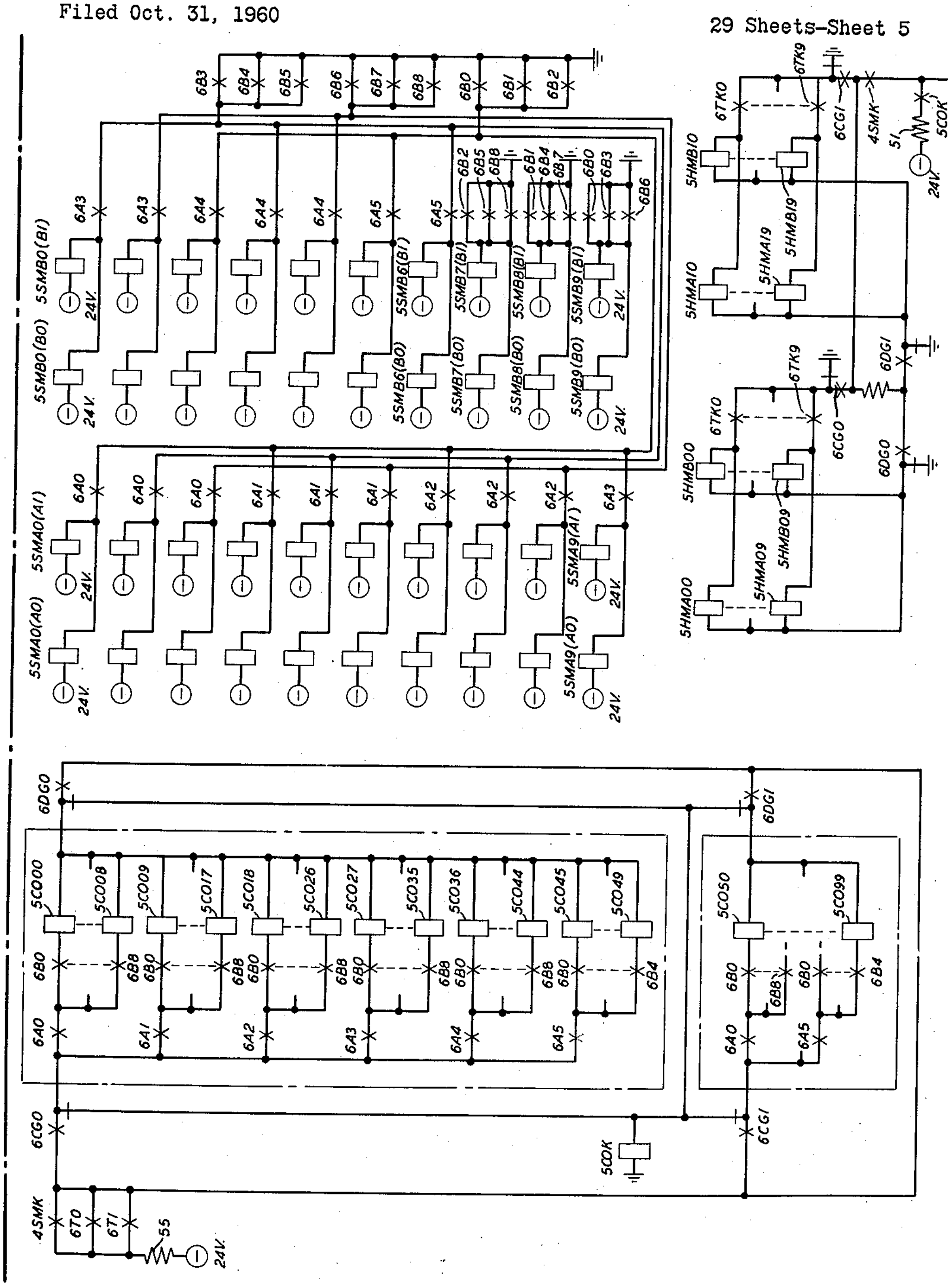
Figure 6:
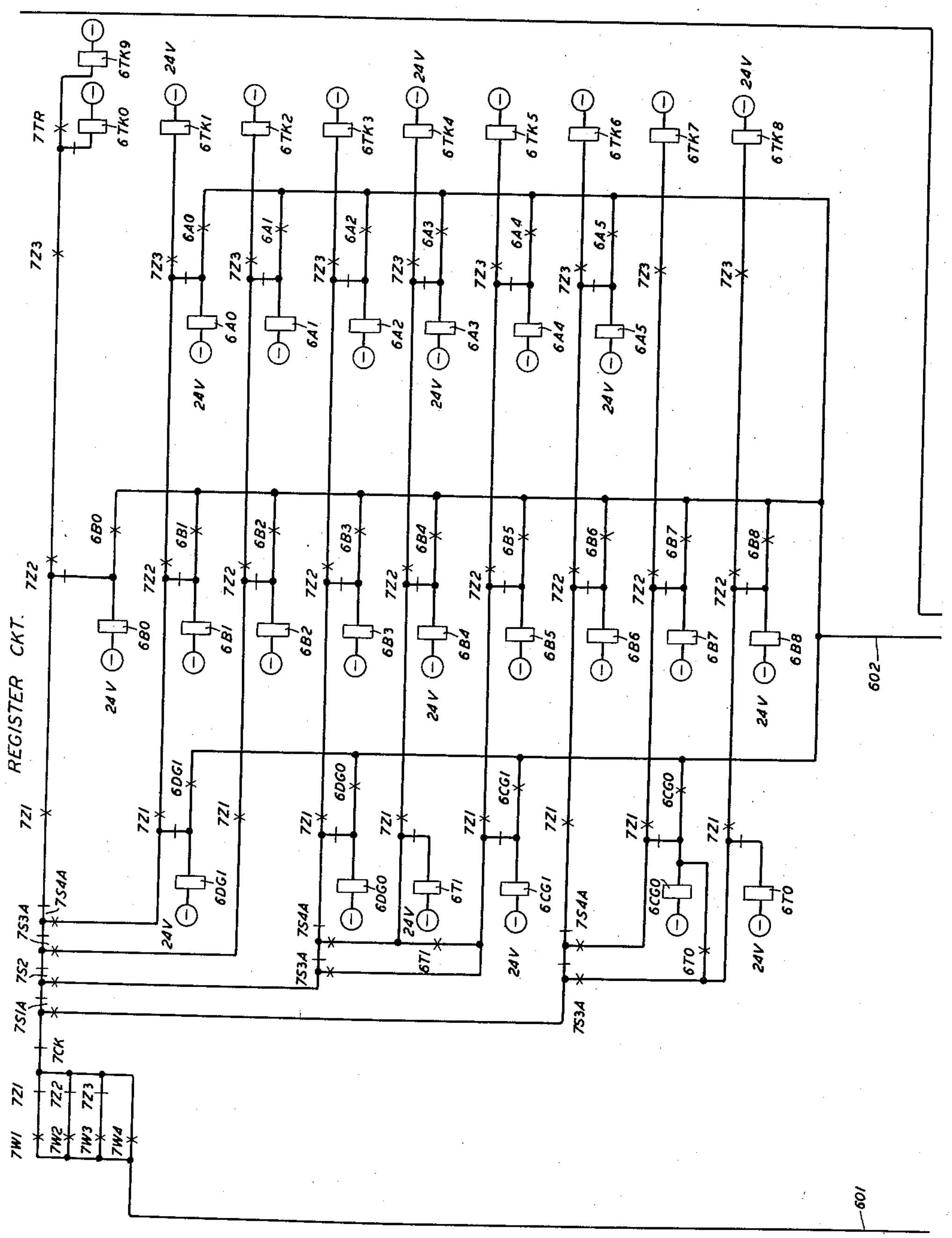
Figure 7:
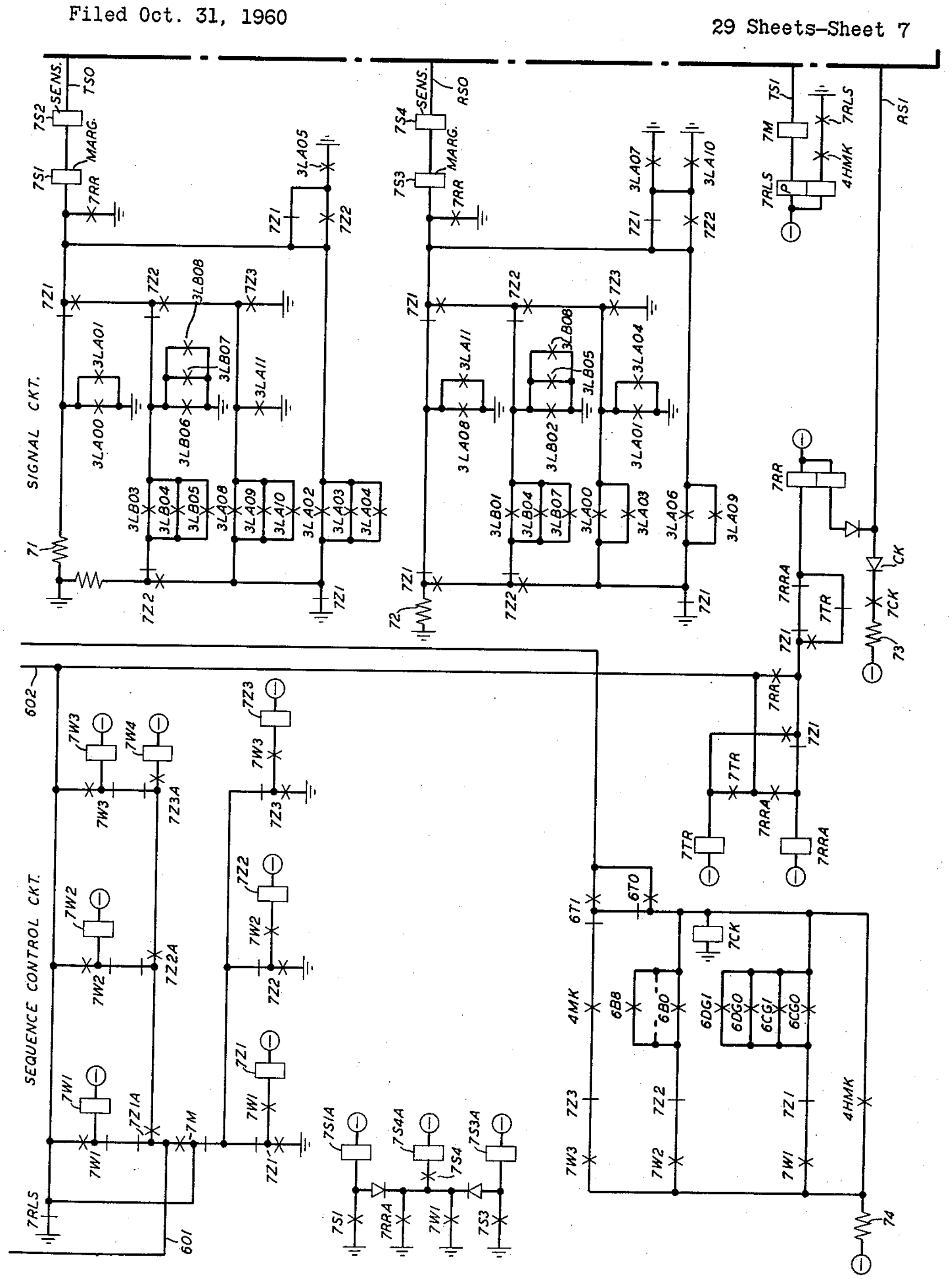
Figure 8:
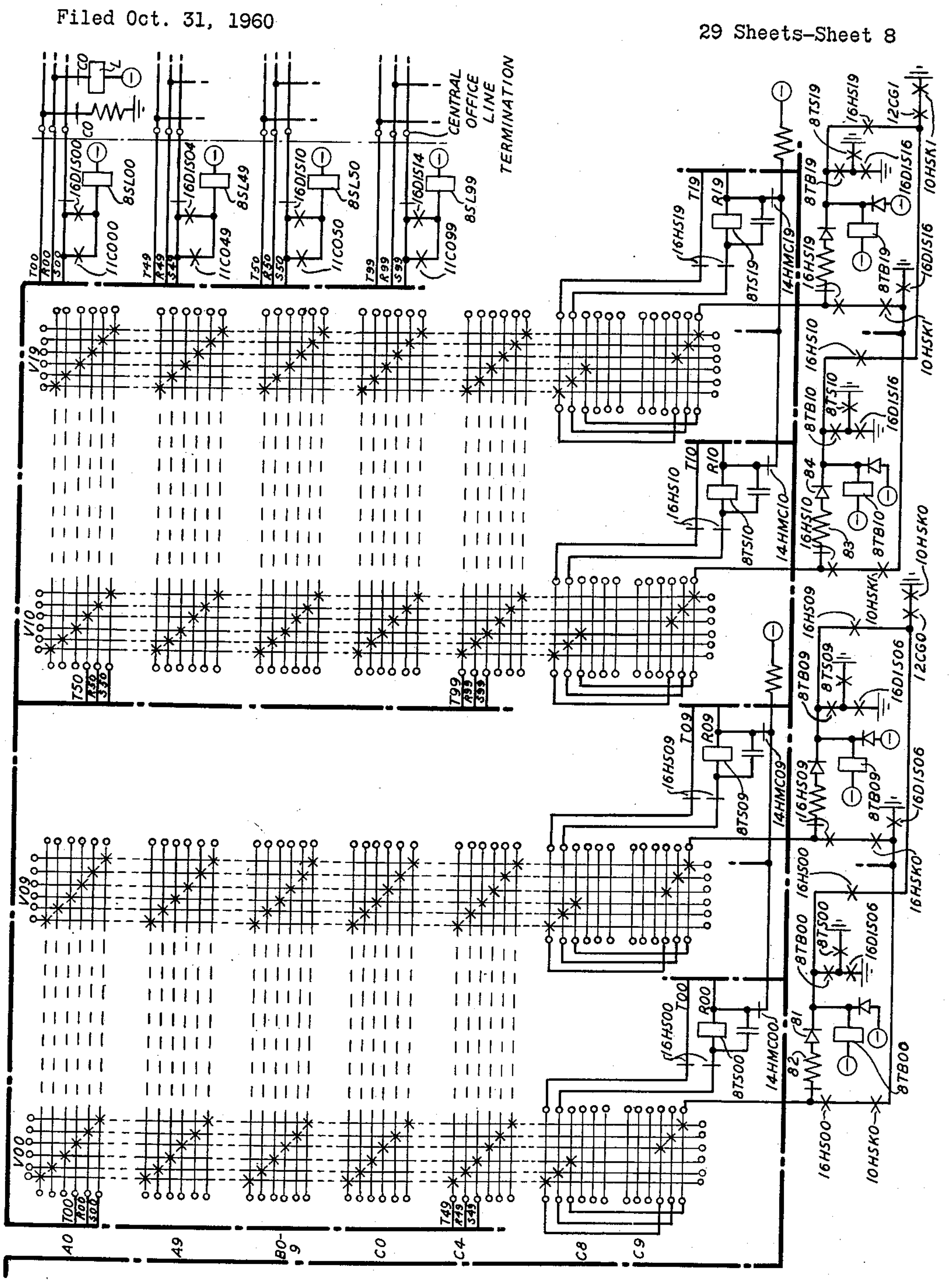
Figure 9:
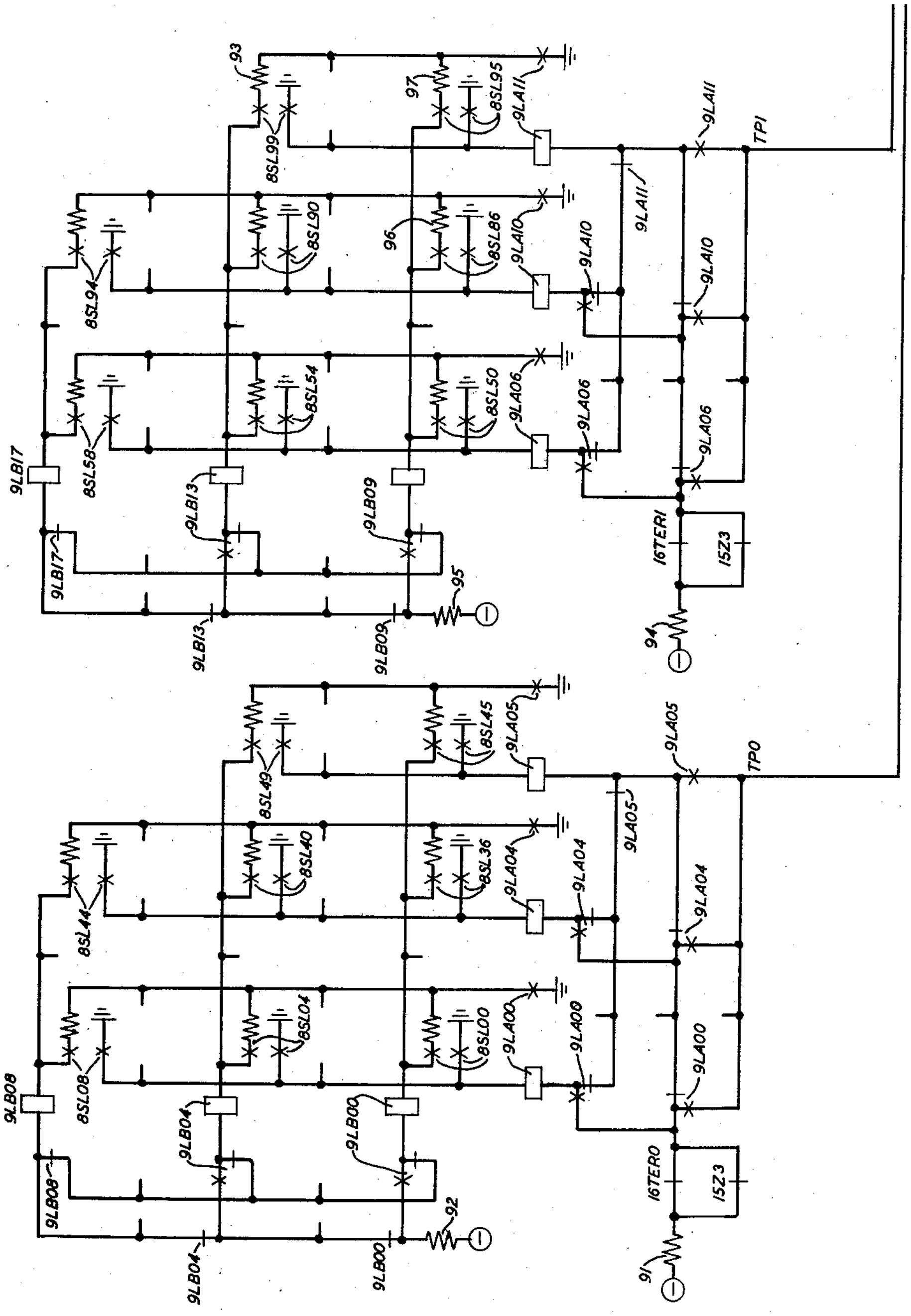
Figure 10:
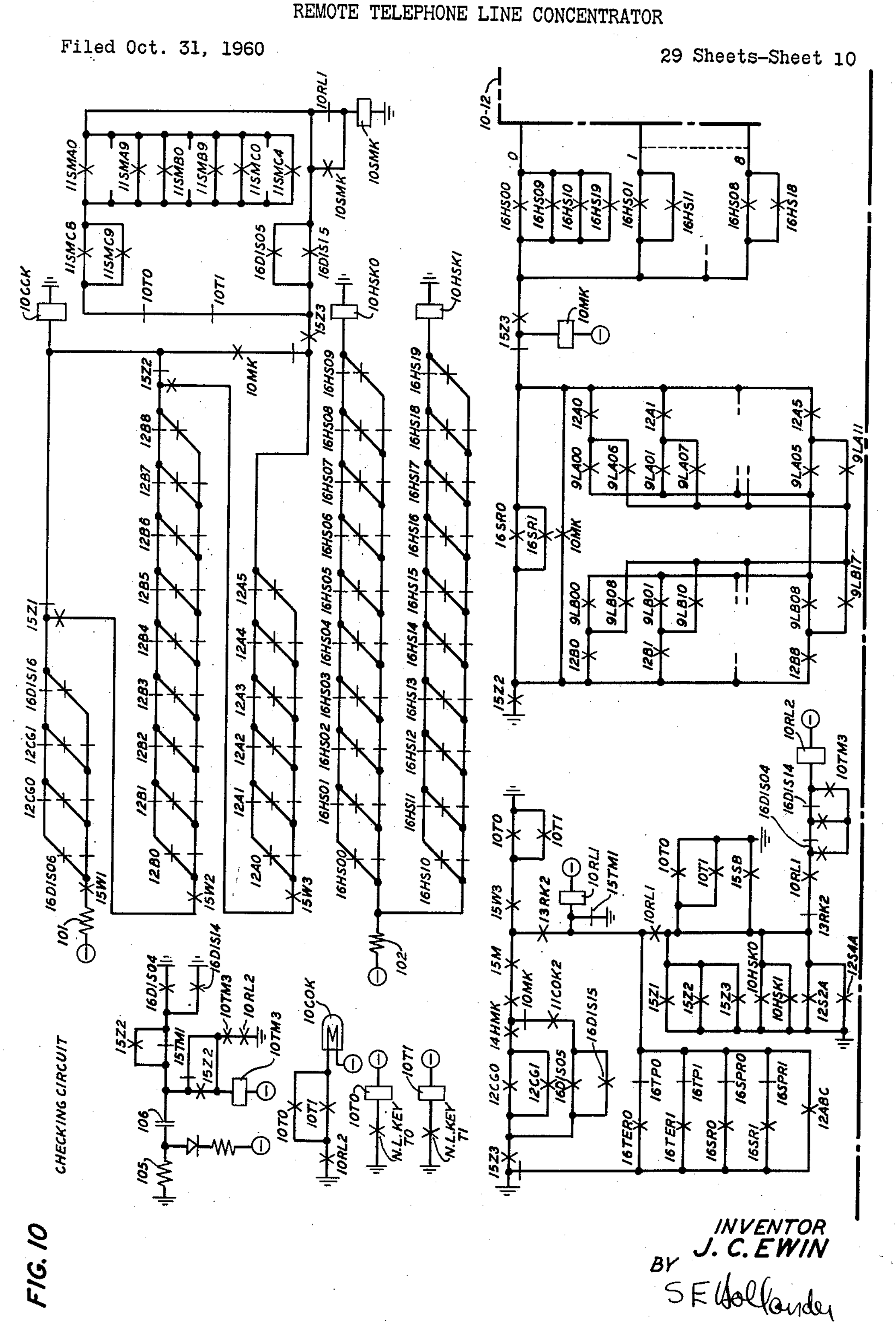
Figure 11:
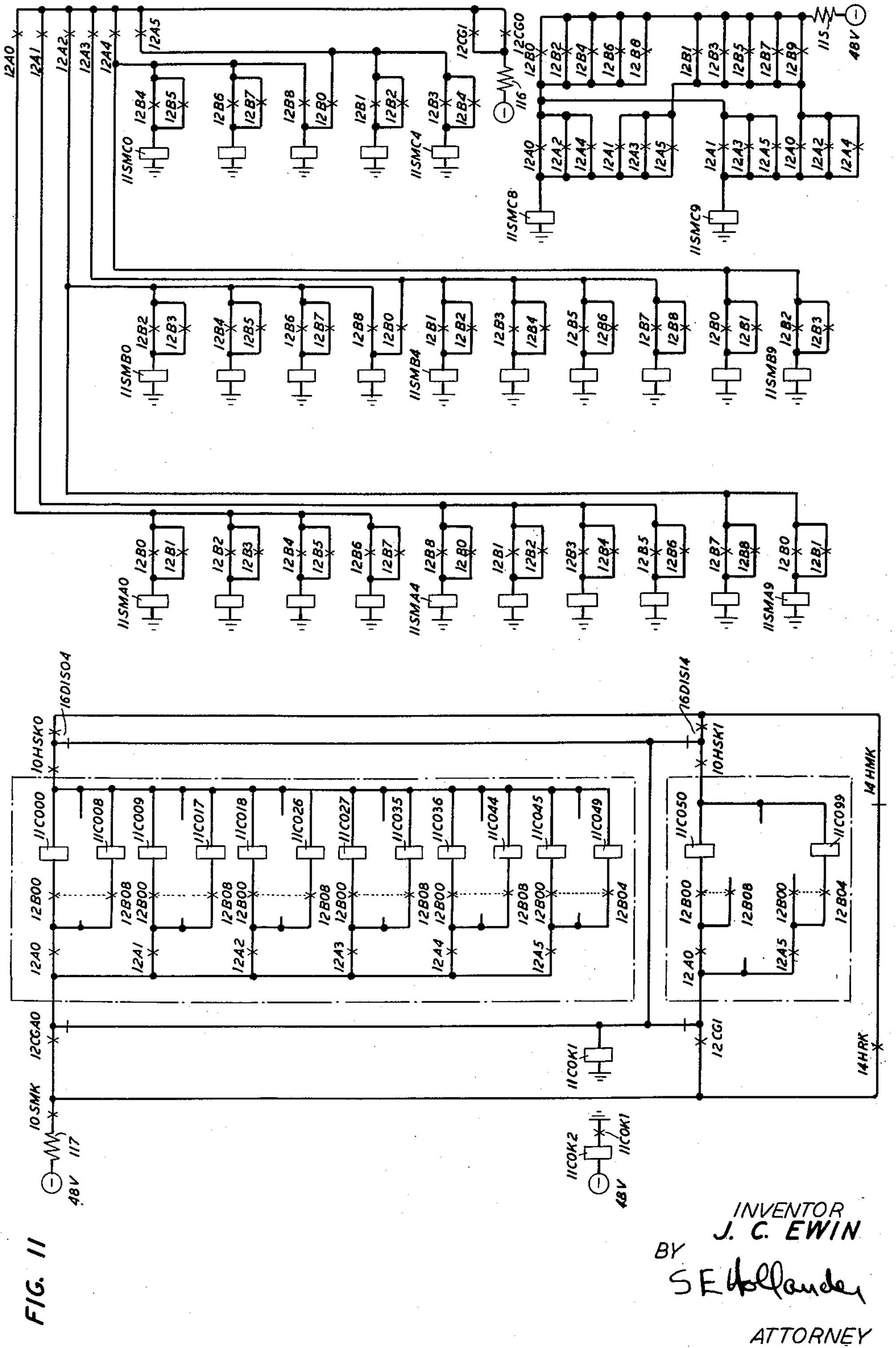
Figure 12:
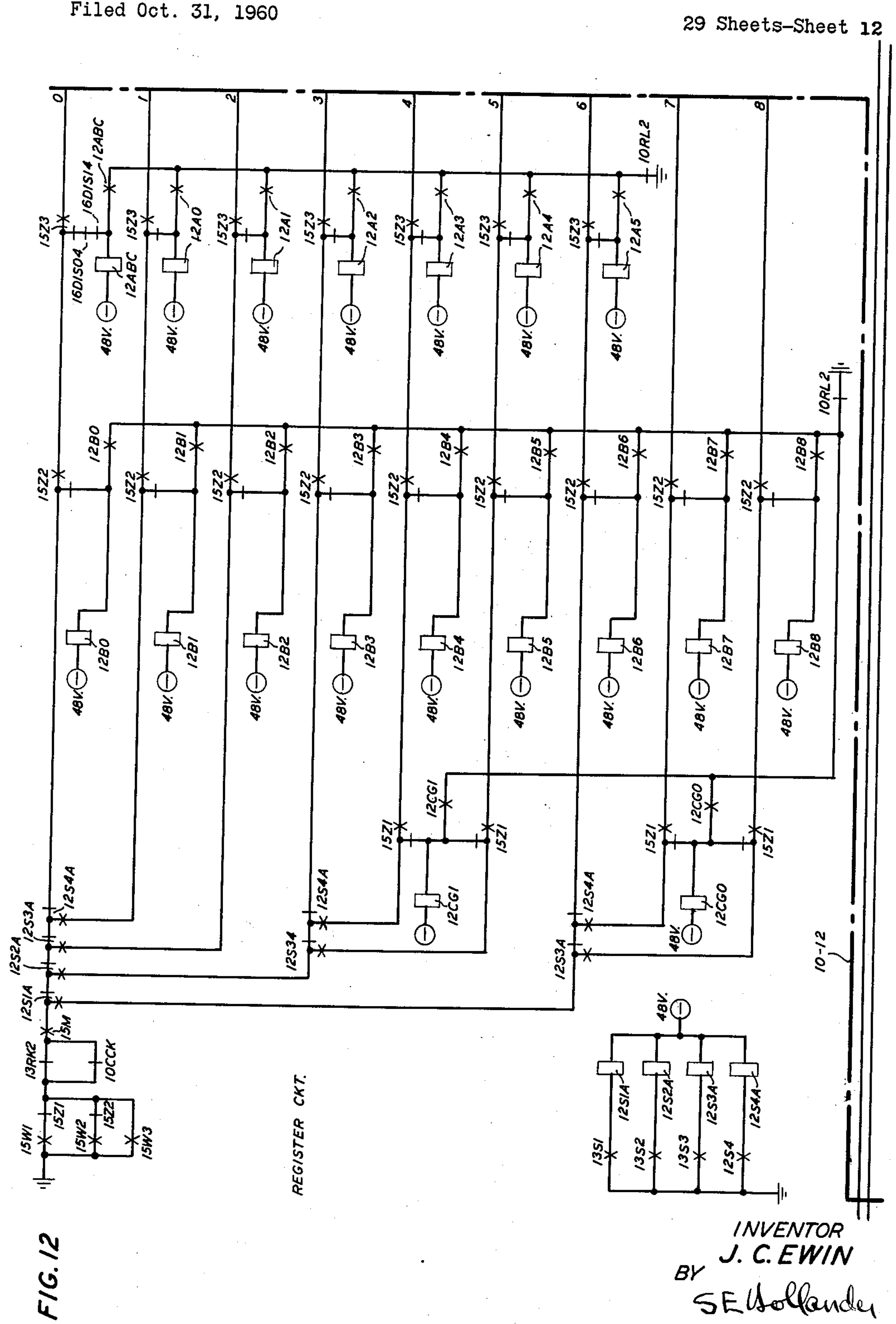
Figure 13:
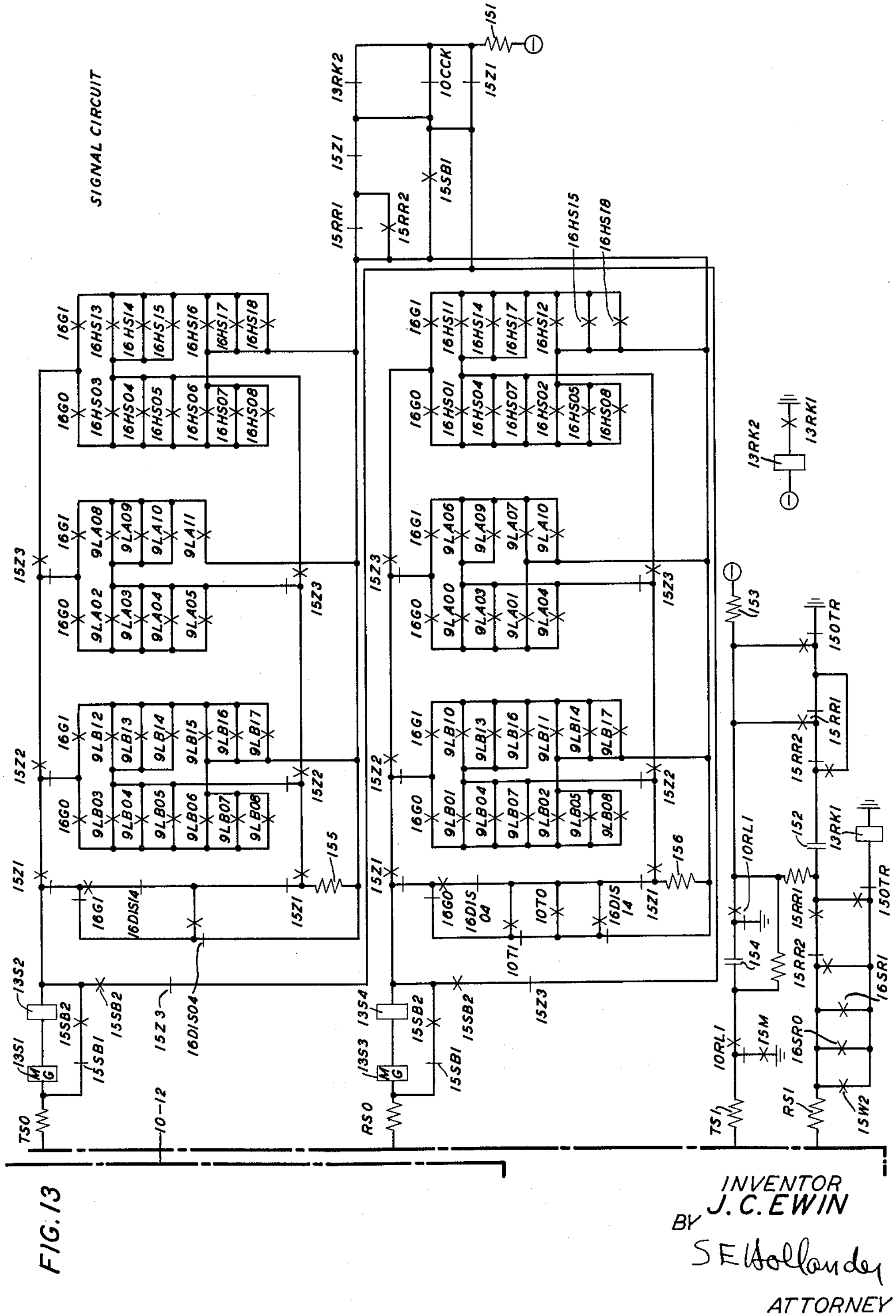
Figure 14:
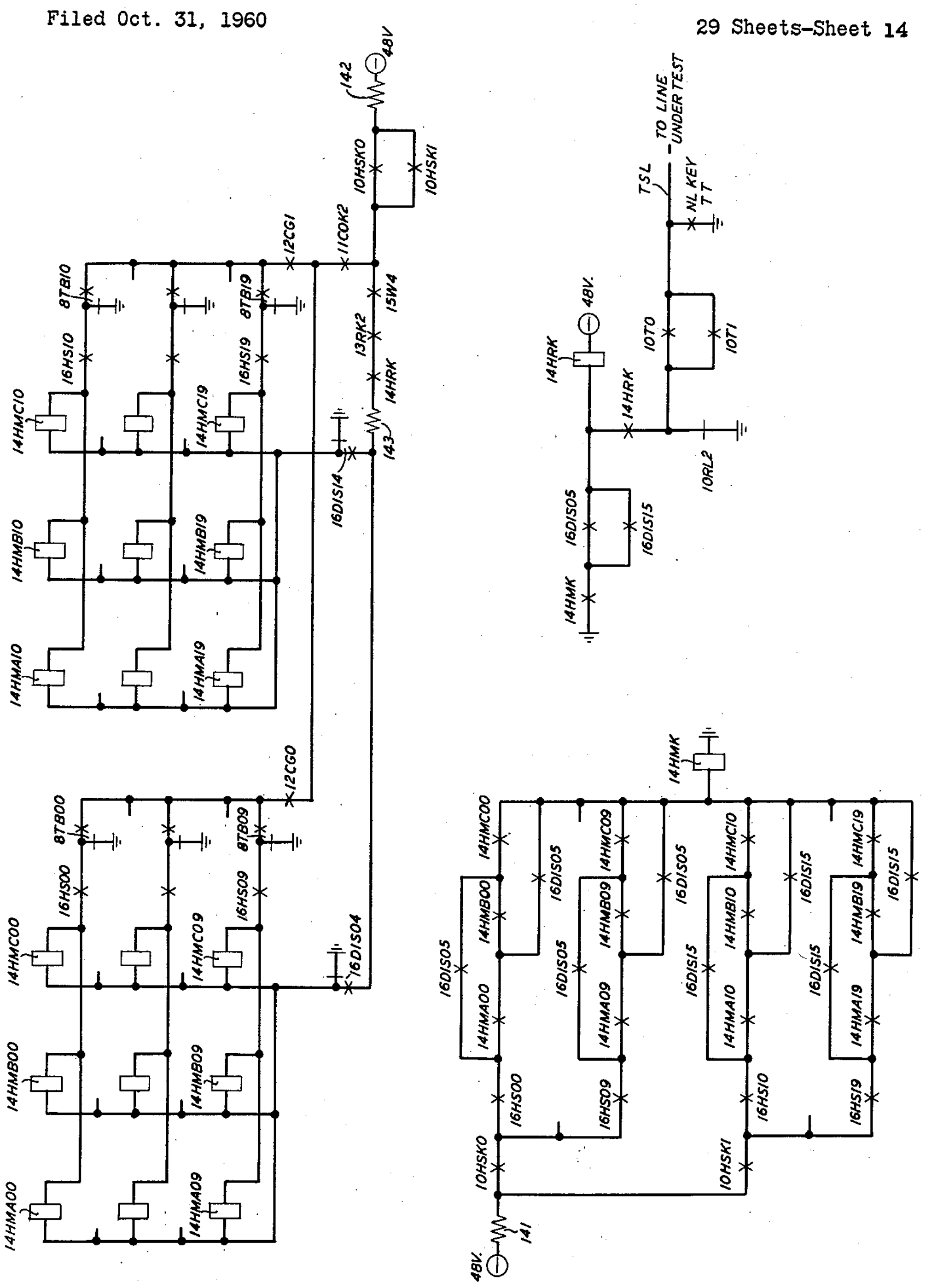
Figure 15:
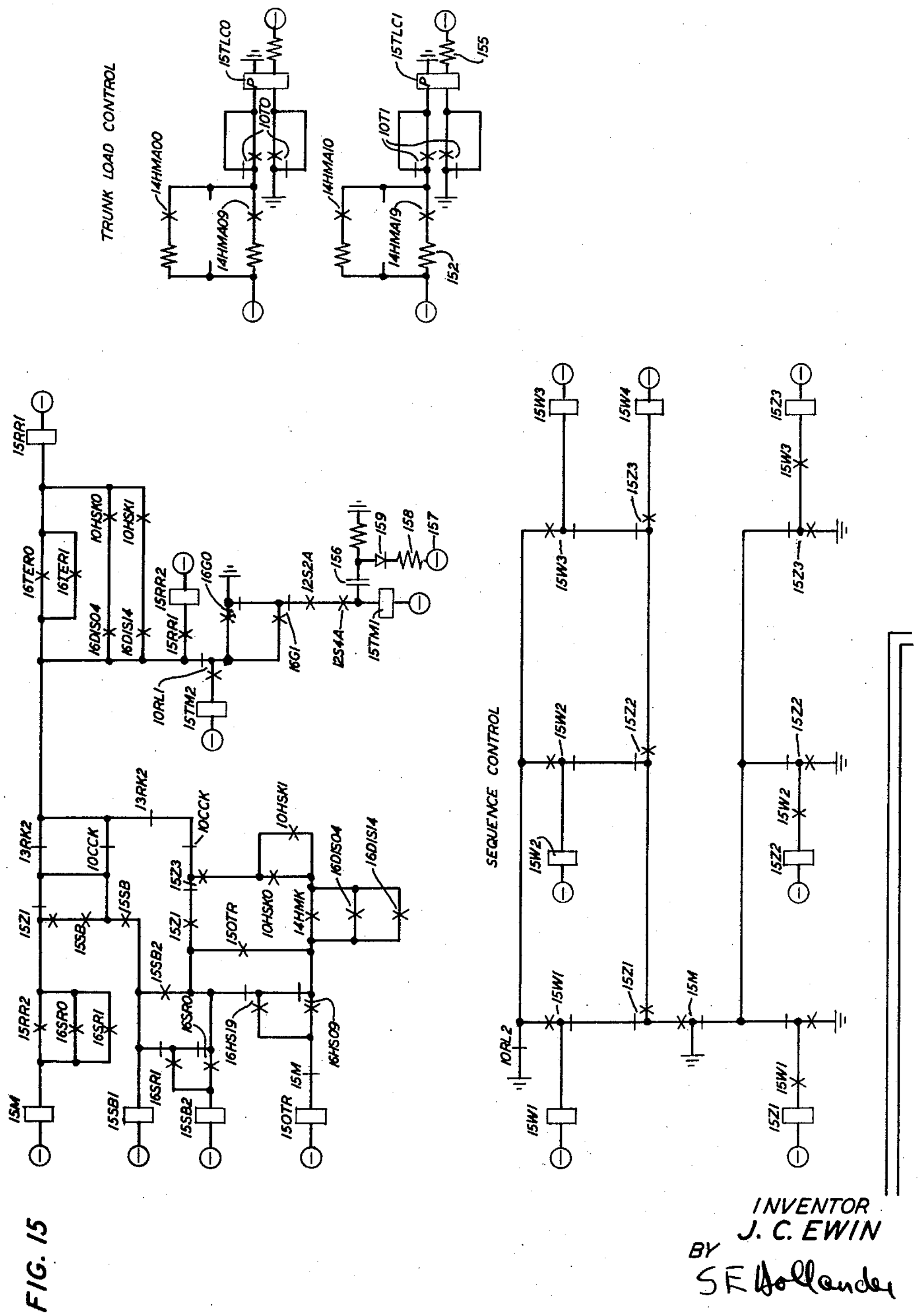
Figures 16, 17:
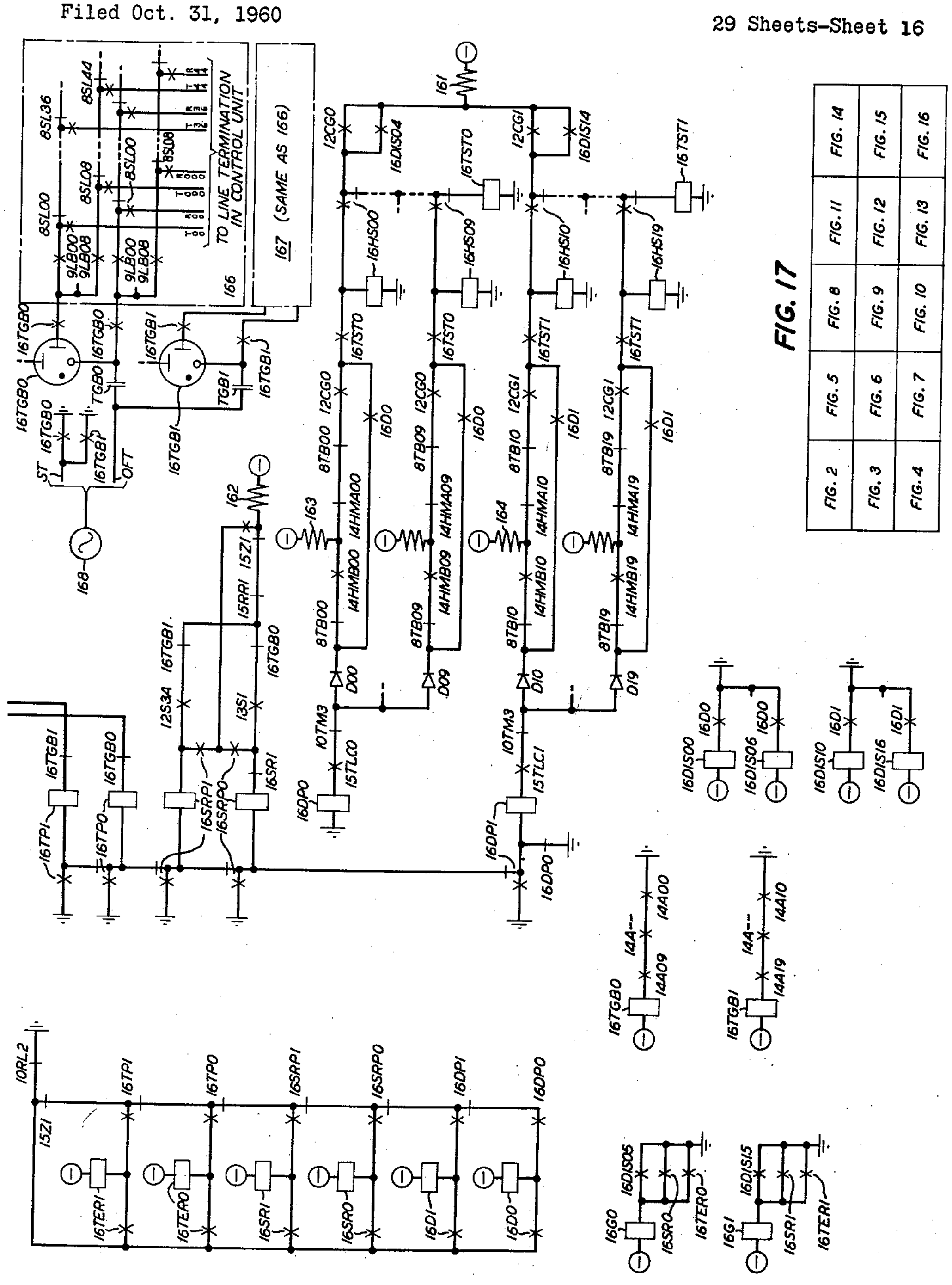
Figure 18:
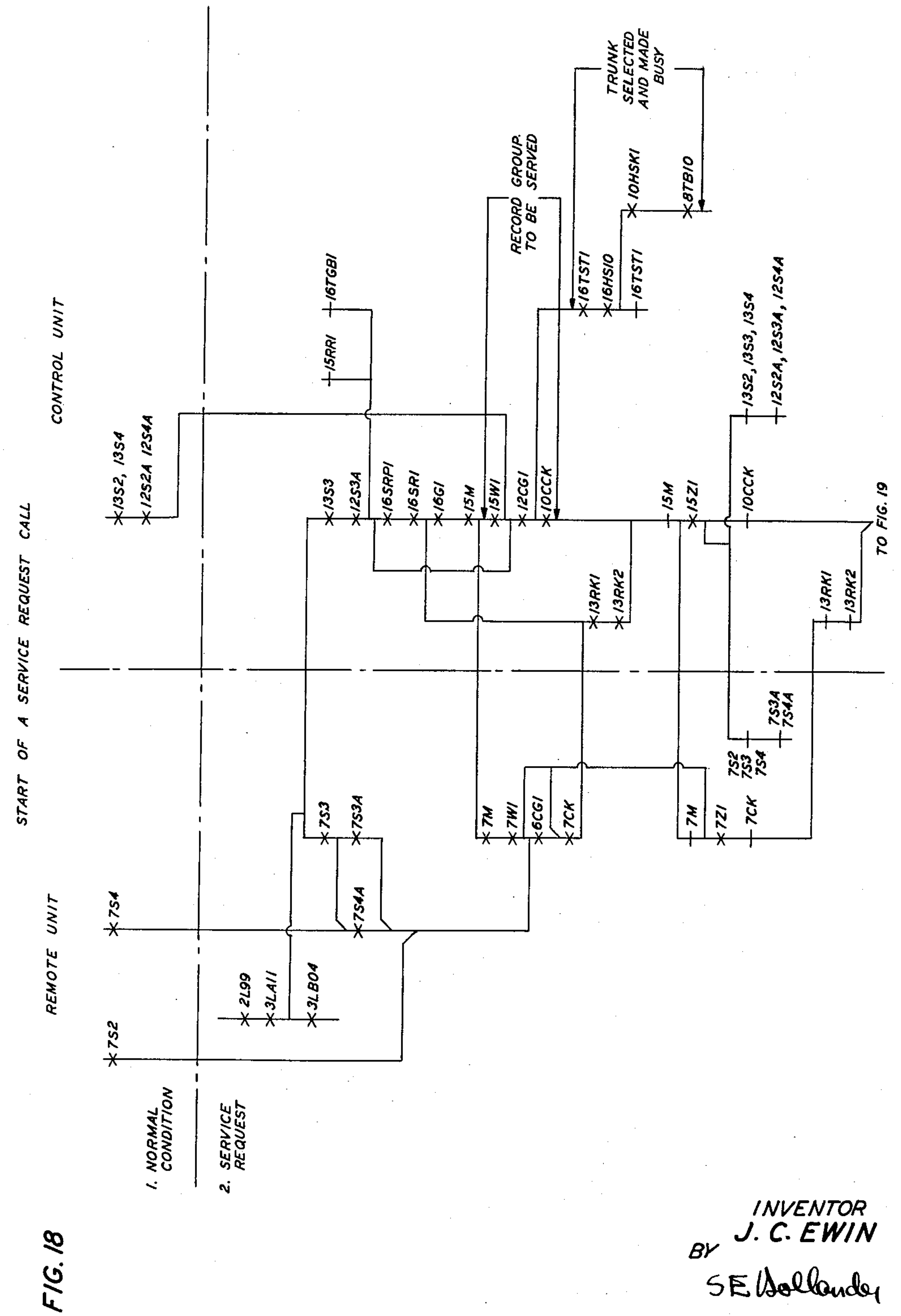
Figure 19:
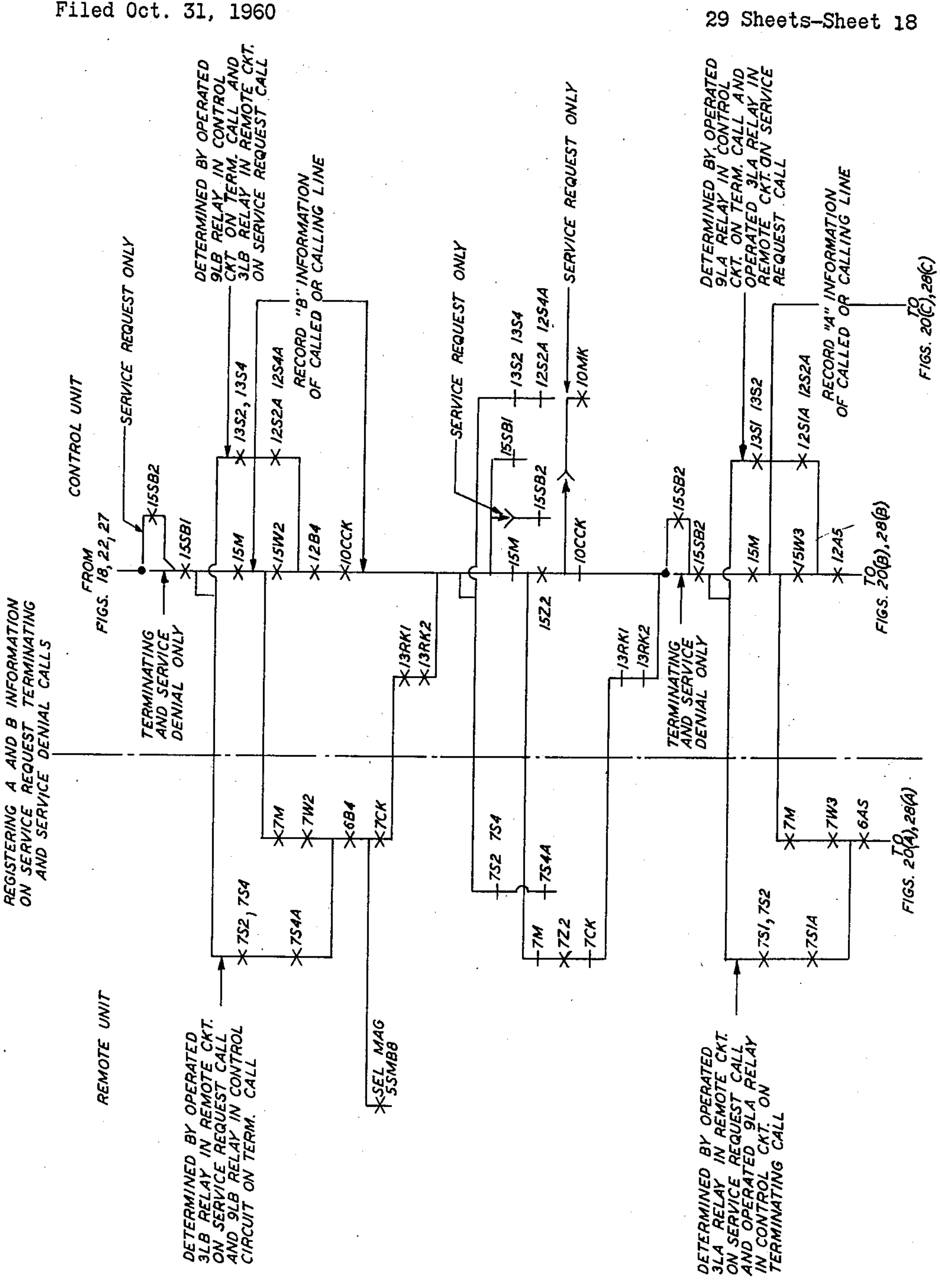
Figure 20:
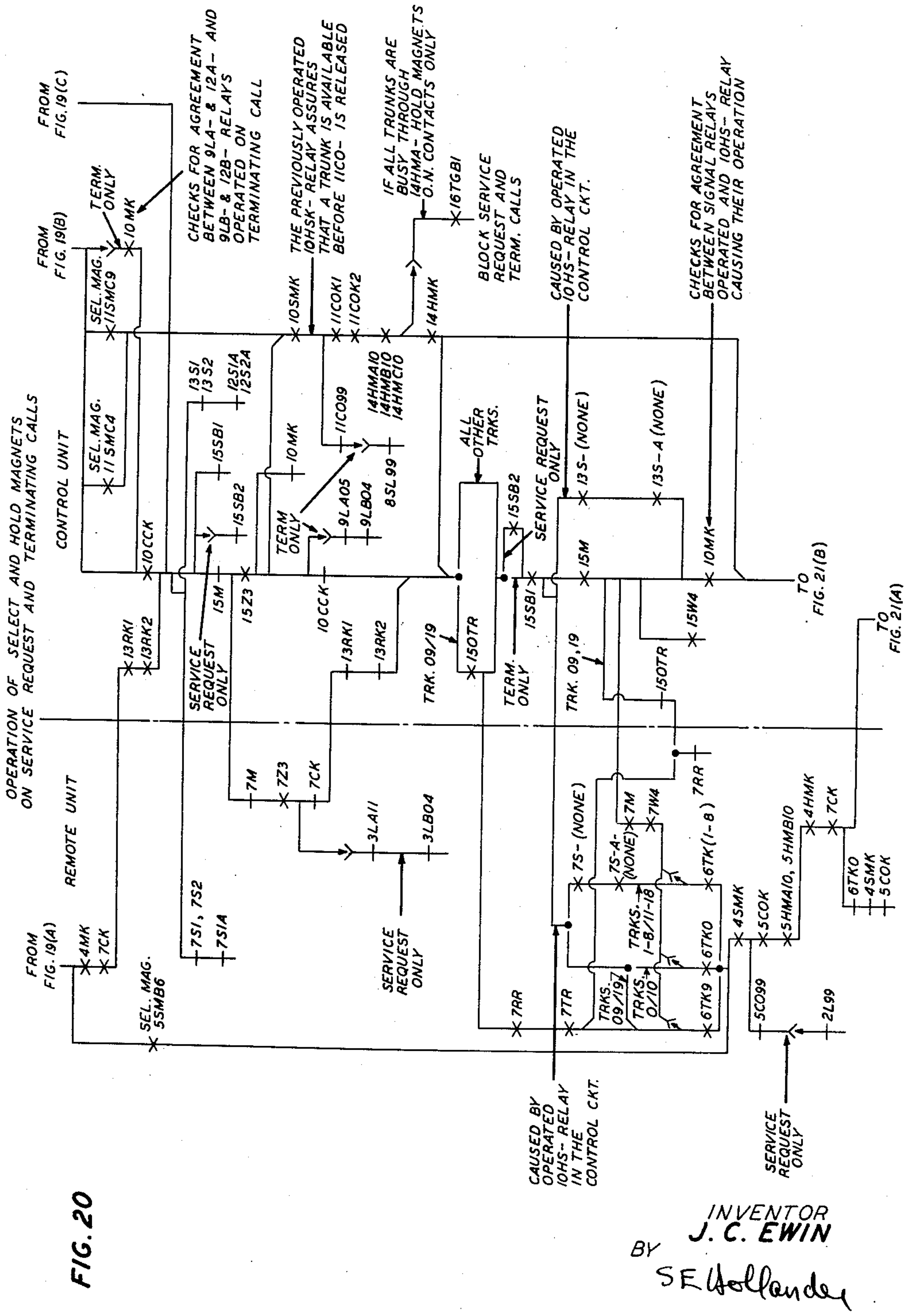
Figure 21:
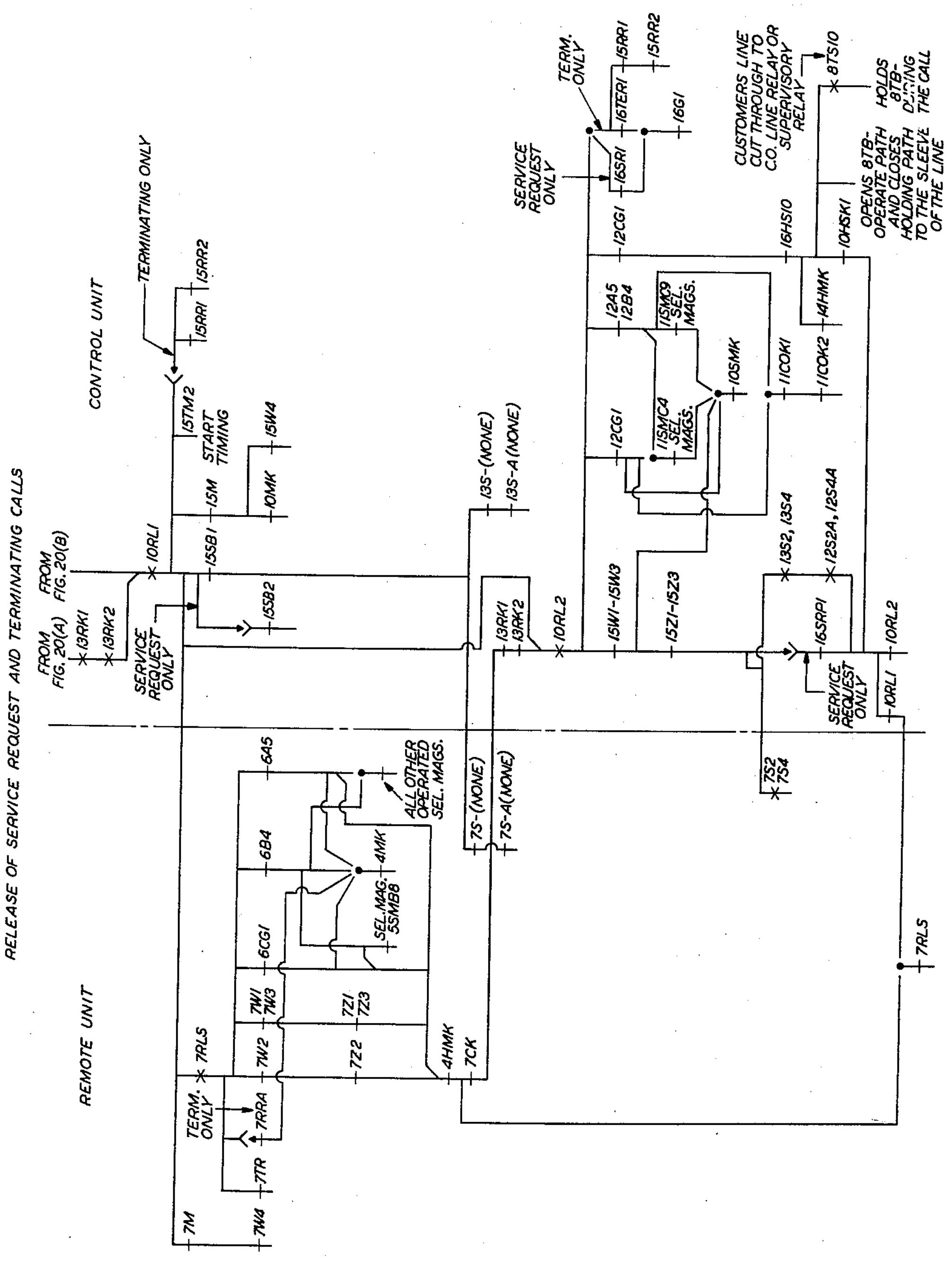
Figure 22:
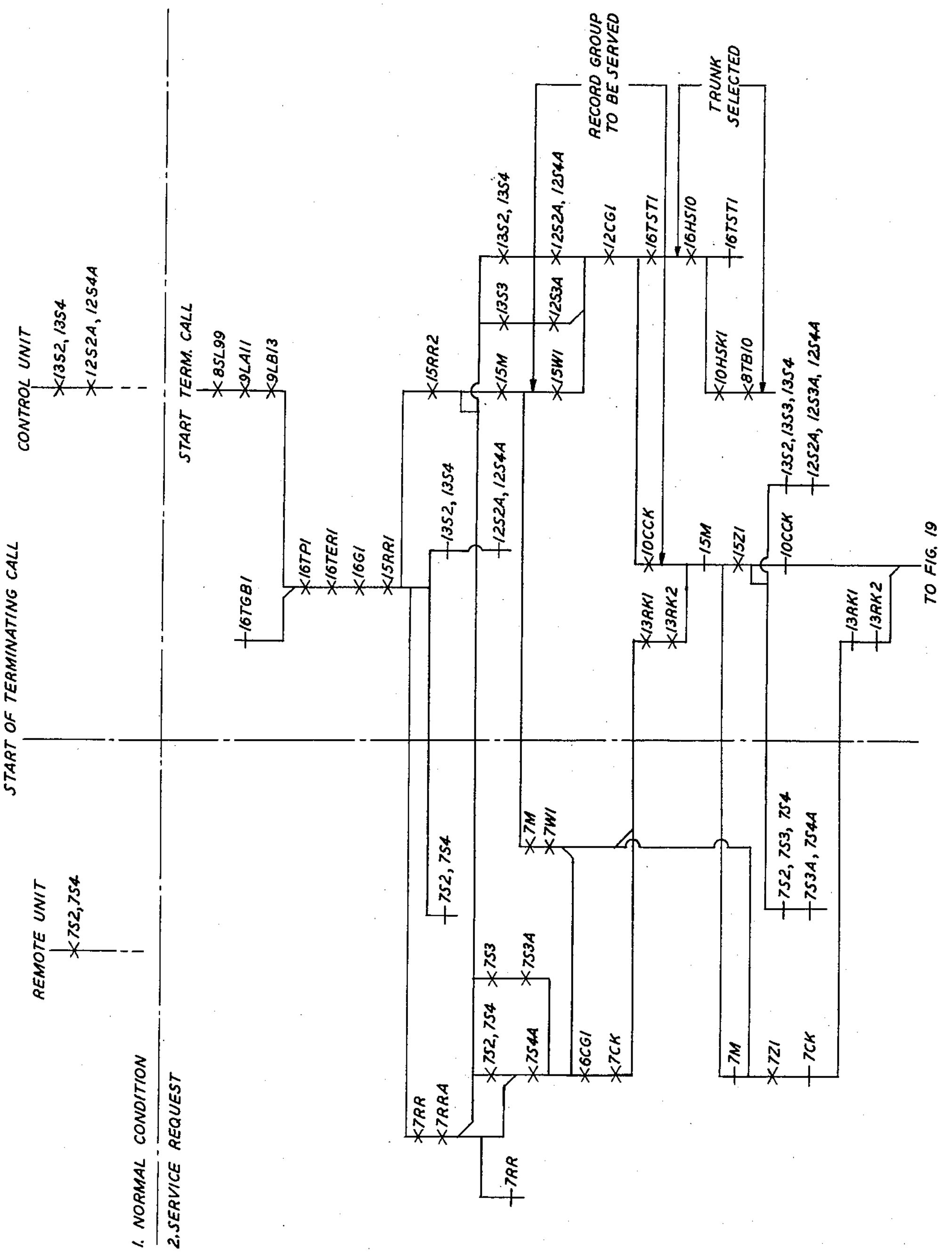
Figure 23:
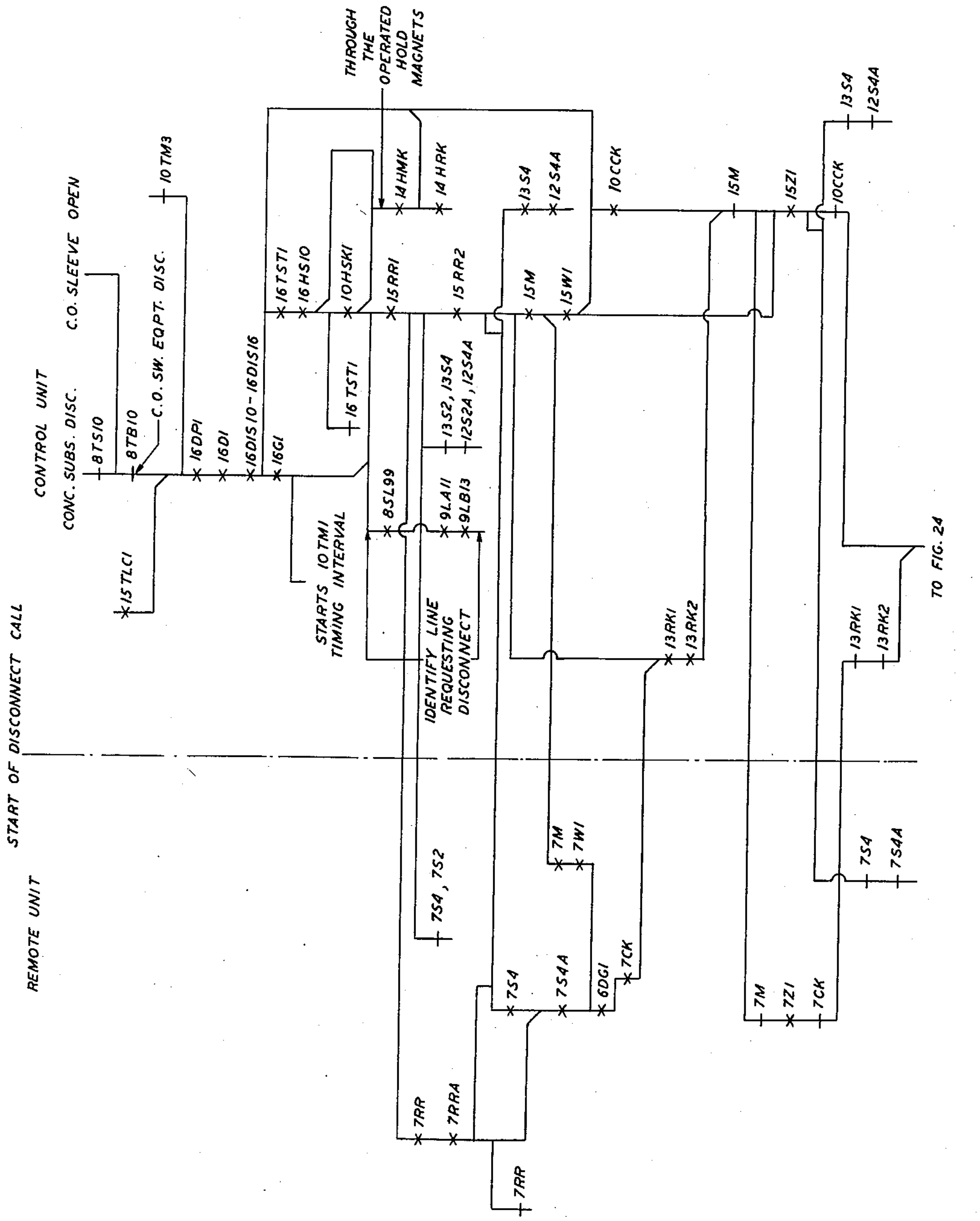
Figure 24:
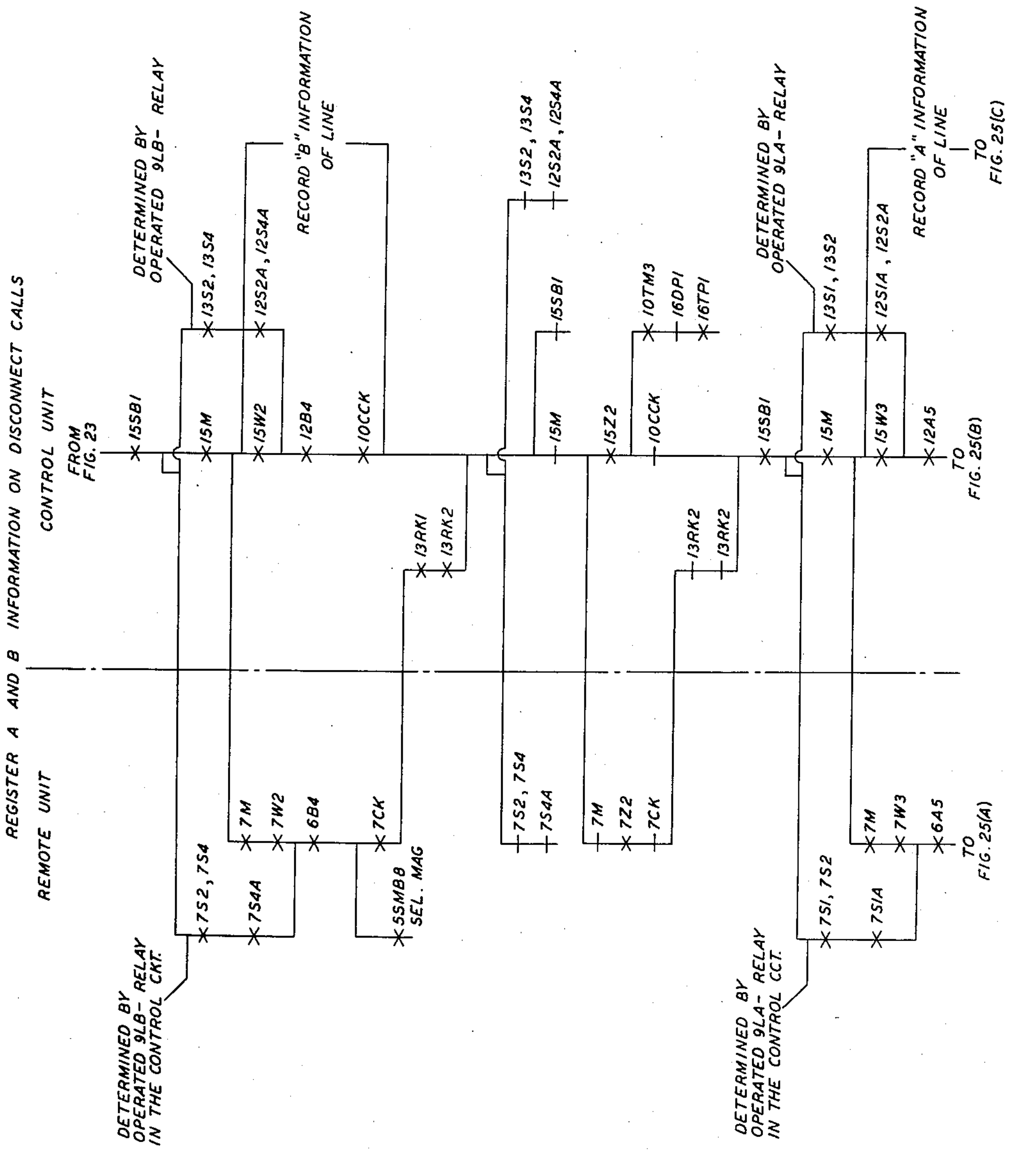
Figure 25:
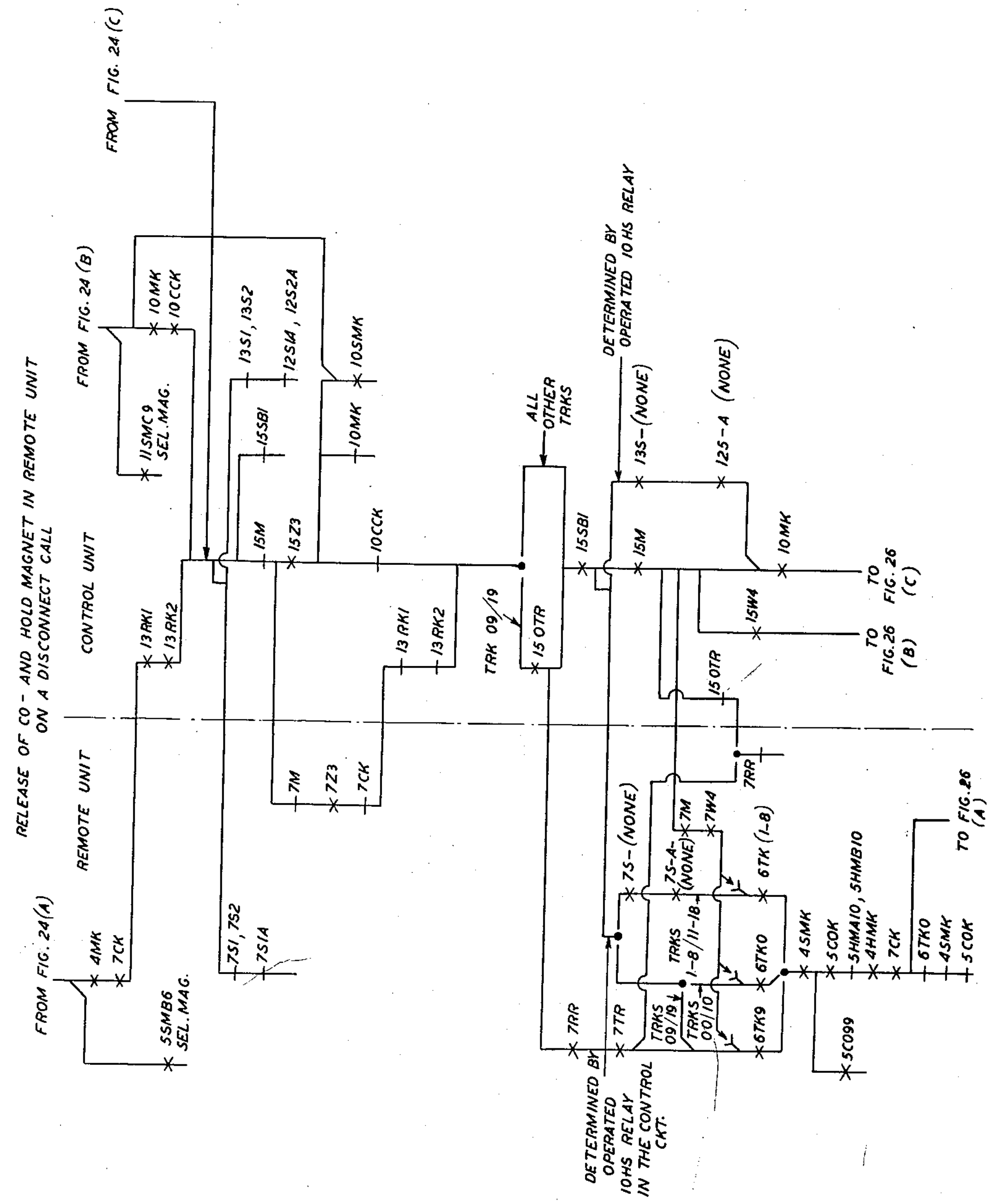
Figure 26:
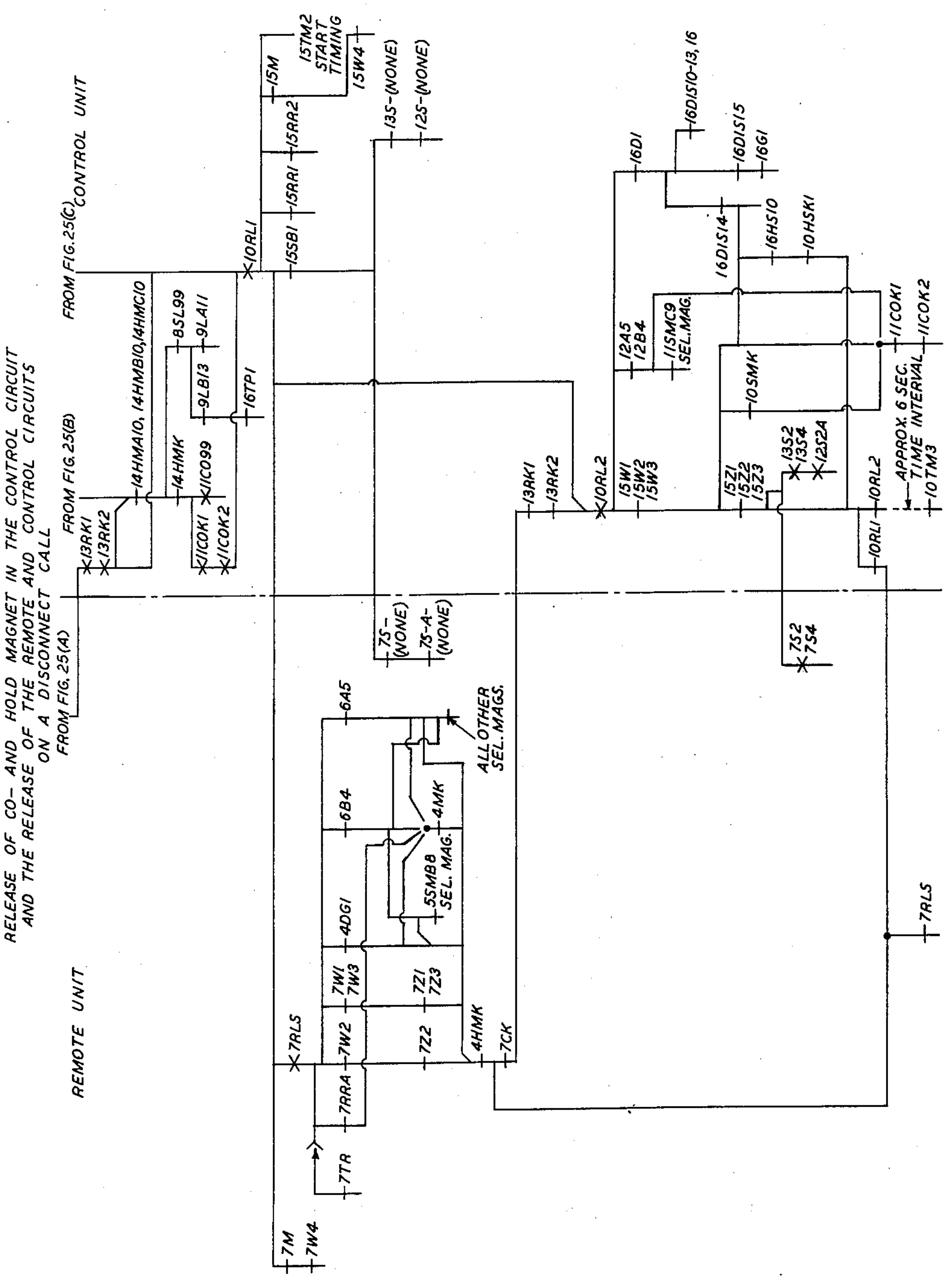
Figure 27:
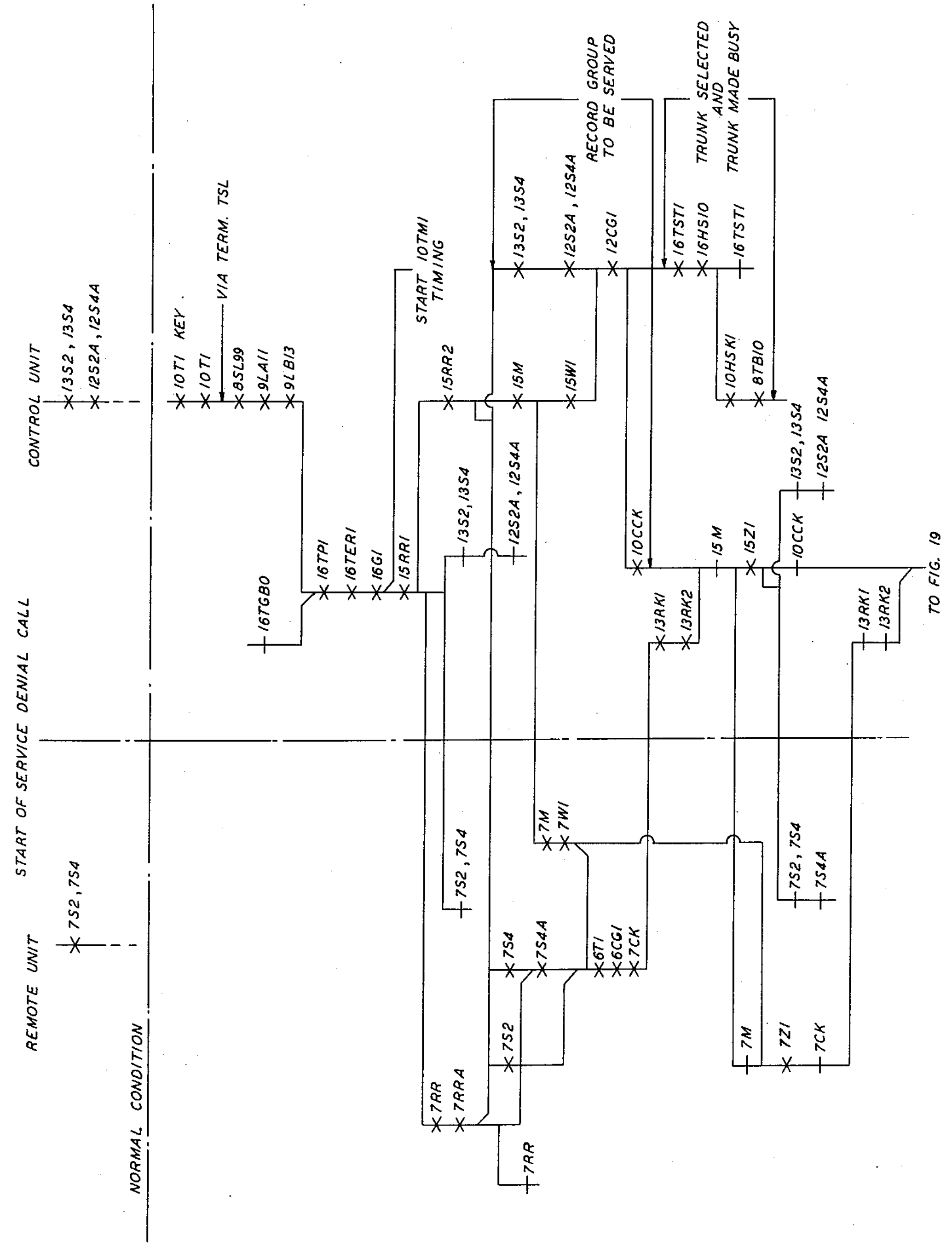
Figure 28:
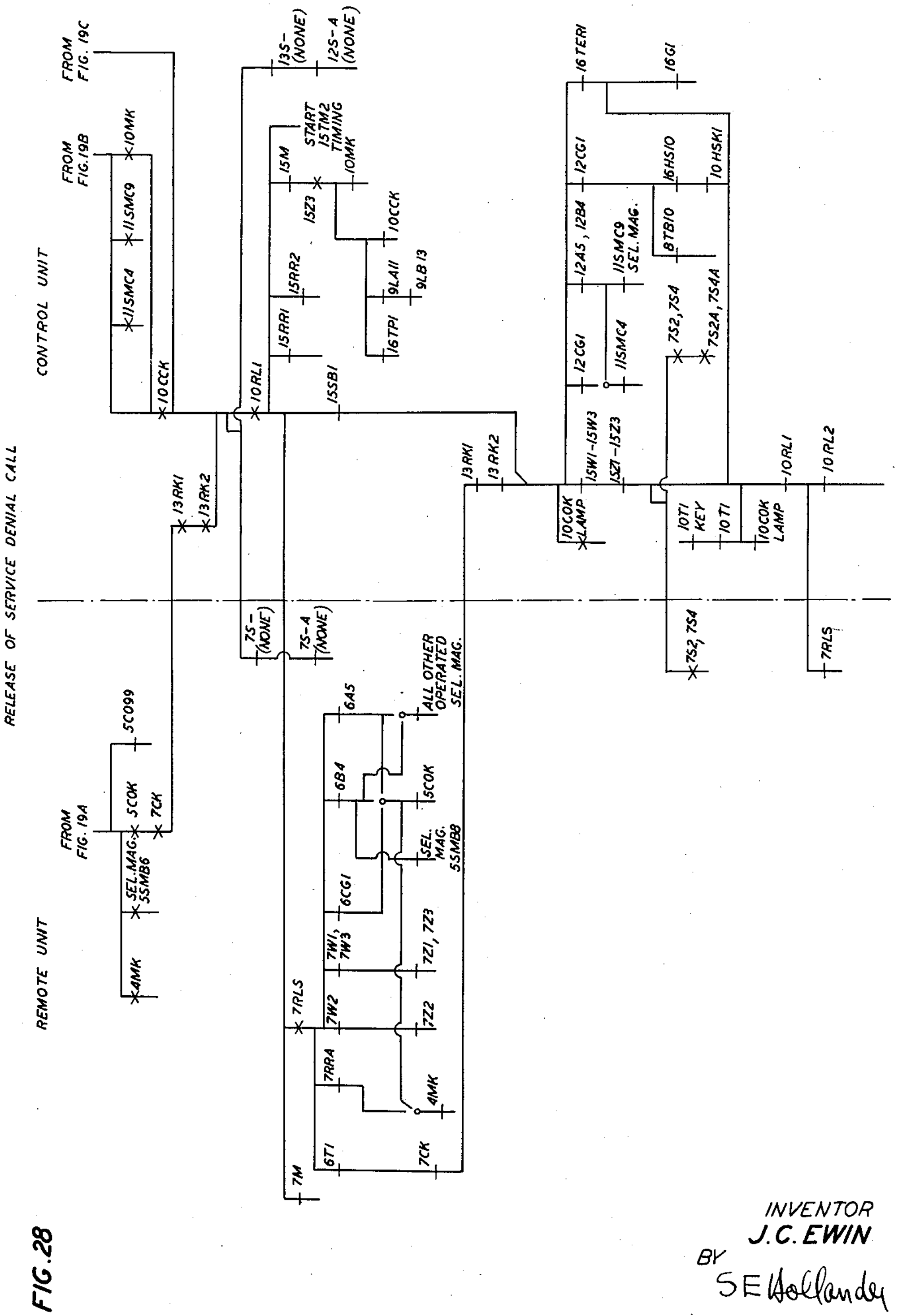
Figure 30:
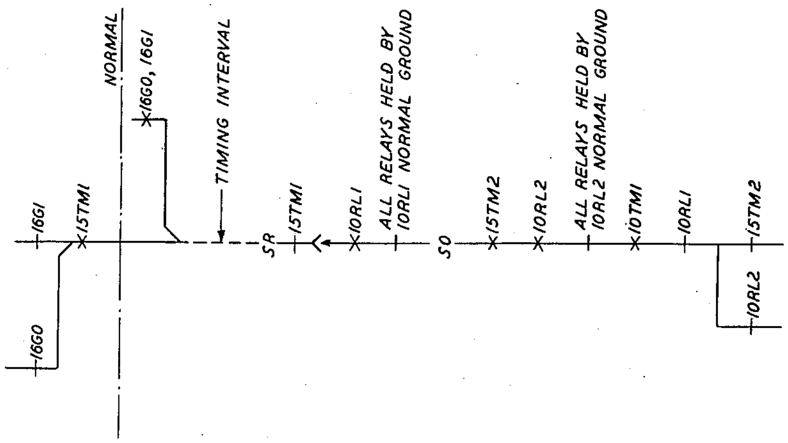
Figure 29:
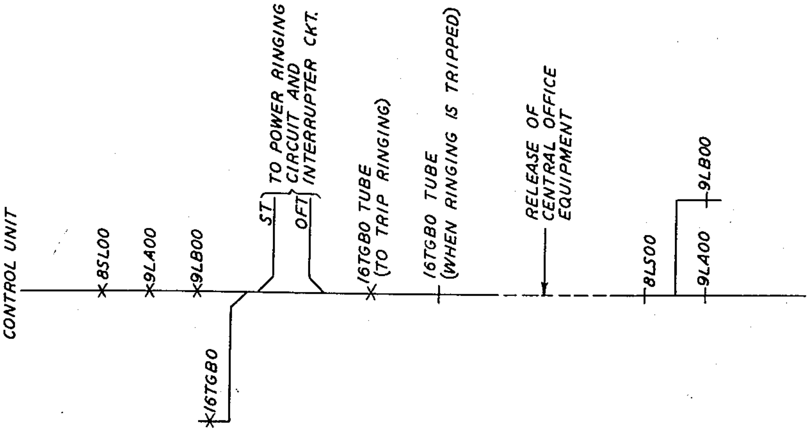

FIG. 3 includes the line lockout and identification circuits at the remote location;

FIG. 4 indicates the checking circuit at the remote location;
FIG. 5 includes the cut-off relays and the select and hold magnets for the crossbar network at the remote location;
FIG. 6 shows the remote unit register circuit;
FIG. 7 includes the remote unit sequence control circuit and the remote unit signal circuit;
FIG. 8 includes the crossbar network at the control unit;
FIG. 9 shows the identification and lockout relays at the central office control unit;
FIG. 10 indicates the checking circuit at the central office;
FIG. 11 shows the cut-off relays and the select magnets for the crossbar network at the control unit;
FIG. 12 includes the register circuit at the control unit;
FIG. 13 shows the signal circuit at the control unit;
FIG. 14 includes the hold magnets associated with the crossbar network at the control unit;
FIG. 15 includes the master signal control circuit and the trunk load control circuit and the sequence control circuit at the control unit;
FIG. 16 includes the preference control circuit at the remote unit;
FIG. 17 shows the disposition of FIGS. 2–16 to disclose the illustrative embodiment of the instant invention;
FIGS. 18 through 30 show the sequence charts for relay operation on the various types of calls;
FIG. 31 shows Table 1 which includes the relationship between the line lockout relays and the register relays at the remote unit;
FIG. 32 shows Table 2 which includes the relationship between the line lockout relays and the register relays at the control unit; and
FIG. 33 shows Table 3 which includes the relationship between the signal relays and line lockout relays.

For facilitating clarity of presentation the following General Description and Detailed Description have been arranged to first generally describe the apparatus and operation and to subsequently describe the operation in detail as follows:

INDEX

I. General Description
- IA. General Description of Major Components
  - IA–1. Crosspoint Networks
  - IA–2. Register Circuits
  - IA–3. Sequence Control Circuits
  - IA–4. Signaling Circuits
  - IA–5. Master Signal Control Circuit
  - IA–6. Preference Control Circuit
  - IA–7. Line Lockout and Line and Cut-Off Circuits
  - IA–8. Trunk Selection
  - IA–9. Checking Circuits
  - IA–10. Disconnect Control
- IB. General Description of Operation
  - IB–1. General Description of Signaling Sequence
  - IB–2. Service Request Call
    - IB–2a. Registration of Group Information
    - IB–2b. Registration of "B" Information
    - IB–2c. Registration of "A" Information
    - IB–2d. Registration and Transmission of Trunk Information
    - IB–2e. Closure of Channel Through Networks.
  - IB–3. Terminating Call
  - IB–4. Disconnecting an Established Connection
  - IB–5. Release of Concentrator Circuit
  - IB–6. Signal Circuit Monitoring Facility
  - IB–7. Trunk Overflow
  - IB–8. Service Denial
  - IB–9. Alarms II. Detailed Description
- IIA. Detailed Description of Originating Call
  - IIA–1. Seizure of the Control Circuit
  - IIA–2. Signal Relays—Group Information
  - IIA–3. Seizure of the Preferance Control Circuit
  - IIA–4. Remote Unit—Group Information Registration
  - IIA–5. Control Unit—Group Information Registration
  - IIA–6. Trunk Selection
  - IIA–7. Remote Unit—"B" Information
  - IIA–8. Control Unit—"B" Information Registration
  - IIA–9. Remote Unit—"B" Information Registration
  - IIA–10. "A" Information
  - IIA–11. Registration of "A" Information at the Remote Unit
  - IIA–12. Registration of "A" Information at the Control Unit
  - IIA–13. Match Check Operation
  - IIA–14. Steering Level Select Magnet Operation
  - IIA–15. Transmitting Trunk Information
  - IIA–16. Selection of Trunk 09 or 19
  - IIA–17. Release of Line Relay at Remote Unit
  - IIA–18. Hold Magnet Check at Remote Unit
  - IIA–19. Release of Control and Remote Units
- IIB. Detailed Description of Terminating Call
  - IIB–1. Seizure of Control Circuit
  - IIB–2. Registration of Group Information at the Control Unit
  - IIB–3. Trunk Selection at Control Unit
- IIC. Disconnect Call
  - IIC–1. Trunk Hold Control
  - IIC–2. Identification of Line on Disconnect Call
  - IIC–3. Transmitting Group and Class of Call Information
  - IIC–4. Registration of "B" and "A" Information
  - IIC–5. Release
  - IIC–6. Timing Circuit 10TM3
- IID. Service Denial Call
  - IID–1. Seizure of Control Unit
  - IID–2. Release of a Service Denial Call
- IIE. Preference Control
- IIF. Alarm Circuit
- IIG. Line Lockout Circuit Operation on Simultaneous Calls
- IIH. Trunk Overflow Indication Appropriate reference may be made to the sequence charts to facilitate comprehension of the detailed description.

I. General description

*IA. General description of major components*

Figure 1:
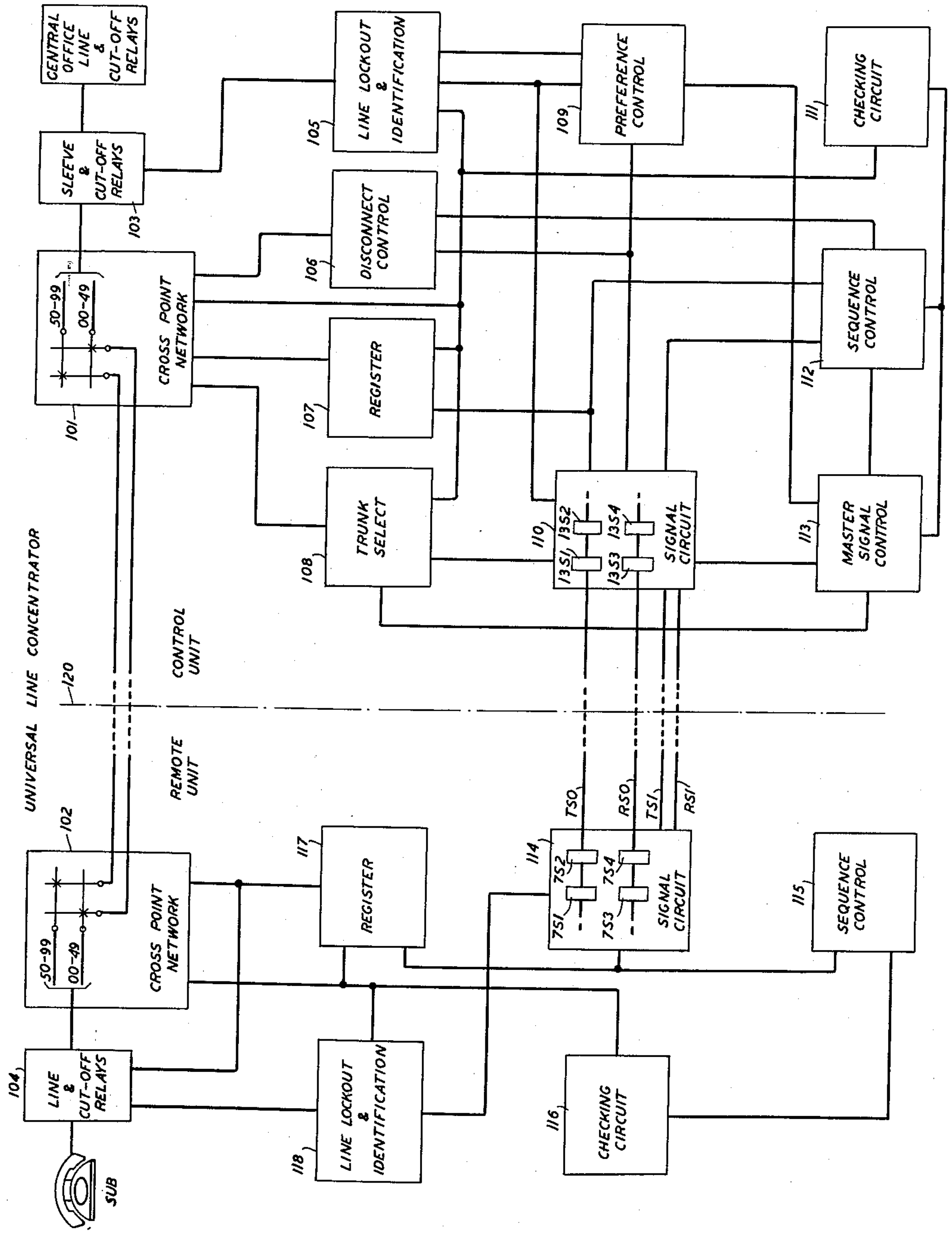
FIG. 1 shows a block diagram of the major components at the remote and central office locations.
Figure 2:
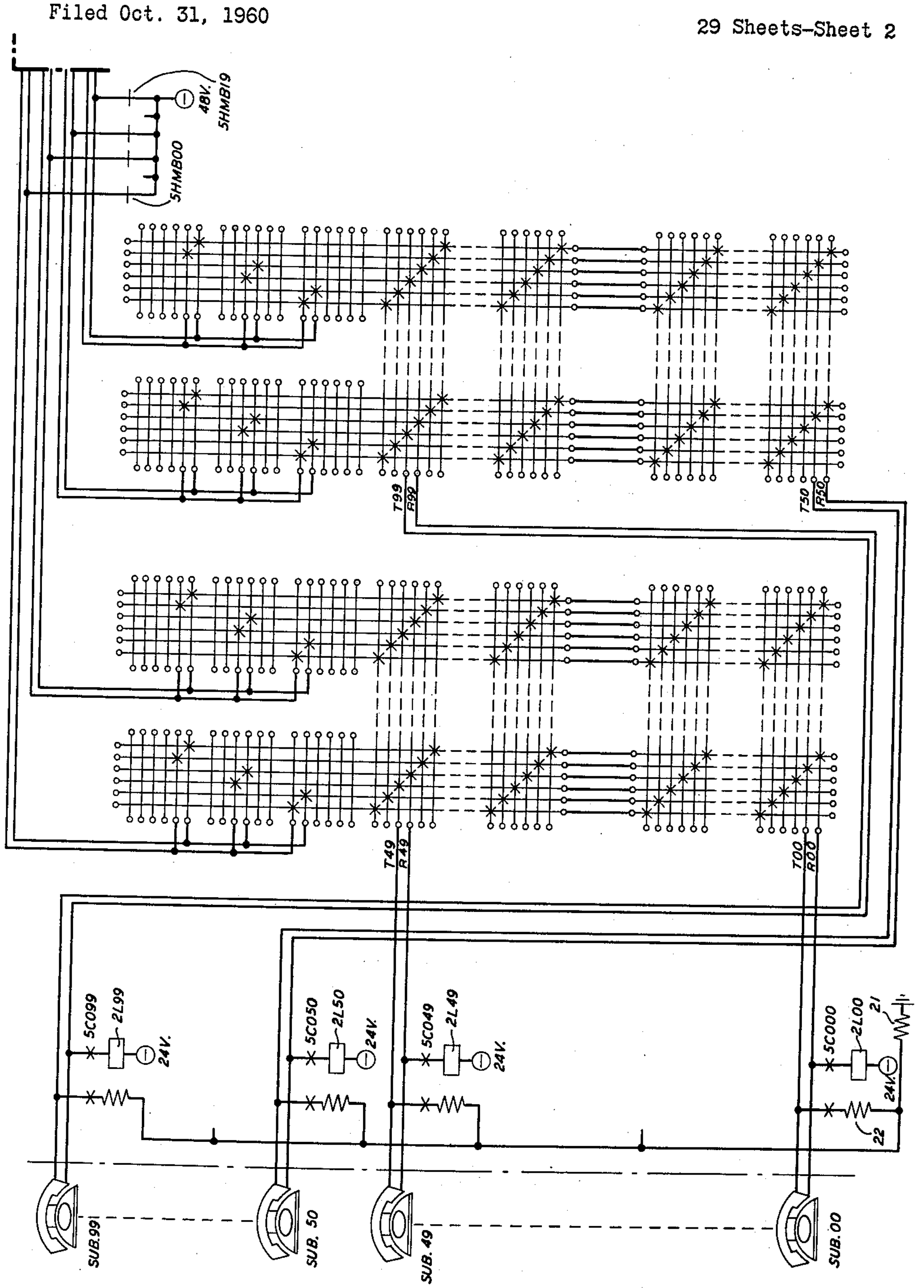
FIG. 2 shows the crossbar network at the remote location.

As indicated in FIG. 1 the control unit is located at the central office and is coupled to the remote unit by twenty speech trunks and two signal pairs. It is apparent from FIG. 1 that all of the components to the left of line 120 are remotely located and all equipment to the right is located at the central office.

*IA–1. Crosspoint networks*

A crosspoint network 102 is utilized at the remote unit to associate lines and trunks and includes four six-wire crossbar switches having three lines per crosspoint. Lines appear on the switch horizontals and trunks on the verticals. Two steering levels (not shown in FIG. 1, but shown in detail in FIG. 8) serve to select one of the two lines in a crosspoint. The lines are divided into two groups of 49 lines each, with each group having full access to an individual group (0 or 1) of ten trunks. A similar network 101 at the central office includes three six-wire switches having two lines per crosspoint.

The hold magnets utilized in both units are of the magnetic latching type in order to reduce power consumption. Reference may be made to an article entitled "Magnetic Latching Crossbar Switches," Bell System Technical Journal, September 1960, p. 135, for a description of suitable apparatus.

*IA–2. Register circuits*

A register circuit at the control unit includes groups of relays adapted to register the line group (0 or 1) and connect or disconnect indications. The register also stores the "B" part of the line number, the "A" part of the line number and the trunk number.

These registrations are stored in corresponding groups of relays in the register circuit 107 of the control unit shown in detail at FIG. 12.

Similar registration facilities are available in the register circuit 117 of the remote unit, the latter being shown in detail at FIG. 6.

*IA–3. Sequence control circuits*

Groups of "W—Z" relays are utilized in a manner analogous to that of a program arrangement for dictating the order of operation of particular signal functions. Physically the sequence control 112 at the control unit comprises three groups of W—Z relay combinations adapted to be sequentially operated in the order W1, Z1, W2, Z2, etc. Operation of these relays modifies contact paths in the signaling and other circuits to permit gradual progression of the control unit and remote unit through the various steps necessary to complete a connection or disconnection.

The sequence control circuit 115 at the remote unit is completely analogous to that described for the control unit 112. Both are shown in detail at FIGS. 7 and 15, respectively.

*IA–4. Signaling circuits*

A signal circuit 110 at the control unit includes two pairs of sensitive and marginal relays 13S1–13S4. The sensitive relays are operated when a minimum current is supplied to the signal circuit but the marginal relays are designed to present a sufficient threshold or margin before operating to insure that a current flow greater than that merely necessary to operate the sensitive relay has been supplied. The signal circuit for the control unit is shown in detail at FIG. 13. Similar facilities are available for the remote unit 115. In fact, the remote unit is fully complementary to the control unit signaling circuit and also includes two pairs of sensitive and marginal relays 7S1–7S4.

Thus a sensitive and marginal relay at the control unit is adapted to operate in conjunction with a complementary sensitive and marginal relay at the remote unit. The four relays are coupled by a single conductor and are adapted for bidirectional operation. Thus the signals may originate at the control unit signal circuit 110 in the case of a terminating call to convey information to the remote unit signal circuit 114 relating to the called line. The same combinations of relays at the remote and control units are operated in view of the serial arrangement of the operating windings, e.g., 7S1, 7S3, 13S1 and 13S3.

Alternatively on an originating call the signals may emanate from the remote unit 114 to forward information relating to the identity of the calling line to the signal circuit 110. Again the same relay combinations would be operated.

Thus both signal circuits may be operated simultaneously under control of either unit. After the signal relays are operated the information stored thereon is delivered to the register circuits 107 and 117 as discussed above.

*IA–5. Master signal control circuit*

To prevent competition between the remote unit and the control unit on simultaneous originating and terminating calls and to preclude mutual lockout between the two units on such calls when both units are attempting to initiate signaling concurrently a master signal control circuit 113 shown in detail at FIG. 15 dictates the order in which the signal circuits of the two units may operate.

*IA–6. Preference control circuit*

Equipment having a related function is shown generally as the preference control circuit 109 and in detail in FIG. 16. In the event of simultaneous calls the preference circuit, which includes a number of relay chains, selects the type of call to be served and locks out other calls until the preferred call has been served. The preference circuit in addition indicates the line group number (0 or 1). The types of calls among which preference control selects include (1) service request or dial tone, (2) terminating calls, and (3) disconnect calls.

*IA–7. Line lockout and line and cut-off circuits*

These circuits are shown generally at 103 and 105 for the control circuit and 104 and 118 for the remote unit. The line and cut-off relays in circuit 104 are used to recognize service requests and to disconnect the line relay circuit when the line is connected through the concentrator to the central office equipment. The line and cut-off relays for the remote unit are shown in detail at FIGS. 2 and 5, respectively, and are both of the magnetically latching type to insure that they will be held in the desired condition indefinitely without additional power drain.

Identification of a calling line on a service request call is obtained at the remote unit through two separate lockout chains in circuit 118 under control of the line relay in circuit 104. A first chain identifies one of twelve groups. The second chain selects one of nine lines within the groups. Resistors in series with the relays in the second chain preclude the possibility of obtaining an ambiguous number due to simultaneous requests on a plurality of lines as will be explained in detail herein.

At the control unit identification circuit 105, a terminating call is recognized by a change in the sleeve condition in the central office which operates a sleeve relay in equipment 103 shown in detail at FIG. 8. The latter relay is individual to the line and initiates identification of the call through two lockout chains in unit 105 in a manner analogous to those discussed for the remote unit. In addition, a cut-off relay in circuit 103 shown in detail at FIG. 11, is used in the control unit to disconnect the sleeve relay while the line is cut through the concentrator. The cut-off relay at the control unit is also magnetically latching. As a result of the operation of the cut-off relays at the remote unit and at the control unit the line is provided with a "clean" tip and ring when cut through, i.e., there are no bridging or shunting connections on the line. It will be noted that the line terminations at the circuit 103 are individually extended to the line and cut-off relays 123 in the central office. The latter relays represent the conventional line circuits in the central office.

*IA–8. Trunk selection*

A selection circuit 108 shown in detail at FIG. 16 determines which idle trunk is to be selected. The circuit includes a plurality of relays individual to the trunks and is arranged in a chain. The selection circuit 108 is used both for selection of a trunk for connection and for disconnection as explained in detail herein.

*IA–9. Checking circuits*

Comprehensive checking arrangements to insure the validity of operation of the remote and control units are shown in outline at circuits 116 and 111, respectively, and in further detail at FIGS. 4 and 10, respectively.

Various types of checks are performed sequentially during the operation of the concentrator and include the checking of registration of one and only one unit of information for the group "A" identification, "B" identification, etc. Checks are also undertaken to insure that only valid identifications have been established in the event of simultaneous calls. Moreover, a check is undertaken to insure that the information in the register circuits 117, 107 accurately reflects the information which appeared on the signal relays in signal circuits 114 and 110.

Still further checking operations are undertaken to ascertain that the correct hold magnets and trunk relays, etc., are operated.

*IA–10. Disconnect control*

A disconnect control circuit 106 shown in detail at FIG. 16 insures that a minimum of eight lines will always be cut through to the central office. The disconnect circuit is disabled when four or less lines per group are cut through to trunk circuits. As a result of this feature in the lines will remain cut through even though not in use if fewer than four lines in the group are cut through.

*IB. General description of operation*

For facility, in comprehending the detailed description which follows herein, a brief description of each major type of operation omitting detail and emphasizing substance follows.

*IB–1. General description of signaling sequence*

As indicated above, the signaling arrangement is ternary in form. The two combinations of sensitive and marginal relays and the application of the three current levels to the signal conductors yield a total of nine individual signals for transmitting the digital information.

The direction of transmission of the signal information is related to the type of call being serviced. Manifestly, in the case of an originating call at the remote unit—a service request call—the information regarding the calling subscriber's line is available at the remote unit. As a result, the direction of transmission of the information regarding the line identification is from the remote unit to the control unit. Alternatively, in the event of a terminating call, the information designating called lines emanates from the control unit at the central office.

In the case of an originating call, the signal relays are operated in accordance with the information stored in the line lockout circuit 118 which in turn is responsive to the operation of the line relays in circuit 104. Since the signal relays are bidirectional in operation, signal circuits 110 and 114 are energized simultaneously to reflect the appropriate information. As indicated above, this information is then stored in the corresponding register circuits 117 and 107.

In the case of a terminating call the information respecting the called line derives from relay combinations in the line lockout circuit 105 which in turn is responsive to the operation of a particular sleeve relay. Again, signal circuits 110 and 114 are energized simultaneously and the information is ultimately stored in the registers 107 and 117. However, it is apparent that in this instance the information is transmitted in a direction from the control unit to the remote unit.

In either event, however, the information is transmitted sequentially in the following order:

| Digit No.: | Information |
|---|---|
| 1st | Line group (0 or 1) and connect or disconnect indication. |
| 2nd | "B" part of line number (one of 9 combinations). |
| 3rd | "A" part of line number (one of 6 combinations). |
| 4th | Trunk number (one of 9 combinations). |

Although the two groups of signal relays at both ends of conductors TS0 and RS0 are symmetrical and bidirectional in operation, as indicated above, they are capable collectively of furnishing only nine digit indications. Since twenty trunks are used in two groups of ten trunks each, it is apparent that a separate signal must be rendered to indictae the tenth trunk.

This information is transmitted over the second signal pair TS1 and RS1. Moreover, the second signal pair is utilized for a number of additional signaling functions including advancing the sequence control at both units, checking indications and concentrator release indications.

*IB–2. Service request call*

When a call is originated, a line relay in circuit 104 individual to the calling substation is operated and in turn results in the operation of two unique identifying relays in the line lockout circuit 118 as discussed above. Operation of the latter identification relays supplies a low resistance ground connection to signal lead TS0 if the call is in group "0" or to signal lead RS0 if the call is in group "1." This indicates to the control circuit that a service request is present and identifies the group (lines 0–49 are in group "0," 50–99 in group "1") by operating a relay in the preference control circuit 109. When the service request call obtains preference the control unit operates a relay in the master signal control circuit 113 to initiate a mark signal and to operate a similar relay in the remote unit. This results in the operation of specific signal relays (7S1–7S4 and 13S1–13S4) at both the remote unit and the control unit to reflect the particular group in which the calling line is located and also the class of call to be served. Thus the signal relays in the signal circuits 114 and 110 are simultaneously operated in accordance with a particular code arrangement given in detail herein and if the calling line is illustratively assumed to be line 99 the call will be in group "1."

*IB–2a. Registration of group information*

After the operation of the signal relays, the register relays in registers 107 and 117 are operated in accordance with the information stored in the signal relays. Thus the group number has been stored in the register circuits 117 and 107 of the remote and control units.

When the registration has been completed and checked, the checking circuits 116 and 111 release the mark and signal relays and by means of W—Z relay combinations, as described above, the sequence control circuits 115 and 112 in the remote and control units are simultaneously advanced.

*IB–2b. Registration of "B" information*

When the sequence control relays have operated and the check relays have released, the signal circuits 110 and 114 are again energized. This time they are operated in response to the particular relay in the line lockout circuit 118 which indicates the "B" portion of the line number. As before, the signal relays are operated in unique combinations simultaneously to store and transmit the "B" portion of the line number under control of the line lockout circuit 118. Again, this information is registered in registers 117 and 107 simultaneously and checked by the checking circuits 116 and 111.

When the information has been checked, the sequence control circuits are again stepped in a manner similar to that described above to prepare for transmitting the "A" portion of the line number. The signal circuits are reactivated under control of the relays in the line lockout circuit 118 indicative of the "A" portion of the line number. The signal relays 7S1–7S4 and 13S1–13S4 are once more operated in a code arrangement which reflects the "A" information.

*IB–2c. Registration of "A" information*

Register circuits 107 and 117 are simultaneously loaded with the indications stored in the signal relays of circuits 110 and 114. When the "A" information has been completely registered and checked by checking circuits 116 and 111, the mark signal is again removed and the sequence control circuits 112 and 115 are advanced to the next and last position by the operation of the final group of "Z" relays.

Thus far the information transmission has been in a direction from the remote unit to the control unit to indicate the identity of the calling line. Since the last item of information to be transmitted relates to the trunk selection and since this information must emanate from the control unit, a direct ground potential is now applied to the signal relays in the remote circuit 114 to place the signal circuits 110, 114 under control of the trunk selection relays of circuit 108 to transmit to and register the trunk number in the remote unit. Thus the signal relays are again operated, this time in a direction from the control unit and in response to the trunk selection circuit 108, in a unique code which indicates the selected trunk.

*IB–2d. Registration and transmission of trunk information*

Trunk numbers between 0 and 8 are registered directly on the registered relays. However, since only nine codes are available a special signal is required when trunk "9" is to be used. This signal is a preliminary signal which precedes the trunk signal and causes operation of a transfer relay in the register circuits 117, 107 to convert a trunk "0" indication into a trunk "9" indication thus providing for the selection of trunk "0" or trunk "9" from the trunk "0" code. This process will be explained in further detail herein.

Registration of the "A" information as described above, without more, signifies completion of transmission and registration of the line information and prepares paths for operating appropriate select magnets in the crossbar networks 101, 102. Also a matching circuit is completed in the remote unit for verifying that the information stored in the register 117 is the same as the information recorded in the line lockout circuit 118. This match check is performed in circuit 116 and a mismatch prevents further progress of the call.

Before transmitting information relating to the trunk number from the control unit to the remote unit, the control circuit initiates a connection of the selected trunk to the proper line terminals in the central office and releases the cut-off relay at the control unit. This is a useful arrangement — i.e., first establishing the central office end of the connection — since it provides a record in the central office of the attempt to complete a connection at the remote unit and to provide a means for disconnecting in the event of failure to complete.

When the group and line registrations and the select magnet operation have been checked in the checking circuits 116 and 111 a circuit is completed for releasing the cut-off relay. Again this operation is individually checked and if the attempt to release the cut-off relay is successful the hold magnets are operated at the control unit in network 101 and also checked. Subsequently the trunk number is transmitted to the remote unit by appropriate operation of the signal relays and the trunk information is registered simultaneously in both registers 107 and 117.

*IB–2e. Closure of channel through networks*

When the trunk information has been recorded and the appropriate matching operations have been completed in the checking circuits 116 and 111 and additional checks have been made that only one relay in each register stage is operated and also that the select magnets in the network 102 at the remote unit have operated a circuit is completed for releasing the cut-off relay at the line and cut-off circuit 104 and for operating the trunk hold magnets in the remote unit network 102. Again the operation is checked at the remote unit in circuit 116 and a signal is transmitted to the control unit indicating a successful completion of the connection in the remote unit. This completes the process of setting up the call and causes the control unit and the remote unit to prepare for release. When the release of both units is accomplished the line is connected to the trunk at both units through magnetically latched hold magnets. The only other relays which remain operated are the cut-off relays in both units which are also magnetically latched. Ultimately a "clean" tip and ring connection is available through the concentrator.

*IB–3. Terminating call*

The terminating call emanates from the central office and is directed to the called party initially by the operation of the sleeve relay individual to the line of the called party in the control unit.

Cross-connections from the sleeve relay to lockout chains in circuit 105 identify the line group and the particular line within the group. When the terminating call obtains preference from circuit 109, lockout is achieved in the preferenc control circuit 109 to serve a terminating call.

Significantly, a signal is transmitted to the remote unit which operates certain release relays in the line lockout circuit 118 while a terminating call is in progress to disable the line lockout circuit. This action prevents competition by the line lockout circuit 118 at the remote unit (which may in the interim attempt to operate to identify an originating calling line) and the line lockout relays in circuit 105 of the control unit. In addition, a direct ground is applied at the remote signal unit 114 to the signal leads to prepare the remote circuit to receive signals from the control circuit in the central office.

Subsequently the sequence of operations is generally similar to that described above for a service request call, with the exception, in this instance, that the signals indicating line numbers all originate at the control unit.

Thus the W—Z relays in the sequence control circuit will govern the signaling facilities to transmit the group number, the "B" part of the line number, the "A" part of the line number, and the trunk number. Also as discussed above, the signal relays will in each instance be operated in accordance with a unique code which defines the information to be transmitted and the register circuits 107 and 117 will operate as before to register the appropriate information which is then checked by circuits 116 and 111. Here again, when all information is complete the crosspoint networks 102 and 101 are operated to complete the connection.

*IB–4. Disconnecting an established connection*

Trunks are released in the preference control circuit 109, shown in detail in FIG. 16, in order of preference when unoccupied, provided that five or more in the group are cut through. However, only as many trunks will be released as is required to leave four in a group to remain in the cut-through condition. In short, this type of operation includes a facility which "delays" disconnecting the subscriber's line from the trunk used in the connection if fewer than four trunks are cut through.

A disconnect request for an individual trunk is initiated, if the trunk hold magnet is operated (indicating that the line is still cut through), that the trunk busy relay is normal (indicating that the line is idle) and that the trunk load control relay not shown in circuit 106 but shown in detail in FIG. 15, is operated (indicating that more than four or more hold magnets are operated). Under these circumstancs appropriate relays are operated in the disconnect control circuit 106 (explained further herein) which will ultimately open the circuits of all sleeve relays toward the central office and connect them to the associated control circuit sleeve leads to prepare for identifying the line to which the trunk is connected. In addition, the trunk selection circuit 108 selects one of the trunks to be disconnected.

It is interesting at this juncture to briefly examine why the line identification is required. This is necessary in view of the fact that merely releasing the hold magnets in the crossbar networks 101 and 102 will not release the magnetically latched cut-off relay unique to the subscriber's line in the line and cut-off circuit 104. Since there is no centralized memory in the central office which can be resorted to for determination of which lines are connected to which trunks, an entirely separate identification procedure to ascertain which line has been connected to the trunk to be disconnected is necessary. Additional details regarding this disconnect identification procedure follow herein.

After selecting a trunk to be disconnected the trunk selection circuit 108 grounds the trunk sleeve thereby operating the sleeve relay of the line to which the trunk is connected. When the sleeve relay is operated the line is then identified by operation of the associated lockout relays in circuit 105 in the manner described above for a terminating call (which incidentally is also similar to that described above for an originating call).

Prior to transmission of any line or trunk information to the remote unit a preliminary pulse is directed over one of the signaling leads to prepare the remote unit for receiving information from the control unit. Essentially this relates to the provision of a direct ground connection to the signal relays at the remote unit. Subsequently the line and trunk number together with a disconnect indication are transmitted to the remote unit in a manner similar to that of a terminating call. The disconnect indication causes a reversal of polarity in the voltage applied to the cut-off relay in circuit 104 and to the trunk hold magnet in networks 102 and 101. This reversal produces a magnetic field in oposition to the field holding the apparatus in the operated position (released for the cut-off relay) thereby causing the release of the operated hold magnet and operation of the cut-off relay.

In releasing the connection on a disconnect call the remote circuit end of the established connection is released and checked before the control circuit end. This arrangement serves to keep the trunk "busy" in the event that trouble prevents its release. Moreover, leaving the control unit end of the connection established provides a record of the line to trunk connection and permits repeated attempts thereafter to disestablish the connection.

*IB–5. Release of concentrator circuit*

When the checking circuits 111 and 116 indicate that the desired functions have been performed at both ends of the connection, a release relay is operated at the control unit and transmits a release signal to the remote unit. When the control relays in the remote unit have released, a second release relay is operated in the control unit which prevents any other calls from being originated until all relays in the control unit have been released.

*IB.–6. Signal circuit monitoring facility*

At the initiation of each call, the two sensitive relays 7S2, 7S4, 13S2, 13S4 must be operated. This insures continuity of the signal circuit leads over which a service request can originate.

*IB–7. Trunk overflow*

When all trunks available to a particular line group are busy, all service requests in that group are canceled and terminating calls receive an overflow signal. This feature will be explained in further detail herein.

*IB.–8. Service denial*

A particularly advantageous faculty of the instant invention includes a provision for preventing a line which has a permanent condition thereon, i.e., receiver off-hook, tip to ring short, etc., from holding a trunk out of service to working lines. In the following description this type of arrangement is designated as a "service denial" call or "lockout" operation. When a service denial call is made, the remote unit cut-off relay associated with the line in trouble is operated thereby denying service and completely isolating the line from the concentrator. The desirable feature here is that the entire operation may be controlled from the central office. A line thus disabled may be fully restored to service also from the central office by placing a terminating call to the line.

*IB–9. Alarms*

An over-all timer of approximately one second provides an alarm if for any reason a call is not completed within this time. This alarm indicates within defined limits whether the trouble is in the control unit, the remote unit, or the signal circuit.

Another timer is actuated when a disconnect call is made. This latter timer prevents another disconnect call from starting for approximately six seconds.

Having now considered the major components of the concentrator embodiment and the various operative functions in general outline, the concentrator system apparatus and its varied operations will now be considered in depth.

*II. Detailed description*

*IIA. Detailed description of originating call*

Reference may be made appropriately to the sequence charts as an aid in following the detailed circuit operation. In the idle condition of the control unit, relays 13S2 and 13S4 are operated. As a result of the operation of these relays, relays 12S2A and 12S4A are operated over obvious circuits. The corresponding relays 7S2 and 7S4 are likewise operated. For example, in the case of relay 13S2, a path may be traced from negative battery, resistance 151, contacts of relays 13RK2, 15Z1, 15RR1, 16DIS04, 16G1, 15Z1, winding of relay 13S2, winding of relay 13S1, conductor TS0, winding of relay 7S2, winding of relay 7S1, contacts of relay 7Z1, resistance 71 to ground. Although current traverses relays 7S1 and 13S1 these relays do not operate in view of the marginal threshold included in their design which precludes their operation when resistance 71 is in series with the operating path.

A similar circuit may be traced for relay 13S4 from negative battery, resistance 151, contacts of relays 13RK2, 15Z1, 15RR1, 16DIS14, 10T1, 16G0, 15Z1, winding of relay 13S4, winding of relay 13S3, conductor RS0, winding of relay 7S4, winding of relay 7S3, contacts of relay 7Z1, additional resistance 72 to ground.

*IIA–1. Seizure of the control circuit*

When a service request is made at the remote unit the resistance ground on conductor TS0 or RS0 is changed to a direct ground connection. More specifically, when a customer, illustratively the customer assigned to substation 99, lifts his receiver an appropriate line relay 2L99 is operated over the loop, the switchhook contacts, not shown, and the closed contacts of the corresponding cut-off relay 5CO99. Thereafter, line identification relays unique to the calling line and specifically relays 3LA11 and 3LB04 will be operated to identify the calling substation line.

The operating path for relay 3LA11 may be traced from ground, contacts of relay 2L99, winding of relay 3LA11, contacts of relays 3LA10, 3LA06, 3LA05, 3LA04, 3LA00, 4MK, 7RRA, resistance 31 to negative battery.

In accordance with the lockout features hereinafter described in further detail, relay 3LB04 does not operate until a path can be traced over the contacts of operated relay 3LA11. This path includes ground, contacts of relay 3LA11, resistance 35, contacts of relay 2L99, winding of relay 3LB04, contacts of relay 3LB04, contacts of relays 3LB08, 3LB04, 3LB00, resistance 33 to negative battery.

Relays 3LA11 and 3LB04 lock operated over their own contacts, for example in the case of relay 3LB04, over the contacts of relays 3LB04, 3LB00, resistance 33 to negative battery.

*IIA–2. Signal relays—Group information*

Operation of relay 3LA11 causes operation of appropriate signal relays, specifically relay 7S3, and corresponding control unit relay 13S3. Auxiliary relays 7S3A and 12S3A are then operated over obvious paths.

More specifically, as a result of the operation of relay 3LA11, relay 7S3 is operated over a path which may be traced from ground, contacts of relays 3LA11, 7Z1, windings of relays 7S3, 7S4, conductor RS0, windings of relays 13S3, 13S4, contacts of relays 15Z1, 16G0, 10T1, 16DIS14, 15RR1, 15Z1, 13RK2, resistance 51 to negative battery.

*IIA–3. Seizure of the preference control circuit*

As explained previously on the origination of a call at station 2L99, the resistance ground on lead RS0 through resistance 72 was changed to a solid ground at the contacts of relay 3LA11 and relays 7S3 and 13S3 were operated.

Assuming that relays 15RR1 and 16TGB1 are normal, relay 12S3A will close an operating path for relay 16SRP1 to indicate a service requeste call in group "1." An operating path may be traced from negative battery, resistance 162, contacts of relays 15Z1, 15RR1, 16TGB1, 12S3A, winding of relay 16SRP1, contacts of relays 16SRP0, 16DP1, 16DP0 to ground. This action identifies the calling line as being in group "1."

Operation of relay 16SRP1 closes a locking path for itself over its own contacts and also closes an operating path for relay 16SR1 which may be traced to ground, contacts of relays 10RL2, 15Z1, 16TP1, 16TP0, 16SRP1, winding of relay 16SR1 to negative battery.

Operation of relay 16SR1 causes the operation of group relay 16G1 over an obvious path. Operation of relay 16G1 closes an operating path for relay 15M over a path from ground, contacts of relays 16G0, 16G1, 10RL1, 13RK2, 15Z1, 16SR1, winding of relay 15M to negative battery. Operation of relay 15M at the control unit results in the operation of relay 7M at the remote unit over a path including ground, contacts of relays 15M, 10RL1, resistance TS1, conductor TS1, winding of relay 7M, winding of relay 7RLS to negative battery.

*IIA–4. Remote unit—Group information registration*

As explained above, relay 7M is operated over the signal lead TS1 and in turn results in the operation of relay 7W1 over a path from ground, contacts of relays 7RLS, 7M, 7Z1, 7W1, winding of relay 7W1 to negative battery. Relay 7Z1 locks operated over its own contacts. Relay 6CG1 in the register circuit now operates over a path which may be traced from negative battery, winding of relay 6CG1, contacts of relays 7Z1, 7S3A, 7S2, 7S1A, 7CK, 7Z1, 7W1, conductor 601, contacts of relays 7M, 7RLS to ground. Operation of relay 6CG1 results in the operation of relay 7CK over a path from ground, winding of relay 7CK, contacts of relays 6CG1, 7Z1, 7W1, resistance 71 to negative battery. Operation of relay 7CK opens the register circuit of FIG. 6 so that no false registration may occur, by opening the contacts of relay 7CK in FIG. 6.

Battery potential is now applied to signal lead RS1 over a path from negative battery, resistance 73, contacts of relay 7CK, diode CK to conductor RS1 to indicate that group registration of group "1" has been registered and completed in the remote unit.

*IIA–5. Control unit—group information registration*

Operation of relay 15M at the control unit causes the operation of relay 15W1 over a path which may be traced from ground, contacts of relays 15M, 15Z1, 15W1, winding of relay 15W1 to negative battery. Relay 15W1 locks operated over its own contacts.

Operation of the latter relay causes the group registration (group "1") in the register circuit at the control unit (FIG. 12) by the operation of relay 12CG1 over a path from negative battery, winding of relay 12CG1, contacts of relays 15Z1, 12S3A, 12S2A, 12S1A, 15M, 13RK2, 15Z1, 15W1 to ground. Relay 10CCK now operates over a path from ground, winding of relay 10CCK, contacts of relays 15Z1, 16DIS16, 12CG1, 12CG0, 12DIS06, 15W1, resistance 101 to negative battery. Operation of relay 12CG1 causes the operation of relay 16TST1 over a path from ground, winding of relay 16TST1, contacts of relay 16HS19, contacts of relays 16HS10, 12CG1, resistance 161 to negative battery.

Operation of relay 12CG1 also partially closes an operating path for relay 16HS10.

*IIA–6. Trunk selection*

Operation of relay 16TST1 closes a path to operate relay 16HS10 (assumed for illustrative purposes to be) associated with an idle trunk. Operation of relay 16HS10 may be traced from ground, winding of relay 16HS10, contacts of relays 16TST1, 12CG1, 8TB10, 14A10, resistance 164 to negative battery. Operation of relay 16HS10 results in the release of higher numbered relay 16HS— and locks operated over a path from contacts of relays 16HS10, 12CG1, resistance 161 to negative battery.

Relay 10HSK1 now operates over a path from negative battery, resistance 102, contacts of relay 16HS10, through the contacts of relays 16HS11 through 16HS19, winding of relay 10HSK1 to ground. Relay 8TB10 operates over a path from ground, contacts of relays 10HSK1, 12CG1, 16HS10, winding of relay 8TB10 to negative battery.

When the registration of the group is completed in the remote circuit, battery was placed on lead RS1 at the remote circuit (Section IIA–4, supra) to operate relay 13RK1, over a path including ground, winding of relay 13RK1, contacts of relays 150TR, 16SR1, resistance RS1, conductor RS1, diode CK, contacts of relay 7CK, resistance 73 to negative battery. Relay 13RK2 now operates over an obvious path. The latter relay indicates that group registration of information in the remote circuit is complete and the sequence circuit should be advanced to permit handling of the "B" information. Operation of relay 13RK2 with relay 10CCK previously operated results in the release of relay 15M at the normally closed contacts of relay 13RK2. Release of relay 15M results in the operation of relay 15Z1 over a path from ground, contacts of relays 15M, 15Z1, 15W1, winding of relay 15Z1 to negative battery. Relay 10CCK now releases at the contacts of relay 15Z1 in series therewith. Release of relay 15M also removes the ground connection at the contacts of relay 15M from conductor TS1 which signals the remote circuit to likewise advance its own sequence circuit as described herein. Moreover, operation of relay 15Z1 also results in the release of signal relays 13S2, 13S3 and 13S4, 7S2, 7S3 and 7S4 and the corresponding auxiliary relays.

*IIA–7. Remote unit—"B" information*

When relay 7M releases, relay 7Z1 operates over a path from ground, contacts of relays 7RLS, 7M, 7Z1, 7W1, winding of relay 7Z1 to negative battery. Operation of the latter relay results in the release of relay 7CK at the contacts of relay 7Z1. Release of relay 7CK opens a path from battery to signal lead RS1 to indicate to the control circuit to release relay 13RK1 which in turn releases relay 13RK2.

Release of relay 13RK2 results in the operation of relay 15SB2 over a path from ground, contacts of relays 16G0, 16G1, 10RL1, 13RK2, 10CCK, 15Z3, 15Z1, 16SR0, 16SR1, winding of relay 15SB2 to negative battery. Operation of relay 15SB2 results in the operation of relay 15SB1 over a path from negative battery, winding of relay 15SB1, contacts of relays 15SB2, 15Z1 and 15Z3 over the remainder of the path previously traced for the operation of relay 15SB2. At the control unit, operation of relay 15SB1 results in the application of battery potential to the signaling conductors. Specifically, potential is applied to the control trunk to charge the trunk's distributed capacity over a path from negative battery, resistance 151, contacts of relays 13RK2, 15Z3, 15SB2, additional contacts of 15SB2, 15SB1, resistance TS0 to the control conductor TS0. A similar path may be traced for conductor RS0. Subsequent operation of relay 15SB1 now applies battery to the signal relays over a path from negative battery, resistance 151, contacts of relays 13RK2, 15SB1, 15Z3, 15SB2, winding of relay 13S2, winding of lay 13S1, resistance TS0, conductor TS0. Simultaneously, it is apparent that the contacts of relay 15SB1 in shunt with the windings of the signal relays are opened to remove the short circuit from across those windings.

The signal relays 7S2, 7S4, 13S2 and 13S4 are now operated over a path determined by the operated relay 3LB04. Thus a path may be traced from ground, resistance 72, contacts of relays 7Z1, 7Z2, 3LB04, 7Z2, 7Z1, windings of relays 7S1 and 7S2. A similar path may be traced over conductor RS0 including relays 7S3 and 7S4.

It may be noted parenthetically that when signaling originates at the control unit direct ground is applied at the remote unit to the signal relays over the contacts of relay 7RRA. In view of the resistance 71 and 72 in series with the operating path, marginal relays 7S1 and 7S3 do not operate although sensitive relays 7S2 and 7S4 do operate. Similarly, relays 13S2 and 13S4 are also operated.

Operation of relay 15SB1 referred to above results in the operation of relay 15M over a path from negative battery, winding of relay 15M, contacts of relays 16SR1, 15Z1, 15SB1, 15SB1, 15SB2, 15Z1, 15Z3 over the path previously described for the operation of relay 15SB1. Operation of the signal relays results in the operation of the auxiliary signal relays over obvious paths. It will be noted that an additional path for the operation of relay 15M is available over the contacts of relays 16SR1, 15Z1, 15SB1, 13RK2, 10RL1, 16G1, 16G0 to ground.

*IIA–8. Control unit—"B" information registration*

When relay 5M operates the sequence circuit is advanced by operating relay 15W2 from ground, contacts of relays 15M, 15Z1, 15Z2, 15W2, winding of relay 15W2 to negative battery. Operation of relay 15W2 results in the operation of register relay 12B4 from negative battery, winding of relay 12B4, contacts of relays 15Z2, 15Z1, 12S4A, 12S3A, 12S2A, 12S1A, 15M, 13RK2, 15Z2, 15W2, to ground.

Registration of "B" information in the control unit is now checked in the checking circuit of FIG. 10 over a path from negative battery, resistance 101, contacts of relays 15W1, 16DIS06, 12CG0, 12CG1, 16DIS16, 15Z1,

15W2, contacts of relays 12B0–12B3, contacts of relay 2B4, contacts of relays 12B5–12B8, 15Z2, winding of relay 10CCK to ground.

*IIA–9. Remote unit—"B" information registration*

When relay 15M operates at the control unit, a path is completed for the operation of relay 7M at the remote unit over conductor TS1 in the manner traced above. The sequence circuit in the remote unit is now activated through the operation of relay 7W2 over a path from ground, contacts of relays 7RLS, 7M, 7Z1, 7Z2, 7W2, winding of relay 7W2 to negative battery.

The "B" information is now registered in the remote unit by the operation of relay 6B4 over a path from negative battery, winding of relay 6B4, contacts of relays 7Z2, 7Z1, 7S4A, 7S3A, 7S2, 7S1A, 7CK, 7Z2, 7W2, conductor 601, contacts of relays 7M, 7RLS to ground. Relay 7CK now operates over a path from negative battery, resistance 71, contacts of relays 7W2, 7Z2, 6B4 (not shown), winding of relay 7CK to ground.

At this time select magnet 5SMB8 operates over a path including the contacts of relay 6B4.

In the control unit, relays 13RK1 and 13RK2 operate over paths similar to those described above for their previous operation.

As a result of the operation of relay 13RK2 and with relay 10CCK previously operated, battery potential is divorced from the signaling conductors causing the release of all of the signal relays previously operated.

Substantially simultaneously therewith, relays 15SB1, 15SB2 and 15M are all released at the contacts of relays 13RK2 and 10CCK in series therewith. Relay 15Z2 is now operated in the control unit to indicate the completion of the "B" information function and results in the release of relay 10CCK in view of the opening of the contacts of relay 15Z2 in series therewith. In the manner indicated above for the group information, relay 7M in the remote unit now releases over the path described above for its previous release.

*IIA–10. "A" information*

At the remote unit, the sequence circuit is now advanced in response to the release of relay 7M by the operation of relay 7Z2 over a path from ground, contacts of relays 7RLS, 7M, 7Z2, 7W2, winding of relay 7Z2 to negative battery. Relay 7CK now releases as a result of the opening of the contacts of relay 7Z2 in series therewith. As a result of the release of relay 7CK, relays 13RK1 and 13RK2 are released due to the opening of the contacts of relay 7CK in series with the winding of relay 13RK1.

Relay 15SB2 now operates over the path described hereinabove for its operation with respect to the "B" information. Relay 15SB1 operates also in the manner described above for its operation. At this time battery is applied to the signal conductor TS0 over the contacts of relay 15SB2 in the manner described above for processing the "B" information. Subsequent thereto the operation of relay 15SB1 applies signal potential to the signaling relays connected to conductor TS0 and removes the shunt from the windings of those relays and relay 15M operates as a result of the operation of relay 15SB1 over paths traced above with respect to the "B" information.

At this time relays 7S1, 7S2, 13S1 and 13S2 are operated over a path from ground, contacts of relay 3LA11, contacts of relays 7Z2, 7Z1 to the control conductor TS0. Since direct ground is applied to the control conductor TS0 both the marginal relay 7S1 and the sensitive relay 7S2 are operated.

As a result of the operation of relay 15M in the control unit, relay 7M is operated at the remote unit in the manner described above. Relay 15W3 operates over a path including ground, contacts of relays 15M, 15Z1, 15Z2, 15Z3, 15W3, winding of relay 15W3 to negative battery and relay 7W3 operates over a path from ground, contacts of relays 7M, 7Z1, 7Z2, 7Z3, 7W3, winding of relay 7W3 to negative battery.

*IIA–11. Registration of "A" information at the remote unit*

At this time the "A" information is registered by the operation of relay 6A5 over a path from ground, contacts of relays 7RLS, 7M, conductor 601, contacts of relays 7W3, 7Z3, 7CK, 7S1A, 7S3A, 7S4A, 7Z1, 7Z2, 7Z3, winding of relay 6A5 to negative battery.

*IIA–12. Registration of "A" information at the control unit*

A similar path may be traced for the operation of relay 12A5 at the control unit to register the "A" information. This path extends from ground, contacts of relays 15W3, 13RK2, 15M, 12S1A, 12S3A, 12S4A, 15Z2, 15Z3, winding of relay 2A5 to negative battery. Although the operation of relays 6A5 and 12A5 have been shown as illustrative the specific relay operated depends on the particular 3LA— relays which have been operated in response to the identity of the line.

*IIA–13. Match check operation*

Operation of relay 6A5 results in the operation of match check relay 4MK over a path from ground, winding of relay 4MK, normal contacts of relays 6B8 through 6B5, contacts of relay 6B4, normal contacts of relays 6B3 through 6B0, contacts of relay 6A5, normal contacts of relays 6A4 through 6A0, normal contacts of relays 6DG1, 6CG0, contacts of relay 6CG1, normal contacts of relay 6DG0, conductor 42, contacts of relays 7Z3, 3LB4 (not shown), 6B4 (not shown), 6CG1, 6A5, 3LA11 through the normal contacts of relays 3LA10–3LA00, 4MK, 7RRA, resistance 31 to negative battery. This check verifies that one and only one relay is operated for the group information, the "B" information and the "A" information.

In addition, this check also establishes the similarity between the information in the register circuit and the identification relays operated (e.g., 6A5 and 3LA11).

With respect to line lockout to prevent ambiguity of the identification in the event of simultaneous originating calls, it is noted that the contacts of relay 3LA11, for example, are in series with the line relay contacts, for example relay 2L99. This prevents any other relay 3LB— from operating other than a relay 3LB— associated with line relay 3LA11.

As an example, if relays 2L99 and 2L95 are simultaneously operated on originating calls, either one may be served as determined by the preference accorded the operated relay 3LB— but either one receiving service represents a legitimate rather than a spurious connection. To prevent ambiguous "B" identification for a particular "A" indication, for example in the case of relays 2L99, 2L95 and 2L86 being operated, series resistors are included, such as resistance 35, to offset the possibility of such a situation on the presumption that relays 3LB— are designed as low resistance operating relays. Thus in the instance referred to, relay 3LB00 will be favored since the operating path has a substantially lower resistance than that of relay 3LB04.

Further, with regard to the line lockout features, it may be noted that each of the relays 3LB— and 3LA— has a double lockout feature which works as follows: if relay 3LB04 is operated the normally closed contacts of relay 3LB04 shown in FIG. 3 prevent the operation of any higher numbered relay 3LB— and also prevent the operation of any lower numbered relay 3LB— thus providing positive lockout protection.

*IIA–14. Steering level select magnet operation*

At the control unit the steering level select magnets and the control or line select magnets are now operated. For the illustrative telephone connection now being traced from substation 2L99, steering level select magnet 11SMC9 operates over a path from negative battery, resistance 115, contact of relays 12B4, 12A5, winding of relay 11SMC9 to ground. Moreover, line level select magnet 11SMC4 is now operated over a path from ground, winding of relay 11SMC4, contacts of relays 12B4, 12A5, 12CG1, resistance 116 to negative battery.

When the "A" information is registered as indicated in the preceding paragraph, relay 10CCK is operated over a path from ground, winding of relay 10CCK, contacts of relays 10MK, 15Z3, 12A5, normal contacts of relays 12A4 through 12A0, contacts of relays 15W3, 15Z2, normal contacts of relays 12B6 through 12B8, contacts of relay 12B5, normal contacts of relays 12B4 through 12B0, contacts of relays 15W2, 15Z1, 16DIS16, 12CG1, 12CG0, 16DIS06, 15W1, resistance 101 to negative battery.

At the remote unit, relay 7CK is operated as the result of the operation of relay 4MK over a path from ground, winding of relay 7CK, contacts of relays 6T0, 6T1, 4MK, 7Z3, 7W3, resistance 74 to negative battery. Operation of relay 7CK results in the operation of relays 13RK1 and 13RK2 in the manner described above. It will be noted that after the operation of relay 6A5, a line level select magnet in the remote unit is operated over a path from negative battery, winding of select magnet 5SMB6, contacts of relays 6A5, 6B4 to ground.

The registration of the "A" information having been completed, battery is now applied to the signal lead RS1 to operate relays 13RK1 and 13RK2 in the manner explained above. Joint operation of relays 13RK1 and 13RK2 as explained above results in the release of relay 15M at the control unit and the corresponding release of relay 7M at the remote unit in the manner described above. In addition, relays 15SB2 and 15SB1 are released in view of the opening of the contacts of relays 13RK2 and 10CCK in series therewith. Moreover, signal relays 7Z1, 7Z2, 13S1 and 13S2 are now released together with their auxiliary relays as a result of the opening of the contacts of relay 10CCK.

Release of relay 15M described above, removes ground from conductor TS1 which signals the sequence circuit to advance by operating relay 15Z3 over a path from ground, contacts of relays 15M, 15Z3, 15W3, winding of relay 15Z3 to negative battery. Operation of relay 15Z3 transfers the operating path of relay 10CCK to the contacts of relay 10SMK. Relay 10MK now releases at the contacts of relay 15Z3 in series therewith and relay 10CCK releases in view of the opening of the contacts of relay 15Z3 in series therewith.

At the remote unit, relay 7M releases as a result of the release of relay 15M in the manner described previously. Again, this serves as a signal to the remote sequence circuit, this time to operate relay 7Z3, over a path from ground, contacts of relays 7RLS, 7M, 7Z3, 7W3, winding of relay 7Z3 to negative battery. Operation of relay 7Z3 results in the release of relay 7CK in view of the opening of contacts of relay 7Z3 in series therewith. This removes battery potential from signal lead RS1 and the contacts of relay 7CK at the remote unit cause the release of relays 13RK1 and 13RK2. In addition, relay 7Z3 causes the release of previously operated identification relays 3LA11 and 3LB04.

At the control unit operation of relay 10SMK results in the operation of cut-off relay 11CO99 over a path from negative battery, resistance 117, contacts of relays 10SMK, 12CG1, 12A5, 12B04, winding of relay 11CO99, contacts of relays 10HSK1, 16DIS14, winding of relay 11COK1. This causes the operation of relay 11COK1 and release of relay 11CO99. Release of relay 11CO99 prevents terminating calls to the line by opening the relay 8SL99 and the contacts of relay 11CO99 in series therewith.

Parenthetically, it may be noted that the contacts of the cut-off relays are shown as normally open. This would indicate that during the normal or idle condition of the line, the cut-off relays are normally operated. In this case (idle line condition), they are magnetically latched in the closed condition, and are opened when a connection for a talking path exists.

Operation of relay 11COK1 closes an obvious path for the operation of relay 11COK2 and operation of the latter relay closes paths for operation of the hold magnets. The path for the operation of the hold magnets may be traced from negative battery to resistance 142, contacts of relays 10HSK1, 11COK2, 12CG1, 16TB10, 16HS10, winding of hold magnet 14HMC10, contacts of relay 16DIS14 to ground. It will be noted that hold magnets 16HMA10 and 14HMB10 are likewise operated in parallel with hold magnet 14HMC10.

Operation of the hold magnet results in the operation of hold magnet check relay 14HMK from ground, winding of relay 14HMK, contacts of relays 14HMC10, 14HMB10, 14HMA10, 16HS10, 10HSK1, resistance 141 to negative battery. This serves to check that all the appropriate hold magnets have been operated.

*IIA–15. Transmitting trunk information*

When the remote circuit has advanced its sequence circuit as described above by the operation of relay 7Z3, and relays 13RK1 and 13RK2 are released, the release of relay 13RK2 with relay 14HMK operated, closes an operating path for relay 15OTR if a trunk in the group "09" or "19" has been selected or causes the operation of relay 15SB2 if any other trunk has been selected. Since trunk 10 has illustratively been selected, relay 15SB2 is operated over a path similar to that described above. When relay 15SB2 operates, battery is applied to conductors TS0 and RS0 to charge the cable in the manner described above. Subseqeunt operation of relay 15SB1, also in the manner described above, causes connection of the battery potential to the signal relays and removes the shunt across the windings of these relays. The signal relays which are operated are dependent on the trunk information to be transmitted. For trunk 10, as illustrative, no signal relays will be operated. This is apparent from Table 3 appended hereto.

Therefore, when battery is connected to the signal relays, none of these relays operates and none of the signal relays at the remote unit is operated.

At this time, relay 15M operates over the contacts of relay 15SB1 in the manner described above for previous operations. Relay 15W4 operates over a path from ground, contacts of relays 15M, 15Z1, 15Z2, 15Z3, winding of relay 15W4 connected to battery.

Ground is applied at the contacts of relay 15M to conductor TS1 to advance the remote signal circuit through the operation of relays 7M and 7W4. The path of the operation of relay 7W4 may be traced from ground, contacts of relays 7RL1, 7M, 7Z1, 7Z2, 7Z3, winding of relay 7W4 to negative battery. Operation of relay 7W4 results in the operation of relay 6TK0 in the register circuit to indicate that trunk 10 has been selected over a path from negative battery, winding of relay 6TK0, contacts of relays 7TR, 7Z3, 7Z2, 7Z1, 7SRA, 7S3A, 7S2, 7S1A, 7CK, 7W4, conductor 601, contacts of relays 7M, 7RLS to ground.

If trunk 09 or 19 had been selected, a different operatting sequence is required as will be explained hereinafter.

In the present illustration, operation of relay 6TK0 completes an operating path for relay 4SMK which may be traced from ground, winding of relay 4SMK, normal contacts of relays 6TK9 through 6TK0, contacts of select magnets 5SMB6, 5SMB8 (B0), resistance 45 to negative battery.

*IIA–16. Selection of trunk 09 or 19*

As indicated heretofore, the signal relay combinations for trunks 09 and 19 are the same. To distinguish between the two trunks in the same group, when trunk 09 or 19 is the selected trunk, the control circuit applies minus 48-volt battery in series with approximately minus 48 volts across capacitor 152 to lead RS1 of a polarity which causes relay 7RR to operate. This is followed by the operation of relay 7TR over a path including negative battery, windings of relays 7Z1, 7Z1, 7RR, 7RLS to ground. The minus 96-volt polarity to conductor RS1 results from the operation of contacts of relay 15OTR connected between resistance 153 and conductor RS1 at the control unit. Since capacitor 152 was previously charged to minus 48 volts at the left-hand side thereof and since a minus 48-volt potential step is applied to the right-hand side, a composite voltage of 96 volts is developed across the capacitor. At approximately this time, the control circuit removes the battery potential from conductor RS1 at the contacts of relay 15OTR. It is to be noted that the operation of relay 15M previously referred to results in the release of relay 15OTR. Relay 7RR releases and in the register circuit the contacts of relay 7TR (the transfer relay) open the operating path over relay 6TK0 and permit only relay 6TK9 to operate when none of the signal relays is operated. Relay 4SMK now operates over a path similar to that traced above when relay 6TK0 is operated.

*IIA–17. Release of line relay at remote unit*

After the operation of relay 4SMK a path may be traced for the operation of relay 5COK from ground, winding of relay 5COK, contacts of relay 6CG1, 6A5, 6B4, winding of relays 5CO99, 6DG1, 4SMK, resistance 55 to negative battery. The contacts of relay 5COK complete an operating path for relay 5HMB10 from ground, contacts of relay 6DG1, winding of relay 5HMB10, contacts of relays 6TK0, 6CG1, 4SMK, 5COK, resistance 51 to negative battery. Relay 5HMA10 operates in parallel. When relay 5CO99 releases, relay 2L99 is released at the opening of the contacts of relay 5CO99 in series therewith.

The hold magnet having been operated, since it is magnetically latched, may not be released until a pulse of the appropriate polarity is applied during a disconnect operation. It will be noted that the control unit has previously operated its hold magnet in order that the line requesting service may be identified at the control unit, if any trouble arises during the connection.

*IIA–18. Hold magnet check at remote unit*

Relay 4HMK now operates over a path including negative battery, resistance 41, winding of relay 4HMK, contacts of relays 5HMB10, 5HMA10, 6TK0, 6CG1, 4SMK to ground. This verifies that the correct relays have been operated.

Relay 7CK now operates as a result of the operation of relay 4HMK over a path which may be traced from ground, winding of relay 7CK, contacts of relay 4HMK, resistance 74 to negative battery.

As usual, the contacts of relay 7CK apply battery to signal lead RS1 to indicate to the control unit that the circuit may be released. Relay 7CK opens the operating path to the register permitting relay 6TK0 to release. The latter relay causes the release of relay 4SMK at the contacts of relay 6TK0. Relay 5COK releases at the contacts of relay 4SMK.

*IIA–19. Release of control and remote units*

As indicated above, the application of battery potential to lead RS1 at the contacts of relay 7CK causes the operation of relays 13RK1 and 13RK2 in the usual manner. At this time, relay 10RL1, operates over a path from negative battery, winding of relay 10RL1, contacts of relays 13RK2, 15M, 10MK, 14HMK, 12CG1, 15Z3 to ground. Operation of relay 10RL1 causes the release of relay 15SB1. In addition, relay 15M is released at the contacts of relay 10RL1. Releases of relay 15M causes the release of relay 10MK at the contacts of relay 15M and relay 15W4 is similarly released. This path may be traced over cable 10—12 to FIG. 12 and the contacts of relay 15M over conductor O. It will be noted that all of the signal relays previously operated would be released but since none of the signal relays was operated, none is released. Operation of relay 10RL1 supplies a 96-volt potential to conductor TS1 in a manner similar to that described above, when relay 15OTR operates. This is accomplished by connecting charged capacitor 154 in series with the negative battery connected to resistance 153 to apply a signal pulse to the remote unit to operate relay 7RLS.

The contacts of relay 10RL1 in series with the contacts of relay 10M open the operating path for relay 7M which releases and in turn release relay 7W4. The relays which are released when relay 7RLS operates include relays 7TR, 7W1, 7W2, 7W3, 6CG1, 6B4 and 6A5.

Release of relays 7W1–7W3 cause release of relays 7Z1–7Z3, respectively. Release of relay 6B4 results in the release of steering level select magnet 5SMB8 and release of relays 6B4 and 6A5 result in the release of relay 4MK.

When each of the above relays has been released, relay 4HMK releases when all of the contacts in its locking path are released. Release of relay 4HMK causes the release of relay 7CK. The latter relay as usual removes battery from signal lead RS1 to the control circuit to indicate that the remote unit has released.

Release of relays 13RK1 and 13RK2 provides a path for the operation of relay 10RL2 which may be traced from negative battery, winding of relay 10RL2, contacts of relays 16DIS14, 16DIS04, 10RL1, 13RK2, 10HSK1 to ground. Operation of release relay 10RL2 results in the release of relays 15W1 through 15W3, 12CG1, 12A5, 12B4, 16SR1. Select magnets 11SMC4 and 11SMC9 are released in view of the opening of the contacts of relay 12CG1, or 12A5, or 12B4 in series therewith. Relays 15Z1 through 15Z3 are released at the contacts of the associated relays 15W1 through 15W3. Relay 10SMK releases after the release of relays 15W1 through 15W3, 12CG1 and the select magnets.

Relay 11COK1 releases at the contacts of relay 10SMK. It will also be noted that relay 11COK1 would also release at the opening of any of the contacts of relays 12A—, 12B—, etc. Relay 11COK2 releases when relay 11COK1 releases.

The release of relay 12CG1 releases relay 16HS10 which in turn opens the operating path of relays 14HMK and 10HSK1.

It will be noted that the shunting path of the diode shunting relay 8TB10 makes it slow to release so that relay 8TS10 is operated, thereby holding relay 8TB10 operated. The path for operating relay 8TS10 may be traced from negative battery on ring conductor R99, through the crosspoint normal contacts of relay 16HS10, winding of relay 8TS10, over the ring conductor of the trunk to the remote unit through the equivalent crosspoints in the remote unit, the subscriber's loop and subset, the tip conductor of the trunk over a similar path to ground in the central office. Release of relay 15Z1 permits connection of battery to the signal leads over a path which may be traced from negative battery, resistance 151, contacts of relays 15Z1, 15Z1, 15RR1, 16DIS04, 16G1, 15Z1 to the signal relays. A similar path may be traced for the signal relays on conductor RS1. This results in the operation of sensitive relays 13S2, 13S4, 7S2, 7S4 which is the normal signaling condition.

Relay 16SRP1 is now released at the contacts of relay 15Z1. When all relays are released and relays 13S2 and 13S4 are operated, the release relays themselves, 10RL1 and 10RL2, release.

Relay 7RLS in the remote unit releases when all of the remote unit relays are released, and relays 10RL1 and 10RL2 are released. This completes release of the common equipment on a service request call and the equipment in the concentrator is ready to serve another request.

It will be noted that although all of the concentrator common equipment has released, the magnetic latching properties of the hold magnets maintain the connection cut through the concentrator.

*IIB. Detailed description of terminating call*

*IIB-1. Seizure of control circuit*

When a terminating call is originated at the central office ground is placed on the sleeve lead. Assuming relay 2L99 is associated with the called line (for illustrative purposes line 99 is the called line) sleeve relay 8SL99 will be operated. This results in the operation of relays 9LA11 and 9LB13. The path for the operation of relay 9LA11 may be traced from ground, contacts of relay 8SL99, winding of relay 9LA11, contacts of relays 9LA10, 9LA06, 16TER1, resistance 94 to negative battery. Relay 9LB13 operates over the contacts of relay 9LA11, resistance 93, contacts of relay 8SL99, winding of relay 9LB13, normal contacts of relays 9LB13, 9LB17, 9LB13, 9LB09, resistance 95 to negative battery.

Operation of relay 9LB13 closes an operating path for relay 16TP1 over the contact of relay 16TGB1 over a path from battery, resistance 94, contacts of relays 16TER1, 9LA06, 9LA10, 9LA11, conductor TP1, contacts of relay 16TGB1, winding of relay 16TP1, contacts of relays 16TP0, 16SRP1, 16SRP0, 16DP0 to ground. It will be noted that relay 16TGB1 will have operated if all trunks were busy in group "1." Relay 16TP1 closes a path for the operation of relay 16TER1 which may be traced from ground, contacts of relays 10RL2, 15Z1, 16TP1, winding of relay 16TER1 to negative battery. Relay 16G1 now operates over the contacts of relay 16TER1. Relay 15RR1 operates over a path from negative battery, winding of relay 15RR1, contacts of relays 16TER1, 16G1, 16G0 to ground. When relay 15RR1 operates a 96-volt potential is placed on lead RS1 at the contact of relay 15RR1 by putting capacitor 152 in series with the negative battery connected to resistance 153 to signal the remote circuit that a call is being initiated. This causes the remote circuit to change the resistance ground on the signal relays to a solid ground as explained herein. Specifically, at the remote unit, the application of the 96-volt potential results in the operation of relay 7RR over conductor RS1. Relay 7RRA operates over a path including the contacts of relays 7Z1, 7RR, 7RLS to ground.

The signal relays at the control unit are now released at the contacts of relay 15RR1. When relay 15RR2 operates as a result of the operation of relay 15RR1, battery is connected to the signal leads over a path including negative battery, resistance 151, contacts of relays 13RK2, 15Z1, 15RR2, resistance 155, contacts of relays 15Z1, 16DIS14, 16G1, 15Z1 to the windings of the signal relays. This results in the operation of relays 13S2 and 7S2 in view of resistance 155. A path for the operation of relay 13S4 may be traced similarly including the contacts of relays 16DIS14, 10T1, 16G0 and 15Z1.

It will be noted that the signal relays 7S2, 7S4, 13S2, 13S4 will all release at the contacts of relay 15RR1 before the new signal combination is applied to the signal relays.

A path is now closed for the operation of relay 15M from negative battery, winding of relay 15M, contacts of relays 15RR2, 15Z1, 13RK2, 10RL1, 16G1, 16G0 to ground.

*IIB-2. Registration of group information at the control unit*

Operation of relay 15M places ground potential in the usual manner on signal lead TS1 to signal the remote unit to advance the sequence circuit. In addition, relay 15W1 is operated at this time. Relay 7M operates as a result of the operation of relay 15M to operate relay 7W1. Operation of relay 15W1 causes the operation of relay 12CG1 in the register circuit over a path from negative battery, winding of relay 12CG1, contacts of relays 15Z1, 12S3A, 12S2A, 12S1A, 15F, 13RK2, 15Z1, 15W1 to ground. Relay 10CCK now operates to indicate the appropriate operation of relay 12CG1 over a path from ground, winding of relay 10CCK, contacts of relays 15Z1, 16DIS16, 12CG1, 12CG0, 16DIS06, 15W1, resistance 101 to negative battery. Relay 16TST1 operates over a path from ground, winding of relay 16TST1, contacts of relays 16HS19, 16HS10, 12CG1, resistance 161 to negative battery. In the interim, in the control unit, relay 7RR releases and relay 6CG1 operates over a path similar to that described above for an originating call. Relay 7CK operates to check the operation of relay 6CG1 over a path also similar to that for a service originating call. As usual, operation of relay 7CK causes the operation of relays 13RK1 and 13RK2 in the control unit.

*IIB–3. Trunk selection at control unit*

The procedure in selecting a trunk is the same as that heretofore traced for an originating call and need not be repeated in detail. It is sufficient to indicate that relay 16HS10 is operated if it is assumed that trunk 10 is selected, this time over a path from ground, winding of relay 16HS10, contacts of relays 16TST1, 12CG1, 8TB10, 14HMA10, resistance 164 to negative battery. Also in the manner similar to that described above, relay 16TST1 now releases at the contacts of relay 16HS10 and relay 10HSK1 operates in the manner described above as does relay 8TB10.

Relay 15M as usual releases in view of the opening of contacts of relays 13RK2 and 10CCK, in turn causing the release of relay 7M at the remote unit. These operations result in the operation of relay 15ZI at the control unit, and relay 7ZI at the remote unit, respectively. Also the signal relays are released in view of the opening of the contacts of relay 15ZI in series with battery connected to resistance 151 at the control unit. Relay 10CCK also releases at the contacts of relay 15ZI and relay 7CK releases at the contacts of relay 7ZI. Again the contacts of relay 7CK in series with conductor RS1 result in the release of relays 13RK1 and 13RK2.

The remainder of a terminating call description including the transmission of the "B" information, the registration of the "B" information, transmission of "A" information and registration of "A" information are similar to that described above. The exception of course resides in the fact that the identification of the line—in this case the called line—emanates from the control unit in lieu of the remote unit.

The transmission of the trunk information is also similar to that described above for a service request call and the release of the concentrator equipment is similiar to that described above with the exception that the operation of relay 10RL2 causes the release of relay 16TER1 in lieu of relay 16SR1. Release of relays 15RR1, 15RR2 is caused by the operation of relay 10RL1. Also the release of relay 16TER1 enables the operation of relays 9LA— and 9LB— if another request is made on a different line. Obviously relay 16SRP1 does not release as a result of the release of relay 15Z1 as shown for a service request call since relay 16SRP1 does not operate on a terminating call.

*IIC. Disconnect call*

When a subscriber disconnects, relay 8TS10 (again assuming a subscriber to be at substation 2L99 and the trunk to be trunk 10) releases and opens a holding path for slow release relay 8TB10 associated with the call. However, relay 8TB10 has another holding path from the sleeve of the line appearance through the normal contacts of relay 16HS10, resistance 83 and diode 84. Therefore relay 8TB10 remains operated until the central office disconnects and removes ground for the sleeve. When relay 8TB10 releases, a path is closed to operate relay 16DP1 from ground, contacts of relay 16DP0, winding of relay 16DP1, contacts of relays 15TLC1, 10TM3, diode 10, contacts of relays 8TB10, 14HMB10, resistance 164 to negative battery.

It will be noted that this operation can occur only if the trunk load control relay 15TLC1 is operated as explained herein. Otherwise the trunk is not released and the line remains cut through.

*IIC–1. Trunk hold control*

It will be noted that relay 15TLC1 operates only after five hold magnets have been operated. This allows four lines to be connected to the central office at all times and disconnection occurs only when the fifth hold magnet is operated, resulting in the operation of relay 15TLC1. As shown herein the trunk to be disconnected is determined by the preference control circuit including relays 16HS—.

Relay 15TLC1 is back-biased by resistance 155 in series with the secondary winding. Each hold magnet cuts in a 12,000-ohm resistor in parallel with the primary winding. Therefore four hold magnets supply a total resistance of 3,000 ohms which just balance the current through the primary winding. The fifth hold magnet reduces the resistance sufficiently to cause relay 15TLC1 to operate.

*IIC–2. Identification of line on disconnect call*

Operation of relay 16DP1 causes the operation of relay 16D1 over a path from negative battery, winding of relays 16D1, 16DP1, 16SRP0, 16SRP1, 16TP0, 16TP1, 15Z1, 10RL2. Operation of relay 16D1 causes the operation of relays 16DIS10 through 16DIS16. Relay 16G1 operates over the contacts of relay 16DIS15. Relay 16TST1 operates from ground, winding of relay 16TST1, contacts of relays 16HS19, 16HS10, 16DIS14, resistance 161 to negative battery.

When relay 16TST1 is operated, a path is closed from negative battery, resistance 164, contacts of relays 14HMB10, 8TB10, 16D1, 16TST1, windings of relays 16HS10 to ground. Corresponding paths may be traced for relays 16HS11–16HS19, although only the path relay 16HS19 is shown. Thus, all relays 16HS10–16HS19 of trunks requiring disconnect will attempt to operate. However, the lowest numbered relay 16HS10 will operate as a result of the preference chain to cause release of relay 16TST1. Relay 10HSK1 operates only when one relay 16HS— has operated in a manner similar to that described above. Thus relay 10HSK1 has operated and test relay 16TST1 released. It now remains to operate the sleeve relay 8SL99 associated with the line connected to the trunk selected for release. This path may be traced from negative battery, winding of relay 8SL99, contacts of relay 16DIS14, sleeve lead S99 through the crosspoint contacts, and relays 16HS10, 10HSK1, 16DIS16 to ground. Operation of sleeve relay 8SL99 results in the operation of the associated lockout relays in a manner analogous to that on a terminating call. As a result, relays 9LA11 and 9LB13 are operated. It will be noted that the contacts of relay 16DIS14 prevent an extension of the ground condition to the sleeve lead of the central office to falsely operate the conventional sleeve relay thereat.

*IIC–3. Transmitting group and class of call information*

Relay 10HSK1 which was previously operated causes the operation of relay 14HMK over a path from ground, windings of relays 14HMK, 14HMC10, 16DIS15, 16HS10, 10HSK1, resistance 141 to negative battery. Relay 14HRK now operates from ground, contacts of relays 14HMK, 16DIS16, winding of relay 14HRK to negative battery. Relay 15RRI now operates over a path from negative battery, winding of relay 15RR1, contacts of relays 10HSK1, 16DIS14, 10RL1, 16G1, 16G0 to ground. As a result of the operation of relay 15RR1, a minus 96-volt potential is applied to the conductor RS1 by placing capacitor 152 previously charged to minus 48 volts in series with a minus 48-volt source connected to resistor 153. This is a signal to the remote unit which results in the operation of relays 7RR and 7RRA in the manner described heretofore. Moreover, relay 15RR2 operates over an obvious path on the contacts of relay 15RR1.

At the same time, the contacts of relay 15RR1 remove battery from the signal conductors to release the signal relays and the auxiliary relays. Operation of relay 15RR2 results in the application of battery potential to the signal relays in the manner described heretofore. This results in the re-operation of the signal relays. The particular signal relays to be operated are, of course, dependent on the line identification. In this particular instance it will be seen that relay 13S4 operates at the control unit and relay 7S4 operates at the remote unit. The information indicating the particular signal relays operated is set forth in detail in Table 3 appended hereto. To enhance clarity the specific circuit path will not be repeated in detail.

The mark relay 15M at the control unit now operates over a path from negative battery, winding of relay 15M, contacts of relays 15RR2, 15Z1, 13RK2, 10RL1, 16G1, 16G0 to ground. In addition, operation of relay 15RR2 removes the minus 96-volt potential from conductor RS1. Relay 7M at the remote unit follows the operation of relay 15M at the control unit in the usual manner and the sequence relays 15W1 and 7WE are operated. Relay 10CCK now operates over a path from ground, winding of relay 10CCK, contacts of relays 15Z1, 16DIS16, 12CG1, 12CG0, 16DIS06, 15W1, resistance 101 to negative battery. Relay 6DG1 at the remote unit now operates from negative battery, winding of relay 6DG1, contacts of relays 7Z1, 7S4A, 7S3A, 7S2, 7S1A, 7CK, 7Z1, 7W1, conductor 601, contacts of relays 7M, 7RLS to ground. Operation of relay 6DG1 causes operation of relay 7CK over a path similar to that traced above for relay 6CG1.

It will be noted that relay 7RR was released previously when the voltage supplied to lead RS1 was small enough or removed.

As usual, the operation of relay 7CK causes the operation of relays 13RK1 and 13RK2. The latter, in turn, causes the release of relay 15M which, in turn, causes the release of relay 7M at the remote unit and, again, both sequence circuits are advanced by the operation of relays 15Z1 and 7Z1. Relay 10CCK releases when relay 15Z1 operates and relay 7CK releases when relay 7Z1 operates. Release of relay 7CK, as usual, results in the release of relays 13RK1 and 13RK2 and all of the signal relays previously operated release at the contacts of relay 15Z1.

*IIC–4. Registration of "B" and "A" information*

Release of relay 15M results in the operation of relay 15SB1 over a path from negative battery, winding of relays 15SB1, 16SR1, 16SR0, 15Z1, 15Z3, 10CCK, 13RK2, 10RL1, 16G1, 16G0 to ground. Operation of relay 15SB1 causes relay 15M to be re-operated over a path including negative battery, winding of relay 15M, contacts of relays 15RR2, 15Z1, 15SB1, 10CCK, 10RL1, 16G1, 16G0 to ground. Battery potential is applied to the signal leads at the contacts of relay 5SB1 as described above. This time the signal relays will be operated in accordance with the operated relays 9LB— at the control unit and 3LB— at the remote unit. Since relay 9LB13 was operated the particular signal relays which are operated are 13S2, 13S4, 7S2, 7S4 and the auxiliarly relays therefor, as indicated in Table 3.

As indicated above, relay 15M operates when relay 15SB1 operates, causing the operation of relay 7M and the operation of relays 15W2 and 7W2. At the control unit, register relay 12B4 is now operated over a path similar to that described above for a terminating call. In a like manner relay 6B4 in the remote unit is operated to complete the registration of the "B" information and relays 10CCK and 7CK, the check relays, operate to check that one and only one "B" relay is operated. Again, relays 13RK1 and 13RK2 are operated at the contacts of relay 7CK, and relay 5SMB8 in the remote unit operates at the contacts of relay 6B4 in a manner described above for a service request call and also for a terminating call. The signal relays which were previously operated are now released by the removal of battery from those relays at the contacts of relay 13RK2. Relays 15M and 15SB1 are also released in consequence of the operation of relays 13RK2 and 10CCK in FIG. 15.

As usual, relay 7M follows the release of relay 15M and both sequence circuits are advanced by the operation of relays 15Z2 and 7Z2 in the usual manner. Again, relays 7CK and 10CCK release at the contacts of relays 15Z2 and 7Z2 and, in turn, cause the release of relays 13RK1 and 13RK2.

Operation of relay 15Z2 results in the operation of relay 10TM3 over a path from ground, resistance 105, condenser 106, contacts of relay 15Z2, winding of relay 10TM3 to negative battery. Relay 16DP1 now releases at the contacts of relay 10TM3 and relay 16TP1 operates over the contacts of relay 16DP1. This includes a path from ground, contacts of relays 16DP0, 16DP1, 16SRP0, 16SRP1, 16TP0, winding of relay 16TP1, contacts of relay 16TGB1, conductor TP1, contacts of relays 9LA11, 9LA10, 9LA06, 15Z3, resistance 94 to negative battery.

Relay 15SB1 now re-operates over the contacts of relays 13RK2 and 10CCK and, in turn, causes relay 15M to operate and battery is again applied to the signal relays, this time in accordance with the specific relay 9LA—, since, in this case, relay 9LA11 has been operated. The particular signal relays which are operated are 13S1, 13S2, 7S1 and 7S2. The signal relays are operated in the manner similar to the paths traced heretofore.

Also, in accordance with previous operation, relay 7M operates at the remote unit following relay 15M and both sequence circuits are advanced this time by the actuation of relays 15W3 and 7W3.

Now register circuit relay 12A5 operates at the control unit and relay 6A5 at the remote unit in the manner described heretofore on an originating call and a terminating call. Relay 4MK operates to check the operation of the "B" relay, "A" relay and the group relay in the manner described heretofore. Similarly relay 10MK operates at the control unit to verify the accuracy of registration in the manner described heretofore for an originating call. At the control unit, select magnet 11SMCM operates, although this function is not essential to this particular aspect of the concentrator operation since a disconnect call is involved.

It will be noted that at the remote unit, select magnet 5SM6 is also operated although this operation is also not essential.

At the remote unit, relay 7CK operates over a path from ground, winding of relay 7CK, contacts of relay 4HMK, resistance 74 to negative battery. As usual, relay 7CK causes the operation of relays 13RK1 and 13RK2. Operation of the latter relay results in the release of relays 15M, 15SB1 and the signal relays in view of the removal of battery from the signal relays at the contacts of relays 13RK2 and 10CCK.

Again, relay 7M releases at the control unit in view of the release of relay 15M and the sequence circuits at both units are advanced by the operation of relays 15Z3 and 7Z3. Operation of the latter relay causes the release of relay 7CK and, therefore, the release of relays 13RK1 and 13RK2 and the operation of relay 15Z3 causes the release of relays 10MK and 10CCK. Relay 10SMK is now operated over a path similar to that described above for checking on a service request and terminating call with the exception that the path is now continued over the contacts of relays 16DIS15, 10RL1, winding of relay 10SMK to ground.

Again, it will be assumed that trunk 10 is the trunk illustratively chosen for disconnect. At the control unit relay 15SB1 is operated in the manner described heretofore over the contact of relay 10CCK. Relay 15M now is operated at the contacts of relay 15SB1 and, as usual, relay 7M operates at the remote unit. The signal relays are now operated—this time to reflect the appropriate trunk information and, since it has been assumed that trunk 10 is the selected trunk, none of the signal relays is operated as demonstrated in the table appended hereto.

Operation of relay 15M causes the operation of relay 7M in the usual manner which causes the advance of the sequence circuits, this time relays 15W4 and 7W4.

It will be noted that if trunk 09 or 19 was selected, a different procedure would be required as indicated heretofore with respect to an originating and terminating call. At the remote unit the operation of relay 7W4 causes the operation of relay 6TK0 in the manner described heretofore and relay 4SMK is now operated. The path for the operation of the latter relay is similar to that described above with the variation that contacts of relay 6DG1 are included in the operating path in lieu of the contacts of relay 6CG1.

At this time, relay 5CO99 is operated at the remote unit, also in the manner described heretofore, with the variation that the relay 6CG1 is normal and relay 6DG1 is operated. This interaction of the two relays at this time causes a reversal of potential to the magnetically latched cut-off relays to operate the relays. Relay 5COK now operates in series with the winding of relay 5CO99. Operation of relay 5COK causes the release of the remote unit hold magnets 5HMA10, 5HMB10.

When relay 5COK operates at the remote unit the pulse applied to the hold magnet is opposite in polarity to that during a service request or terminating call and causes the release of those magnets.

Release of the hold magnets removes the shunt from relay 4HMK which allows that relay to operate over a path from negative battery, resistance 41, winding of relay 4HMK, contacts of relays 5HMB10, 5HMA10, 6TK0, 6DG1, 4SMK to ground. At this time, relay 7CK operates to apply battery to the signal lead RS1 in the usual manner.

*IIC–5. Release*

Relay 6TK0 now releases at the contacts of relay 7CK and relay 4SMK releases at the contacts of 6TK0, in turn, releasing relay 5COK. In the interim, relays 13RK1 and 13RK2 release at the contacts of relay 7CK in the usual manner. At this time hold magnets 14HMA10, 14HMB10 and 14HMC10 release in view of the operation of the contacts of relays 13RK2 and 10MK. The path for the release of the hold magnets may be traced from negative battery, resistance 142, contacts of relays 10HSK1, 15W4, 13RK2, 14HRK, resistance 143, contacts of relay 16DIS14 to apply a potential opposite to that previously applied to the windings of magnets 14HMA10, 14HMB10 and 14HMC10. The path is completed over the contacts of relays 16HS10 and 8TB10 to ground.

Parenthetically, it may be noted at this juncture, that the magnitude of resistance 143 is designed to permit sufficient reverse current flow to release the magnets but not sufficient to re-operate the magnets in the opposite direction.

Relay 14HMK now releases at the contacts of magnets 14HMA10, 14HMB10 and 14HMC10. Significantly, it will be seen that the contacts of relay 16DIS15 shunting the above-referred-to contact paths insure that all of the three magnets, 14HMA10, 14HMB10 and 14HMC10, release.

Sleeve relay 8SL99 now releases in view of the opening of the crosspoint contacts in series therewith and, in turn, causes the lockout relays 9LA11 and 9LB13 to release.

The cut-off relay in the control unit 11CO99 is now operated at the contacts of relay 14HMK over a path described heretofore with the exception that relay 12CG1 is normal and relay 16DIS14 is operated.

Relay 11COK1 now operates over a path including windings of relays 11COK1, 12CG1, 12A5, 12B4, winding of relay 11CO99, contacts of relays 10HSK1, 16DIS14, 14HMK, 14HRK, 10SMK, resistance 117 to negative battery. Relay 11COK2 now operates over an obvious path.

Relay 16TP1 now releases at the contacts of the register relays and relay 10RL1 operates over a path similar to that given above with the variation that the contacts of relay 16DIS14 are now included in the circuit.

After the operation of relay 10RL1 the release of the circuitry is similar to that described above with respect to a service request call with the exception that relays 12CG1 and 16SR1 were, of course, not operated. Instead, relay 10RL2 releases relay 16D1 which, in turn, causes the release of relays 16DIS10 through 16DIS16. Release of the latter relays opens the operating paths of relays 16G1 and 16HS10. Relay 14HRK releases when relay 10RL2 operates and either relay 16DIS14 or relay 14HMK releases.

The remote circuit also releases in a manner similar to that described above for a service request call, but releases relay 6DG1 in lieu of relay 6CG1.

*IIC–6. Timing circuit 10TM3*

This timing circuit is used on disconnect calls to obtain a six-second interval between calls. This reduces the rate at which the remote unit battery will be discharged during a trouble condition. In addition, it permits other calls to be served during the trouble period.

More specifically, when relay 15Z2 operates, a path is closed for the operation of relay 10TM3 over the contacts of relay 16DIS14, contacts of relays 15Z2, 15Z2, winding of relay 10TM3 to negative battery. This also charges capacitor 106. Relay 10TM3 in operating partially closes an operating path for relay 10RL2. This insures that relay 10TM3 operates on disconnect calls. When relay 10RL2 operates, a holding path is closed through the contacts of relay 10TM3 to maintain relay 10TM3 operated until the call is disconnected. Since the normally closed contacts of relay 10TM3 are now open in the operating path of relay 16DP1, disconnect calls are prevented from starting until relay 10TM3 again releases. The relay does not release until the capacitor 106 discharges—a period of illustratively six seconds.

*IID. Service denial call*

*IID–1. Seizure of control unit*

When it is determined necessary to deny service to a line or to "lockout" the line as a result of a permanent line or fault condition, conductor TSL (FIG. 14) is cross-connected to the sleeve appearance of the line to be isolated. It will be assumed, again for illustrative purposes, that substation 2L99 is the station to be denied service. Initialy, key T1 is operated to cause the operation of relay 10T1 which, in turn, places a ground potential on conductor TSL. This results in the operation of sleeve relay 8SL99 associated with the line (to be isolated in) over a path from negative battery, winding of relay 8SL99, contacts of relay 11CO99, a sleeve conductor S99, contacts of relay 16DIS14 to the central office line termination. The call now proceeds as a terminating call with the exception that the signal relays which are operated are determined by relay 10T1 to inform the remote unit that a service denial call is being made when the group information is sent. Thus, relays 9LA11 and 9LB13 are operated in the manner described heretofore, for a terminating call, as are relays 16TP1, 16TER1 and 16G1. Relay 15RR1 operates at the contacts of relay 16G1 and causes the operation of relay 15RR2 at the control unit and relay 7RR at the remote unit. Still following the sequence for a terminating call, signal relays 7S2, 7S4, 13S2 and 13S4 along with the auxiliary relays are released. Relay 15M operates at the control unit as does relay 7M at the remote unit and both sequence circuits are advanced by the operation of relays 15W1 and 7W1.

The signal relays which are operated as detailed by the appended Table 3 are 13S2, 13S4, 7S2 and 7S4 together with the auxiliary relays. Relay 12CG1 operates after the operation of the signal relays in the usual manner. Relay 16TST1 operates in the manner described heretofore for a terminating call and causes the operation of relay 16HS10 followed by the release of relay 16TST1 and the operation of relay 10HSK1. The latter relay causes the operation of relay 8TB10 as described above.

Relay 10CCK operates at the contacts of relay 12CG1 and causes the release of the contacts of relay 15M as well as relay 7M at the remote unit.

In the interim, it will be noted that relay 6T1 operated at the remote unit over a path including negative battery, winding of relays 6T1, 7Z1, 7S4A, 7S3A, 7S2, 7S1A, 7CK, 7Z1, 7W1, conductor 601, contacts of relays 7M, 7RLS to ground. Relay 6CG1 thereafter operates over the contacts of relay 6T1 and a similar path.

Relay 7CK now operates over a path similar to that described above and causes the operation of relays 13RK1 and 13RK2 in view of the release of relays 15M and 7M at the contacts of relays 13RK2 and 10CCK. Relay 15Z1 is operated as is relay 7Z1 thereby releasing relays 10CCK and 7CK. As usual, all of the signal relays are released at the contacts of relay 15Z1, and relays 13RK1 and 13RK2 are released at the contacts of relay 7CK.

Thereafter it is noted that the trunk, the selection "B" information and the "A" information are transmitted in a similar manner to a terminating call.

After the select magnets have operated, relay 10CCK operates as explained heretofore for a terminating call. However, when relay 13RK2 operates to indicate the "A" information has been registered and relay 5CO99 is released at the remote unit thereby denying service, a path is closed through the operated contacts of relay 10T1 to operate relay 10RL1. This path extends from ground, contacts of relays 10T1, 15W3, 13RK2, winding of relay 10RL1 to negative battery to cause the release of the control and remote unit concentrator equipment. Operation of relay 10RL1 causes the release of relay 15M to advance the sequence circuit by the operation of relay 15Z3. However, at this time relay 10SMK does not operate since its operating path includes the normally closed contacts of relay 10T1. This prevents the control circuit from operating the hold magnets which would allow a disconnect call to start thereby operating relay 5CO99 and restoring service.

*IID–2. Release of a service denial call*

Release of the relays used in establishing a call is similar to that described heretofore for the other calls with the exception that when relay 10RL2 operates an indication is given on lamp 10COK over the contacts of relays 10RL2 and 10T1. Key T1 is then released to open the operating path of relay 10T1. Release of the latter relay causes ground to be removed from the lamp 10COK and also causes a hold path for relay 10RL2 to be opened.

The leads from the control circuit to the line appearance must be opened or the line appearance made busy to prevent terminating calls as explained herein.

When the service denied condition is to be removed the leads to the line appearance are re-connected and a terminating call is made to the subscriber's line. When an on-hook condition exists during the terminating call a disconnect call will be made if relay 15TLC1 is operated. If the latter relay is normal the subscriber will remain connected to the central office. Either condition will allow a subscriber to originate service request calls.

*IIE. Preference control*

Two lockout chains are used to allow a call to complete if another call requests service. The first chain in the order of preference includes relays 16DP0/16DP1, 16SRP0/16SRP1, 16TP0/16TP1, when relay 10TM3 is normal. If relay 10TM3 is operated, relay 16SRP0/16SRP1 is preferred since relay 16DP0/16DP1 cannot operate.

This first chain prevents a call associated with a less preferred relay from operating its preference relay. A call associated with a higher preferred relay can operate its preference relay but the second chain prevents the preferred preference relay from starting the call. The second chain in the order of preference includes relays 16TER1/16TER0, 16SR1/16SR0, 16D1/16D0. The second chain is the reverse of the preference in the first chain. As a result, even though a higher preferred relay was operated in the first chain while a call was in progress, the call will be completed before the preferred relay can operate its associated relay to the second chain to start a call.

*IIF. Alarm circuit*

The alarm circuit is controlled by slow release relay 15TM1 and the associated capacitor 156. When the circuit is normal, relay 16G1/16G0 is normal and ground is connected to relay 15TM1 and capacitor 156. Relay 15TM1 is held operated and capacitor 156 is charged by the potential source 157 through resistance 158 and diode 159. When relay 16G0/16G1 operates and removes the ground, relay 15TM1 releases after capacitor 156 discharges sufficiently to reduce the current in the circuit below the hold current providing relay 16G0/16G1 has not released. Release of relay 15TM1 causes relay 10RL1 to operate and a path to be closed for operating relay 10TM3 and charging capacitor 106 on a disconnect call. When relay 15TM1 releases a number of other relays (not shown) may be operated and locked in the operated condition to indicate the state of the call when the alarm condition occurred. The locked relays may be subsequently released by a key or other appropriate means.

For a fuller description of the operation of time delay relay 15TM1, reference may be made to Patent 2,636,931 of M. E. Krom of April 28, 1953.

*IIG. Line lockout circuit operation on simultaneous calls*

It will be assumed for illustrative purposes that simultaneous terminating calls have been made to the concentrator subscribers having substations 99 and 86. As a result, sleeve relays 8SL86 (not shown) and 8SL99 will be simultaneously operated. Relay 9LA10 operates over a path from ground, contacts of relay 8SL86, winding of relay 9LA10, contacts of relays 9LA10, 9LA11, 9LA10, 9LA06, 16TER1, resistance 94 to negative battery. Relay 9LA11 operates over a path including contacts of relay 9SL99 and a similar circuit. Assuming the relatively rare situation in which both relays operate precisely simultaneously, relay 9LA11 will ultimately release in favor of the relay 9LA10 in view of the contacts of relay 9LA10 opening in series with the path for relay 9LA11.

It will be noted that the operating path for relay 9LB09 is completed from ground, contacts of relays 9LA10, resistance 96, contacts of relays 8SL86, winding of relay 9LB09, contacts of relays 9LB09, 9LB17, 9LB13, 9LB09, resistance 95 to negative battery.

Moreover, relay 9LB13 associated with line 99 cannot operate since it was indicated that relay 9LA11 released and therefore opened the contacts of relay 9LA11 in series with relay 9LB13. This avoids the possibility of an ambiguous or invalid identification.

It will be noted that if two sleeve relays representing lines in the same LA group, for example relays 8SL86 and 8SL90, associated with relay 9LA10, are simultaneously operated, relay 9LA10 will be operated. However, in this event, either relay 9LB09 or 9LB13 will represent a valid identification. Either relay will lock out the other, but since both of these combinations with relay 9LA10 is a valid one the circuit function is legitimate.

It will now be assumed that relays 8SL86, 8SL95 and 8SL99 are simultaneously operated. Under these circumstances the preferred "LA" relay as indicated above is relay 9LA10. As a result, relay 9LB09 should operate (along with relay 9LA10) to give the coded identification for lline 86. However, when relay 9LA10 operates a path now exists from ground, contacts or relay 9LA10, resistance 96, contacts of relays 8SL86, 8SL95, resistance 97, resistance 93, contacts of relay 8SL99, winding of relay 9LB13 over the path previously traced including the normal contacts of the "LB" relays and resistance 95 to negative battery. However, resistances 97, 96, 93, etc. are designed to sufficiently high in magnitude relative to the usual impedance in the relay operating path the prevent relay 9LB13 from operating over this undesired path.

*IIH. Trunk overflow indication*

When all hold magnets are busy in group 0 or group 1, a path is closed to operate the corresponding relay 16TGB0/16TGB1 over an obvious circuit. The operated relay places ground on start lead ST to the ringing circuit 168 of FIG. 16 to initiate the operation thereof.

On a terminating call, assuming that line 00 is the called line, relay 8SL00 operates, followed by relays 9LA00 and 9LB00, as described for a terminating call previously. However, relay 16TP0 cannot operate when relay 16TGB0 is operated. A path is therefore available through lead OFT and capacitor TGB0, contacts of relays 16TGB0 and 9LB00 to apply overflow tone to the ring conductor through the contacts of relay 8SL00. Moreover, the tip and ring leads of the line appearance are connected to tube 16TGB0 to trip ringing. When the central office equipment releases, ground is removed from the sleeve link, causing the release of relay 8SL00, followed by release of relays 9LA00 and 9LB00.

It is understood that the above embodiments are merely illustrative and that various modifications may be made by those skilled in the art without departing from the scope of the invention.

What is claimed is:

1. A remote telephone line concentrator including a plurality of substation lines, a telephone central office, a plurality of concentrator trunks fewer in number than said lines for coupling said lines to said office, remote switching means for connecting said lines to said trunks, and means at said central office for identifying a particular line connected to one of said trunks perparatory to disestablishing the connection through said trunk.

2. An automatic telephone system including a plurality of lines, a telephone central office, a plurality of trunks smaller in number than said lines, remote switching means for connecting said lines to said trunks, disconnect means at said central office effective in response to a predetermined number of established connections between said lines and said trunks for initiating the disconnection of one of said trunks, selecting means responsive to said initiating means for selecting a trunk to be disconnected in accordance with an established preference, and means responsive to said selecting means for identifying the substation line to which said trunk is connected.

3. A telephone concentrator system including a plurality of lines, a telephone central office, a plurality of trunks less in number than said lines, remote switching means for connecting said lines to said trunks, a control unit at said central office, a plurality of terminals on said control unit individual to said lines, said control unit including means for switching said trunks to said line terminals, disconnect means in said control unit responsive to the establishment of a predetermined number of connections between said lines and said trunks for initiating disestablishment of said connections, selecting means responsive to said initiating means for selecting a particular trunk to be disconnected, identifying means responsive to said selecting means for indicating the identity of the line to which said particular trunk is connected, and signalling means responsive to said identifying means for transmitting said line information identity to said remote switching means.

4. A telephone switching system including a plurality of substation lines, a plurality of concentrator trunks fewer in number than said lines, a telephone central office, remote concentrator switching means for connecting said lines to said trunks, control switching means in said central office, a plurality of line terminations in said control switching means individual to said lines, means in said control switching means for connecting said trunks to said line terminations, sensory means at said remote switching means connected to said lines for indicating the service condition of said lines, disconnect means at said control switching means responsive to the establishment of a predetermined number of connections between said lines and said trunks for initiating the disconnection of said trunks, selecting means responsive to said disconnect means for selecting a particular trunk to be disconnected in accordance with a predetermined preference order, identifying means at said control switching means responsive to said selecting means for determining the identity of the line to which said particular trunk is connected, signal means controlled by said identifying means for transmitting the identity of said line to said remote switching means, and means responsive to the reception of said line information in said remote switching means for actuating said sensory means at said remote switching means.

5. A line concentrator system including a plurality of lines, a telephone central office, a plurality of concentrator trunks smaller in number than said lines for connecting said lines to said office, remote switching means for establishing connections between said lines and said trunks, means responsive to the establishment of a connection between a line and a trunk for delaying the disestablishment of said connection subsequent to the restoration of an idle condition on said line, means at said central office responsive to the establisment of a predetermined number of connections between said lines and said trunks for disconnecting said trunks, and means at said central office for identifying lines coupled to said trunks to be disconnected.

6. An automatic remote line concentrator system including a plurality of telephone lines, a telephone central office, a plurality of trunks less in number than said lines for coupling said lines to said office, remote switching means for connecting said lines to said trunk, said switching means including magnetically latching holding means for holding said connections operated, sensory means at said remote switching means for observing the service condition of said lines, magnetically latching cut-off means for divorcing said sensory means from said lines, means at said central office responsive to the establishment of a predetermined number of connections for releasing said trunks, and means at said central office for transmitting signals to said remote switching means to release said magnetically latched holding means and said magnetically latched cut-off means.

7. An automatic remote telephone line concentrator system including a plurality of telephone lines, a telephone central office, a plurality of trunks fewer in number than said lines for coupling said lines to said office, remote switching means for connecting said lines to said trunks under control of said central office, means responsive to the connection of a predetermined number of lines to said trunks to prepare the release of said trunks, and identifying means connectable to said lines for determining the identity of said lines connected to said trunks to be released, said identifying means including means for indicating the identity of a calling line on an originating call.

8. An automatic telephone line concentrator system in accordance with claim 7 including additional means in said identifying means for determining the identity of a called line on a terminating call.

9. A remote universal line concentrator system including a plurality of remote substation lines, a telephone central office, a plurality of trunks smaller in number than said lines for coupling said lines to said office, a remote concentrator switching unit for connecting said lines to said trunks, a control switching unit at said central office, said control unit including a plurality of line terminations equal in number to said lines, switching means in said control unit for connecting said trunks to said line terminations, disconnect means in said control unit responsive to the establishment of a predetermined number of connections between said trunks and said lines for initiating the release of said trunks, identifying means in said control unit responsive to said disconnect means for identifying said lines connected to said trunks to be released, said identifying means including means for applying a reference potential to said trunks to be released, and indicating means individual to said lines and responsive to the application of said reference potential to said trunk for indicating the identity of said lines.

10. A universal telephone line concentrator including a plurality of substation lines, a telephone central office, a plurality of trunks, said trunks being fewer in number than said lines, a remote switching unit for connecting said lines to said trunks, a control switching unit at said central office, said control unit including a plurality of relays individual to said lines, a plurality of line terminations in said central office individual to said lines, means in said control switching unit for connecting said trunks to said line terminations in said central office, means for releasing said trunks, means for identifying the lines to which said released trunks are connected including means for operating said relays in said control unit individual to said lines, and additional indicating means disposed in coded combinations operative to indicate the identity of said lines in response to the operation of said individual relays.

11. A universal telephone line concentrator in accordance with claim 10 including in addition means in said control unit responsive to said identifying means for transmitting said identification information to said remote unit.

12. A universal telephone line concentrator system in accordance with claim 11 including in addition register means at said control unit and register means at said remote unit jointly responsive to the operation of said transmitting means to register the identity of said line.

13. A universal telephone line concentrator system including a telephone central office, a first plurality of line terminations at said office, a plurality of substation lines, a lesser plurality of trunks, a remote switching unit for connecting said lines to said trunks, a control switching unit at said central office including a second plurality of line terminations, means coupling said first plurality of line terminations to said second plurality of line terminations, a third plurality of line terminations at said remote unit connected to said substation lines, sensory means at said remote unit connected to said third line terminations for indicating the service condition of said lines, cut-off means at said remote unit for isolating said sensory means from said lines, means at said control unit for releasing connections between a particular line and a trunk including means for identifying said line, and means at said control unit for transmitting signals to said cut-off means to restore said sensory means to said particular line.

14. A universal telephone line concentrator system in accordance with claim 13 wherein said means for transmitting signals to said cut-off means includes means for applying signals of potentials opposite to that required to operate said cut-off means to divorce said sensing means from said line.

15. A universal line concentrator system including a plurality of lines, a plurality of trunks, said trunks being fewer in number than said lines, a telephone central office, remote switching means for connecting said lines to said trunks, control switching means for connecting said trunks to said central office, said switching means including crossbar network means comprising vertical and horizontal conductive paths, vertical path magnets and horizontal path magnets, a plurality of contact sets at the intersections of said paths, and means in said control means responsive to the establishment of a predetermined number of connections for transmitting signals to said vertical path magnets to release said trunks.

16. A universal line concentrator system in accordance with claim 15 wherein said transmitting means includes means for applying a signal pulse of opposite polarity to that required to actuate said vertical path magnet when connecting said trunks to said lines.

17. A telephone line concentrator system including a plurality of substation lines, a central office, a plurality of trunks fewer in number than said lines connected to said office, remote switching means for connecting said lines to said trunks, first line termination means at said remote switching means connected to said lines, control switching means including a second plurality of line terminations, a third plurality of line terminations in said central office connected to said second plurality of line terminations, indicating means individual to said lines connected to said second plurality of line terminations, disconnect means at said control means responsive to the establishment of a predetermined number of connections between said lines and trunks for releasing said connections, means for identifying said lines connected to said trunks to be released including means for applying a reference potential to said trunks to operate said indicating means individual to said lines connected to said trunks to be released, and relay means connected to said indicating means and operative in predetermined combinations representative of said line identifications.

18. A telephone line concentrator system in accordance with claim 17 including in addition sensory means connected to said first line termination means, for observing the service condition of said lines, cut-off means at said remote switching means for isolating said sensory means from said first line terminations, and means responsive to the operation of said disconnect means for actuating said cut-off means at said remote switching means to restore said sensory means to said lines.

19. A universal telephone line concentrator system including a telephone central office, a plurality of substation lines, a plurality of trunks, said lines being greater in number than said trunks, a remote switching unit for connecting said lines to said trunks, a control switching unit at said central office, a plurality of line terminations in said central office individual to said lines, a plurality of sleeve relays in said control unit individual to said lines, means in said control switching unit for connecting said trunks to said line terminations in said central office, means in said control unit responsive to the establishment of a predetermined number of connections between said lines and trunks for selecting a trunk for release, disconnect relay means responsive to said last mentioned means for disconnecting said sleeve relays from said line terminations in said central office and for connecting said sleeve relays to said trunks to be released, and means responsive to the operation of said disconnect relays means for actuating a particular sleeve relay connected to said trunk selected for release.

20. A universal telephone line concentrator including a number of subscriber lines, a telephone central office, a relatively lesser number of trunks for coupling said lines to said office, remote switching means for connecting said lines to said trunks, control switching means in said central office, a plurality of line terminations in said control means individual to said lines, a plurality of line terminations in said central office individually coupled to said line terminations in said control means, means in said control switching means for connecting said trunks to said line terminations, means in said control switching means responsive to the establishment of a predetermined number of connections between said lines and trunks for selecting a particular trunk to be released, means in said control switching means responsive to the operation of said last mentioned means for identifying the line connected to said particular trunk to be released including means for applying a reference potential to said trunk to activate a particular line termination in said control switching means connected to said trunk, sleeve relay means connected to said particular line termination and operative responsive to the activation of said termination, identifying means responsive to the operation of said sleeve relay, and signal means responsive to the operation of said identifying means for transmitting information indicative of said identification to said remote switching means including means for transmitting additional information designating a disconnect order to said remote switching means.

21. A universal telephone line concentrator in accordance with claim 20 including in addition signal receiving means at said remote means responsive to the operation of said transmitting means in said control means to connect said signal receiving means at said remote means to a source of reference potential preparatory to the reception of said signal information from said control switching means.

22. An automatic telephone switching system including a plurality of subscriber lines, a telephone central office, a plurality of trunks fewer in number than said lines for coupling said lines to said office, remote switching means for connecting said lines to said trunks, control switching means connected to said central office, a first plurality of line terminations in said central office individual to said lines, a second plurality of line terminations in said remote means individual to said lines, first sensory means connected to said first line terminations to observe the service condition of said lines, first cut-off means for isolating said first sensory means from said lines when a connection to said lines exists in said central office, second sensory means connected to said second line terminations for observing the service condition of said lines, second cut-off means for isolating said second sensory means from said lines when a connection to said lines exists in said remote switching means, means for actuating said first cut-off means to connect said first sensory means to said lines and means for actuating said second cut-off means to isolate said second sensory means from said lines when a connection extends through said remote and control switching means to one of said lines but not through said central office, means in said control means responsive to the establishment of a predetermined number of connections between said lines and said trunks for releasing said trunks and identifying the lines connected to said trunks, and additional means responsive to said last mentioned means for transmitting orders to said remote means to actuate said second cut-off means connected to said identified lines to restore said second sensory means to observing the service condition on said lines.

23. An automatic telephone switching system in accordance with claim 22 wherein said means responsive to the establishment of a predetermined number of connections between said lines and trunks includes relay means having a first winding and a second winding, means for supplying an operating current through said first winding, resistor means individual to said trunks arranged in parallel and serially connected to said second winding, relay contact means individual to said trunks connected in series with said resistor means, means for operating said contact means in accordance with the operation of said trunks to drive a current through said second winding proportional to the number of trunks connected to lines, whereby the closure of a predetermined number of contacts produces a current through said second winding which opposes the current through said first winding to release said relay.

No references cited.